(12) United States Patent
Hosek et al.

(10) Patent No.: US 8,803,513 B2
(45) Date of Patent: *Aug. 12, 2014

(54) MULTIPLE DIMENSION POSITION SENSOR

(75) Inventors: Martin Hosek, Lowell, MA (US); Christopher Hofmeister, Holderness, NH (US); John F. Zettler, Stow, MA (US); Alexander Krupyshev, Chelmsford, MA (US); Sergei Syssoev, Towsend, MA (US); Krzystof Majczak, Beverly, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/412,392

(22) Filed: Mar. 5, 2012

(65) Prior Publication Data

US 2012/0223597 A1 Sep. 6, 2012

Related U.S. Application Data

(63) Continuation of application No. 12/163,716, filed on Jun. 27, 2008, now Pat. No. 8,129,984.

(60) Provisional application No. 60/946,542, filed on Jun. 27, 2007.

(51) Int. Cl.
*G01B 7/14* (2006.01)
(52) U.S. Cl.
USPC ............ 324/207.24; 324/207.2; 324/207.26; 324/207.15
(58) Field of Classification Search
USPC ............... 324/207.2, 207.24, 207.26, 207.15
See application file for complete search history.

(56) References Cited

U.S. PATENT DOCUMENTS

| | | |
|---|---|---|
| 2,564,221 A | 8/1951 | Hornfeck |
| 3,205,485 A | 9/1965 | Bernard |
| 3,560,774 A | 2/1971 | Reeves |

(Continued)

FOREIGN PATENT DOCUMENTS

| | | |
|---|---|---|
| CN | 1157675 A | 8/1997 |
| CN | 1226307 A | 8/1999 |

(Continued)

OTHER PUBLICATIONS

Taiwan IPO search Report, Application No. 097124040, dated May 19, 2013, 1 page.

(Continued)

*Primary Examiner* — Jay Patidar
(74) *Attorney, Agent, or Firm* — Perman & Green, LLP; Colin C. Durham

(57) ABSTRACT

An apparatus including a controller, a workpiece transport in communication with the controller having a movable portion and a transport path, and a multi-dimensional position measurement device including at least one field generating platen attached to the movable portion and at least one sensor group positioned along the transport path and in communication with the controller, the field generating platen is configured for position measurement and propelling the movable portion, each sensor in the at least one sensor group is configured to provide but one output signal along a single axis corresponding to a sensed field generated by the at least one field generating platen and the controller is configured calculate a multi-dimensional position of the movable portion based on the but one output signal of at least one of the sensors in the at least one sensor group, the multi-dimensional position including a planar position and a gap measurement.

10 Claims, 62 Drawing Sheets

(56) References Cited

U.S. PATENT DOCUMENTS

| | | |
|---|---|---|
| 3,697,992 A | 10/1972 | Kleptz et al. |
| 3,750,151 A | 7/1973 | Dill |
| 3,860,843 A | 1/1975 | Kawasaki et al. |
| 4,144,110 A | 3/1979 | Luc |
| 4,210,865 A | 7/1980 | Nikolaev et al. |
| 4,360,753 A | 11/1982 | Shannon |
| 4,547,678 A | 10/1985 | Metzner et al. |
| 4,556,886 A | 12/1985 | Shimizu et al. |
| 4,609,332 A | 9/1986 | Miki et al. |
| 4,628,499 A | 12/1986 | Hammett |
| 4,689,945 A | 9/1987 | Lattion et al. |
| 4,717,874 A | 1/1988 | Ichikawa et al. |
| 4,774,465 A | 9/1988 | Nilius |
| 4,874,998 A | 10/1989 | Hollis, Jr. |
| 4,904,937 A | 2/1990 | Takahashi et al. |
| 4,922,197 A | 5/1990 | Juds et al. |
| 4,956,945 A | 9/1990 | Ooshima |
| 4,992,733 A | 2/1991 | Griebeler |
| 5,003,260 A | 3/1991 | Auchterlonie |
| 5,015,998 A | 5/1991 | Ellis et al. |
| 5,092,453 A | 3/1992 | Bruke |
| 5,105,113 A | 4/1992 | Ishikura et al. |
| 5,120,034 A | 6/1992 | Van Engelen et al. |
| 5,124,863 A | 6/1992 | Koizumi et al. |
| 5,126,610 A | 6/1992 | Fremerey |
| 5,202,695 A | 4/1993 | Hollandsworth et al. |
| 5,204,621 A | 4/1993 | Hermann et al. |
| 5,210,490 A | 5/1993 | Munch et al. |
| 5,270,600 A | 12/1993 | Hasimoto |
| 5,285,154 A | 2/1994 | Burreson |
| 5,324,155 A | 6/1994 | Goodwin et al. |
| 5,334,892 A | 8/1994 | Chitayat |
| 5,351,004 A | 9/1994 | Daniels et al. |
| 5,386,738 A | 2/1995 | Havenhill |
| 5,444,368 A | 8/1995 | Horber |
| 5,450,009 A | 9/1995 | Murakami |
| 5,469,053 A | 11/1995 | Laughlin |
| 5,530,306 A | 6/1996 | Ueyama |
| 5,532,531 A | 7/1996 | Sakamoto |
| 5,550,413 A | 8/1996 | Bernus et al. |
| 5,555,715 A | 9/1996 | Paweletz et al. |
| 5,568,048 A | 10/1996 | Schroeder et al. |
| 5,574,364 A | 11/1996 | Kajimoto et al. |
| 5,589,769 A | 12/1996 | Krahn |
| 5,606,256 A | 2/1997 | Takei |
| 5,625,240 A | 4/1997 | Bernus |
| 5,633,545 A | 5/1997 | Albrecht et al. |
| 5,642,298 A | 6/1997 | Mallory et al. |
| 5,656,902 A | 8/1997 | Lowrance |
| 5,670,876 A | 9/1997 | Dilger et al. |
| 5,741,113 A | 4/1998 | Bacchi et al. |
| 5,753,991 A | 5/1998 | Couture et al. |
| 5,801,721 A | 9/1998 | Gandy et al. |
| 5,808,389 A | 9/1998 | Stephenson |
| 5,808,437 A | 9/1998 | Schob |
| 5,813,823 A | 9/1998 | Hofmeister |
| 5,818,137 A | 10/1998 | Nichols et al. |
| 5,838,121 A | 11/1998 | Fairbairn et al. |
| 5,886,432 A | 3/1999 | Markle |
| 5,899,658 A | 5/1999 | Hofmeister |
| 5,914,548 A | 6/1999 | Watanabe et al. |
| 5,924,975 A | 7/1999 | Goldowsky |
| 5,932,947 A | 8/1999 | Kim |
| 5,955,882 A | 9/1999 | Eisschiel et al. |
| 5,961,291 A | 10/1999 | Sakagami et al. |
| 6,015,272 A | 1/2000 | Antaki et al. |
| 6,018,881 A | 2/2000 | Spies |
| 6,049,148 A | 4/2000 | Nichols et al. |
| 6,054,851 A | 4/2000 | Masreliez et al. |
| 6,058,760 A | 5/2000 | Heyningen |
| 6,078,119 A | 6/2000 | Satoh et al. |
| 6,085,760 A | 7/2000 | Chodorow |
| 6,086,362 A | 7/2000 | White et al. |
| 6,096,231 A | 8/2000 | Schertler |
| 6,097,183 A | 8/2000 | Goetz et al. |
| 6,100,618 A | 8/2000 | Schoeb et al. |
| 6,100,681 A | 8/2000 | Tsuruta |
| 6,127,749 A | 10/2000 | Sogard |
| 6,144,132 A | 11/2000 | Nashiki |
| 6,147,421 A | 11/2000 | Takita et al. |
| 6,163,148 A | 12/2000 | Takada et al. |
| 6,175,174 B1 | 1/2001 | Takahashi |
| 6,176,668 B1 | 1/2001 | Kurita et al. |
| 6,189,404 B1 | 2/2001 | Hatake et al. |
| 6,191,415 B1 | 2/2001 | Stridsberg |
| 6,206,176 B1 | 3/2001 | Blonigan et al. |
| 6,208,045 B1 | 3/2001 | Hazelton et al. |
| 6,209,045 B1 | 3/2001 | Hasegawa et al. |
| 6,227,817 B1 | 5/2001 | Paden |
| 6,235,172 B1 | 5/2001 | Begin et al. |
| 6,244,835 B1 | 6/2001 | Antaki et al. |
| 6,246,233 B1 | 6/2001 | Griffen et al. |
| 6,249,067 B1 | 6/2001 | Schob et al. |
| 6,261,247 B1 | 7/2001 | Ishikawa et al. |
| 6,269,552 B1 | 8/2001 | Honda et al. |
| 6,285,097 B1 | 9/2001 | Hazelton et al. |
| 6,285,107 B1 | 9/2001 | Sawada et al. |
| 6,299,404 B1 | 10/2001 | Muka et al. |
| 6,324,134 B1 | 11/2001 | Ohtachi et al. |
| 6,326,750 B1 | 12/2001 | Marcinkiewicz |
| 6,384,500 B1 | 5/2002 | Chassoulier et al. |
| 6,414,742 B1 | 7/2002 | Korenaga et al. |
| 6,416,215 B1 | 7/2002 | Terentiev |
| 6,431,011 B1 | 8/2002 | Feller |
| 6,445,093 B1 | 9/2002 | Binnard |
| 6,447,265 B1 | 9/2002 | Antaki et al. |
| 6,447,266 B2 | 9/2002 | Antaki et al. |
| 6,448,760 B1 | 9/2002 | Neumann et al. |
| 6,471,459 B2 | 10/2002 | Blonigan et al. |
| 6,485,250 B2 | 11/2002 | Hofmeister |
| 6,485,531 B1 | 11/2002 | Schob |
| 6,498,451 B1 | 12/2002 | Boules et al. |
| 6,509,732 B1 | 1/2003 | Rhodes et al. |
| 6,522,130 B1 | 2/2003 | Lutz |
| 6,532,791 B2 | 3/2003 | Schmid et al. |
| 6,537,011 B1 | 3/2003 | Wang et al. |
| 6,557,957 B2 | 5/2003 | Nagata et al. |
| 6,559,567 B2 | 5/2003 | Schob |
| 6,563,306 B2 | 5/2003 | Sato |
| 6,573,088 B2 | 6/2003 | Gemmell et al. |
| 6,580,190 B2 | 6/2003 | Takasu |
| 6,617,739 B1 | 9/2003 | Kinoshita |
| 6,621,245 B2 | 9/2003 | Vaassen et al. |
| 6,625,517 B1 | 9/2003 | Bogdanov et al. |
| 6,629,883 B2 | 10/2003 | Katsuoka et al. |
| 6,642,711 B2 | 11/2003 | Kawate et al. |
| 6,650,079 B2 | 11/2003 | Binnard |
| 6,661,220 B1 | 12/2003 | Glehr |
| 6,690,159 B2 | 2/2004 | Burreson et al. |
| 6,691,074 B1 | 2/2004 | Moriya et al. |
| 6,698,737 B1 | 3/2004 | Blessing |
| 6,707,200 B2 | 3/2004 | Carroll et al. |
| 6,731,107 B2 | 5/2004 | Reverdy |
| 6,737,826 B2 | 5/2004 | Gilchrist |
| 6,781,524 B1 | 8/2004 | Clark et al. |
| 6,784,580 B2 | 8/2004 | Yashiro et al. |
| 6,800,833 B2 | 10/2004 | Gregor et al. |
| 6,803,758 B1 | 10/2004 | Nicholson |
| 6,809,450 B1 | 10/2004 | Morrison |
| 6,810,754 B2 | 11/2004 | May |
| 6,813,543 B2 | 11/2004 | Aalund et al. |
| 6,864,955 B2 | 3/2005 | Nishi et al. |
| 6,876,896 B1 | 4/2005 | Ortiz |
| 6,877,963 B2 | 4/2005 | Beyer et al. |
| 6,878,044 B2 | 4/2005 | Sakurai et al. |
| 6,879,063 B2 | 4/2005 | Frissen et al. |
| 6,879,076 B2 | 4/2005 | Long |
| 6,879,126 B2 | 4/2005 | Paden et al. |
| 6,909,281 B2 | 6/2005 | Gassman et al. |
| 6,916,231 B2 | 7/2005 | Wakabayashi |
| 6,917,136 B2 | 7/2005 | Thornton et al. |
| 6,927,505 B2 | 8/2005 | Binnard et al. |
| 6,952,086 B1 | 10/2005 | Krefta et al. |
| 6,989,647 B1 | 1/2006 | Lee |

(56) References Cited

U.S. PATENT DOCUMENTS

| | | |
|---|---|---|
| 6,991,710 B2 | 1/2006 | Harris et al. |
| 6,995,534 B2 | 2/2006 | Berroth et al. |
| 7,005,847 B2 | 2/2006 | Gassman et al. |
| 7,023,118 B1 | 4/2006 | Morrison |
| 7,030,528 B2 | 4/2006 | Morganet |
| 7,053,582 B2 | 5/2006 | Ueyama et al. |
| 7,067,952 B2 | 6/2006 | Neal |
| 7,070,398 B2 | 7/2006 | Olsen et al. |
| 7,075,197 B2 | 7/2006 | Korenaga |
| 7,087,143 B1 | 8/2006 | Schmidt et al. |
| 7,115,066 B1 | 10/2006 | Lee |
| 7,135,855 B2 | 11/2006 | Nyce |
| 7,164,120 B2 | 1/2007 | Strasser |
| 7,187,143 B2 | 3/2007 | Okada et al. |
| 7,196,604 B2 | 3/2007 | Sills et al. |
| 7,208,945 B2 | 4/2007 | Jones et al. |
| 7,211,918 B2 | 5/2007 | Migita et al. |
| 7,229,258 B2 | 6/2007 | Wood et al. |
| RE39,748 E | 7/2007 | Watanabe et al. |
| 7,245,047 B2 | 7/2007 | Vreugdewater et al. |
| 7,246,985 B2 | 7/2007 | Ferrara |
| 7,248,037 B2 | 7/2007 | Hara et al. |
| 7,262,527 B2 | 8/2007 | Neal |
| 7,264,430 B2 | 9/2007 | Bischof et al. |
| 7,292,656 B2 | 11/2007 | Kloper et al. |
| 7,315,164 B2 | 1/2008 | Hata et al. |
| 7,325,559 B2 | 2/2008 | Darut et al. |
| 7,339,370 B2 | 3/2008 | Reimer et al. |
| 7,352,553 B2 | 4/2008 | Kosaki et al. |
| 7,359,032 B2 | 4/2008 | Dansberg et al. |
| 7,371,306 B2 | 5/2008 | Davis et al. |
| 7,400,141 B2 | 7/2008 | Taniguchi et al. |
| 7,424,830 B2 | 9/2008 | Matsusaki et al. |
| 7,467,930 B2 | 12/2008 | Ozaki et al. |
| 7,508,099 B2 | 3/2009 | Korenaga |
| 7,518,273 B2 | 4/2009 | Kataoka et al. |
| 7,578,649 B2 | 8/2009 | Caveney et al. |
| 7,596,425 B2 | 9/2009 | Asa |
| 7,633,201 B2 | 12/2009 | Buhler et al. |
| 7,843,101 B2 | 11/2010 | Ito et al. |
| 7,897,025 B2 | 3/2011 | Inoue et al. |
| 7,906,959 B2 | 3/2011 | Frachon et al. |
| 8,052,504 B2 | 11/2011 | Kalenian et al. |
| 8,104,488 B2 | 1/2012 | Rye et al. |
| 2001/0036398 A1 | 11/2001 | Hofmeister |
| 2001/0044266 A1 | 11/2001 | Katsuoka et al. |
| 2002/0021423 A1 | 2/2002 | Korenata et al. |
| 2002/0041168 A1 | 4/2002 | Mann et al. |
| 2002/0060548 A1 | 5/2002 | Iwaji et al. |
| 2002/0070617 A1 | 6/2002 | Kanebako |
| 2002/0089324 A1 | 7/2002 | Miyata et al. |
| 2002/0097042 A1 | 7/2002 | Kawate et al. |
| 2002/0105241 A1 | 8/2002 | Carroll et al. |
| 2002/0135358 A1 | 9/2002 | Sager et al. |
| 2002/0145722 A1 | 10/2002 | Compter et al. |
| 2002/0149270 A1 | 10/2002 | Hazelton |
| 2003/0011338 A1 | 1/2003 | Gilchrist |
| 2003/0025413 A1 | 2/2003 | Takasu |
| 2003/0056815 A1 | 3/2003 | Sakai |
| 2003/0085676 A1 | 5/2003 | Binnard |
| 2003/0102721 A1 | 6/2003 | Ueta et al. |
| 2003/0102748 A1 | 6/2003 | Yashiro et al. |
| 2003/0107289 A1 | 6/2003 | Thornton et al. |
| 2003/0111912 A1 | 6/2003 | Binnard et al. |
| 2003/0183611 A1 | 10/2003 | Gregor et al. |
| 2003/0223853 A1 | 12/2003 | Caveney et al. |
| 2003/0236644 A1 | 12/2003 | Lara et al. |
| 2004/0021437 A1 | 2/2004 | Maslov et al. |
| 2004/0034988 A1 | 2/2004 | Neal |
| 2004/0056617 A1 | 3/2004 | Berroth et al. |
| 2004/0070300 A1 | 4/2004 | Fu |
| 2004/0072499 A1 | 4/2004 | Wakabayashi |
| 2004/0075426 A1 | 4/2004 | Wakiyama et al. |
| 2004/0124729 A1 | 7/2004 | Long |
| 2004/0151562 A1 | 8/2004 | Hofmeister et al. |
| 2004/0194565 A1 | 10/2004 | Okada et al. |
| 2004/0217667 A1 | 11/2004 | Popov |
| 2004/0261550 A1 | 12/2004 | Asa |
| 2004/0261944 A1 | 12/2004 | Wakabayashi |
| 2004/0263000 A1 | 12/2004 | Vreugdewater et al. |
| 2005/0002743 A1 | 1/2005 | Moriya et al. |
| 2005/0083496 A1 | 4/2005 | Dansberg et al. |
| 2005/0089422 A1 | 4/2005 | Ozaki et al. |
| 2005/0135942 A1 | 6/2005 | Wood et al. |
| 2005/0136694 A1 | 6/2005 | Inoue et al. |
| 2005/0151544 A1 | 7/2005 | Mahoney et al. |
| 2005/0184689 A1 | 8/2005 | Maslov et al. |
| 2005/0188798 A1 | 9/2005 | Bischof et al. |
| 2005/0194843 A1 | 9/2005 | Korenaga |
| 2005/0242576 A1 | 11/2005 | Darut et al. |
| 2005/0264119 A1 | 12/2005 | Carroll et al. |
| 2005/0265814 A1 | 12/2005 | Coady et al. |
| 2005/0269892 A1 | 12/2005 | Duff |
| 2006/0017340 A1 | 1/2006 | Kozaki et al. |
| 2006/0091759 A1 | 5/2006 | Migita et al. |
| 2006/0099063 A1 | 5/2006 | Pietrantono et al. |
| 2006/0113949 A1 | 6/2006 | Nishimura et al. |
| 2006/0125334 A1 | 6/2006 | Kataoka et al. |
| 2006/0125473 A1 | 6/2006 | Frachon et al. |
| 2006/0131967 A1 | 6/2006 | Kascak et al. |
| 2006/0164697 A1 | 7/2006 | Larson |
| 2006/0205553 A1 | 9/2006 | Lee |
| 2006/0219275 A1 | 10/2006 | Weber et al. |
| 2006/0238053 A1 | 10/2006 | Kascak et al. |
| 2006/0238063 A1 | 10/2006 | Neal |
| 2006/0275155 A1 | 12/2006 | Thibodeau |
| 2006/0279149 A1 | 12/2006 | Asper |
| 2007/0020081 A1 | 1/2007 | Gilchrist et al. |
| 2007/0024138 A1 | 2/2007 | Buhler et al. |
| 2007/0065144 A1 | 3/2007 | Hofmeister et al. |
| 2007/0120556 A1 | 5/2007 | Dufour et al. |
| 2007/0126304 A1 | 6/2007 | Ito et al. |
| 2007/0164697 A1 | 7/2007 | Cox et al. |
| 2007/0194787 A1 | 8/2007 | Takahashi et al. |
| 2007/0267920 A1 | 11/2007 | Korenaga |
| 2007/0269986 A1 | 11/2007 | Kalenian et al. |
| 2007/0295089 A1 | 12/2007 | Velinsky et al. |
| 2007/0299625 A1 | 12/2007 | Englert et al. |
| 2008/0011334 A1 | 1/2008 | Rye et al. |
| 2008/0067968 A1 | 3/2008 | Binnard et al. |
| 2008/0116881 A1 | 5/2008 | May |
| 2008/0120164 A1 | 5/2008 | Hassler |
| 2008/0121064 A1 | 5/2008 | Todorov |
| 2009/0243413 A1 | 10/2009 | Gilchrist et al. |
| 2010/0178135 A1 | 7/2010 | Laceky et al. |
| 2011/0025310 A1 | 2/2011 | Moura et al. |

FOREIGN PATENT DOCUMENTS

| | | |
|---|---|---|
| CN | 1360536 | 7/2002 |
| CN | 1457434 | 11/2003 |
| CN | 1976171 A | 6/2007 |
| EP | 0121084 | 10/1984 |
| EP | 0129731 | 1/1985 |
| EP | 0414127 | 2/1991 |
| EP | 0526903 | 2/1993 |
| EP | 0565746 | 10/1993 |
| EP | 0641061 | 3/1995 |
| EP | 0675824 | 10/1995 |
| EP | 0758157 | 2/1997 |
| EP | 0760244 | 3/1997 |
| EP | 0816701 | 1/1998 |
| EP | 0897476 A1 | 2/1999 |
| EP | 1176999 | 2/2000 |
| EP | 1052761 | 11/2000 |
| EP | 1054498 | 11/2000 |
| EP | 1081390 | 3/2005 |
| EP | 1732011 | 12/2006 |
| GB | 1552874 | 9/1979 |
| GB | 2035622 | 6/1980 |
| JP | 57-165702 | 10/1982 |
| JP | 60170702 | 9/1985 |
| JP | 61152304 | 7/1986 |
| JP | 61172077 | 8/1986 |

(56) References Cited

FOREIGN PATENT DOCUMENTS

| | | |
|---|---:|---|
| JP | 4024 | 6/1988 |
| JP | 6381299 | 6/1988 |
| JP | 1023468 | 1/1989 |
| JP | 1240268 | 9/1989 |
| JP | 2-36313 | 2/1990 |
| JP | 02193547 | 7/1990 |
| JP | 3178747 | 8/1991 |
| JP | 03125212 | 12/1991 |
| JP | 3276317 | 12/1991 |
| JP | 4209996 | 7/1992 |
| JP | 4308823 | 10/1992 |
| JP | 4333421 | 11/1992 |
| JP | 04-364752 | 12/1992 |
| JP | 5130762 | 5/1993 |
| JP | 05-346322 | 12/1993 |
| JP | 623687 | 2/1994 |
| JP | 3147568 | 9/1994 |
| JP | 7012091 | 1/1995 |
| JP | 07255158 | 3/1995 |
| JP | 7131966 | 5/1995 |
| JP | 8203977 | 8/1996 |
| JP | 8323505 | 12/1996 |
| JP | 09269007 | 10/1997 |
| JP | 10070865 | 3/1998 |
| JP | 0316241 | 12/1998 |
| JP | 11-30502 | 2/1999 |
| JP | 11166803 | 6/1999 |
| JP | 11257909 | 9/1999 |
| JP | 2000131006 | 5/2000 |
| JP | 2001-074006 | 3/2001 |
| JP | 2001156150 | 6/2001 |
| JP | 2001224154 | 8/2001 |
| JP | 2001351874 | 12/2001 |
| JP | 2002511571 | 4/2002 |
| JP | 2004245703 A | 9/2004 |
| JP | 200368620 | 10/2004 |
| JP | 2005223997 | 8/2005 |
| JP | 2005534176 | 11/2005 |
| JP | 200613371 | 6/2006 |
| JP | 2006-214736 | 8/2006 |
| JP | 02034178 | 9/2006 |
| JP | 200614592 | 12/2006 |
| JP | 2006014592 | 12/2006 |
| JP | 2007024694 A | 2/2007 |
| JP | 2008516457 | 5/2008 |
| JP | 2008196894 | 8/2008 |
| JP | 4712379 | 6/2011 |
| WO | 8912907 | 12/1989 |
| WO | 9414653 | 7/1994 |
| WO | 9742413 | 11/1997 |
| WO | 9837335 | 8/1998 |
| WO | 9904481 | 1/1999 |
| WO | 9953266 | 10/1999 |
| WO | 0102211 | 1/2001 |
| WO | 0102721 | 1/2001 |
| WO | 0231372 | 4/2002 |
| WO | 0241473 | 5/2002 |
| WO | 03029651 | 4/2003 |
| WO | 2004098677 | 11/2004 |
| WO | 2005003565 | 1/2005 |
| WO | 2005030296 | 4/2005 |
| WO | 2005114848 | 12/2005 |
| WO | 2006053384 | 5/2006 |
| WO | 2007029623 | 3/2007 |
| WO | 2007029623 A1 | 3/2007 |
| WO | 2007068496 | 6/2007 |
| WO | WO2007068496 | 6/2007 |
| WO | 2009003186 | 12/2008 |
| WO | WO2009003186 | 12/2008 |

OTHER PUBLICATIONS

Taiwan IPO Search Report, Application No. 097124034, dated Aug. 1, 2013.

Taiwan IPO Search Report, Application No. 097124035, dated Jul. 31, 2013.

Arreola, Rafael Becerril, Nonlinear Control design for a Magnetic Leviatation System, Thesis for Master of Applied Science, 2003, http://www.control.utoronto.ca/lab/references/Rafael_Becerril_03.pdf.

Arreola, Rafael Becerril, Output feedback nonlinear control for a linear motor in suspension mode, Automatica, 2004, Elsevier, 2004.

Benarous et al., Sinusodial Shaft Position Encoder, Mar. 31-2 Apr. 3, 2004, IEEE Conference Publication 2004, No. 498, pp. 132-136, IEEE International Conference on Power Electronics, Machines and Drives.

Carpenter, C.J. Electromagnetic induction in terms of Maxwell force instead of magnetic flux, Science, Measurement and Technology, Lee Proceedings, Jul. 199, vol. 146, Issue 4, pp. 182-193. (abstract) IEEE [online].

Cho et al. Analysis and design of synchronous permanent magnet planar motors, Cho et al., Power Engineering Review, Jul. 2002, vol. 22, pp. 52-52, IEEE.

Duan et al., Analysis and comparison of two-dimensional permanent magnet array for planar motor, Magnetics, IEEE Transactions, Nov. 2004, vol. 40, pp. 3490-3494.

Etzaniz et al., Design of Magnetically levitated 2D drive, COMPEL, 2006, vol. 25, pp. 732-740, Emerald Group Publishing Ltd.

Gallo, C.A., Halbach Magnetic Rotor Development, NASA Glenn Research Center, Report No. NASA1TM-2008-215056; E-16281, Feb. 2008, p. 27, CAS!

Goa et al., A surface motor-drive planar motion stage integrated with an XYO(z) surface encoder for precision positioning, Precision Engineering Journal of International Societies for Precision Engineering and Nanotechnology, 2004, vol. 28, pp. 329-337.

Jang et al., Design and analysis of helical motion permanent magnet motor with cylindrical Halbach array, IEEE Transactions, Sep. 2003, vol. 39, pp. 3007-3009.

Jansen et al., Magnetically levitated planar actuator with moving magnets, IEEE International Electric Machines and Drives Conference, 2007, pp. 272-278, IEEE.

Kawato et al. A Novel Multi-DOF Precision Positioning Methodology Using Two-Axis Hall-Effect Sensors, 2005 American Control Conference, 1996, vol. 1, pp. 471-478, San Diego, CA, IEEE.

Kim et al., Analysis and implementation of a tubular motor with Halbach magnetarray, Industry Application Conference, 1996, vol. 1, pp. 471-478, San Diego, CA, IEEE.

Kim et al., Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.

Konkola et al., Electromagnetic design of a low-fringing-field magnetic bearing stage for electron beam lithography: Special issue on magnetic bearing, JSME international journal, Series C, Mechanical Systems, 2003, vol. 46, pp. 370-377.

Park et al. Analysis and Control of 2-D of Magnetic Levitation Stage Using Force Decoupling Theorem, SICE-ICASE 2006, pp. 1091-1095.

Popovic et al., A New CMOS Hall Angular Position Sensor, Technisches Messen, 2001, pp. 286-291, vol. 68, No. 6, June, Swiss Fed. Institute Tech., Lausanne, Switzerland.

Thornton et al., The MangeMotion Maglev System M3, TRB 2003 Annual Meeting CD-ROM, pp. 1-15, 2003.

Precision Engineering, The Long-Range Scanning Stage: A Novel Platform for Scanned-Probe Microscopy, Journal of the International Societies for Precision Engineering and Nanotechnology, 2000, pp. 191-209, vol. 24, Elsevier Science, Inc., United States.

Rajagopal et al., Static Torque Profiles of a Hybrid Stepper Motor Having Eccentricity Between Stator and Rotor Axes, May 15, 2003, pp. 8701-8703, vol. 93, No. 10, A.I.P., Journal of Applied Physics, United States.

Schott et al., A New Two-Axis Magnetic Position Sensor, 2002, pp. 911-915, IEEE.

Wereb, J.A., Sine-Cosine Rotation Sensor for 360 Degree Angle Measurement Sensors, 995, pp. 40-41, vol. 122, pp. 573-576, ASME.

Yan et al., Coding of Shared Track Grey Encoder, Journal of Dynamic Systems, Measurement and Control, vol. 122, p. 573-576, ASME.

(56) References Cited

OTHER PUBLICATIONS

Zhang et al., A Study of the Rotor Eccentricity Compensation of Bearingless Induction Motor, Jun. 2004, pp. 148-150, 164 and 201, vol. 8, No. 2, Editorial Board of Electric Machines & Control, China.
Chinese Search Report, Application No. 08801046679 dated Sep. 27, 2012.
International Preliminary Report on Patentability, PCT/US08/168682, Aug. 12, 2009, 8 pages.
International Preliminary Report of Patentability dated Sep. 11, 2009; Application PCT/US08/68160.
International Preliminary Report of Patentability dated Sep. 22, 2009; Application PCT/US08/68167.
International Preliminary Report of Patentability dated Dec. 10, 2009; Application PCT/US08/68680.
International Preliminary Report of Patentability dated Jan. 5, 2010; Application PCT/US08/68684.
International Preliminary Report of Patentability dated Jan. 19, 2010; Application PCT/US08/070346.
International Preliminary Report of Patentability dated Jan. 25, 2011; Application PCT/US08/68661.
International Search Report, PCT/US2008/068670, Sep. 2, 2008, 1 page.
International Search Report, PCT/US2008/068682, Sep. 3, 2008, 1 page.
International Search Report, PCT/US2008/068680, Sep. 3, 2008, 2 pages.
International Search Report, PCT/US08/68160, Sep. 11, 2008, 1 page.
International Search Report, PCT/US08/68167, Sep. 11, 2008, 1 page.
International Search Report, PCT/US/2008/070346, Oct. 7, 2008.
International Search Report, PCT/US08/68684, Oct. 9, 2008, 1 page.
International Search Report, PCT/US08/68661, Oct. 22, 2008, 1 page.
Taiwan IPO Search Report, Application No. 097124035 dated Jul. 31, 2013.
Taiwan IPO Search Report, Application No. 097124039 dated Aug. 1, 2013.

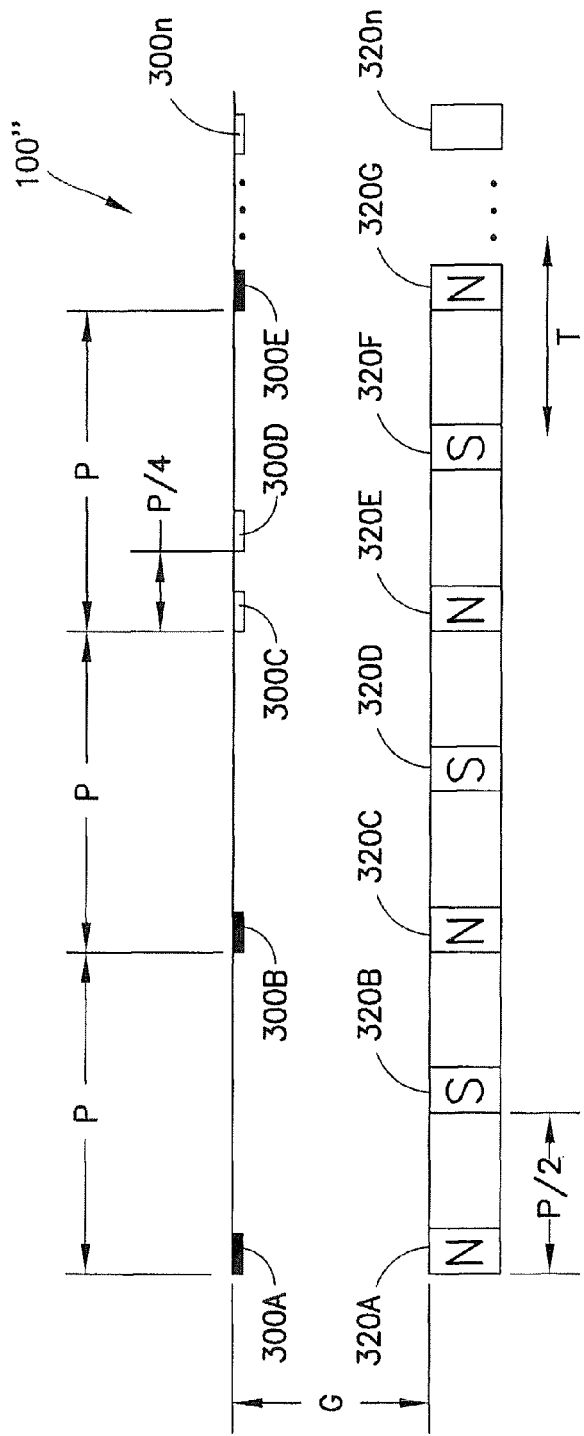
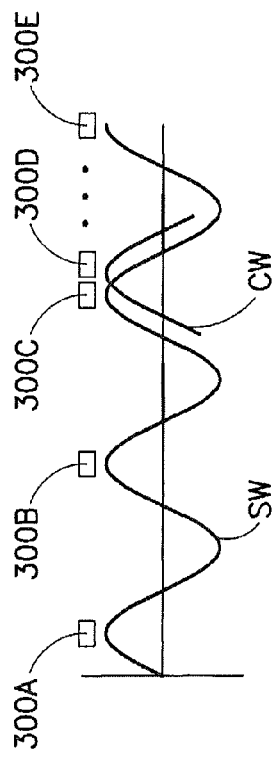
FIG.3A
FIG.3B

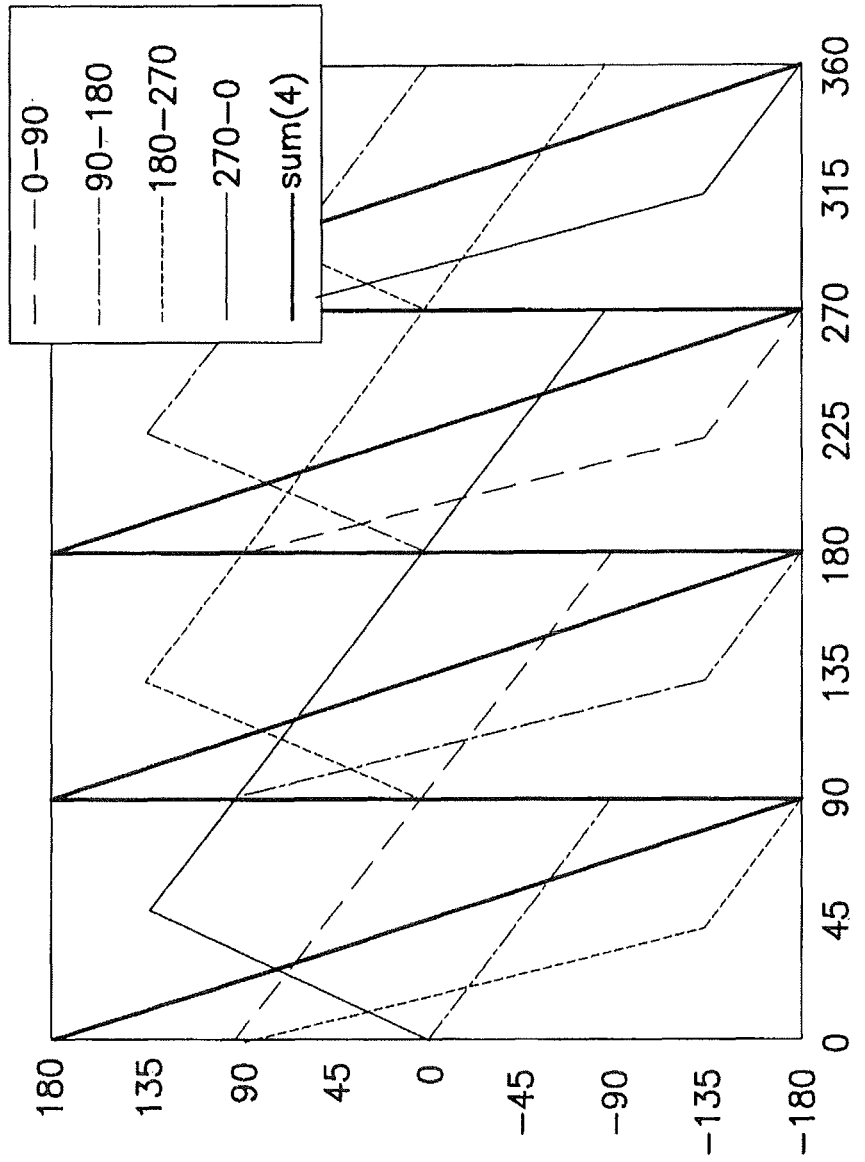

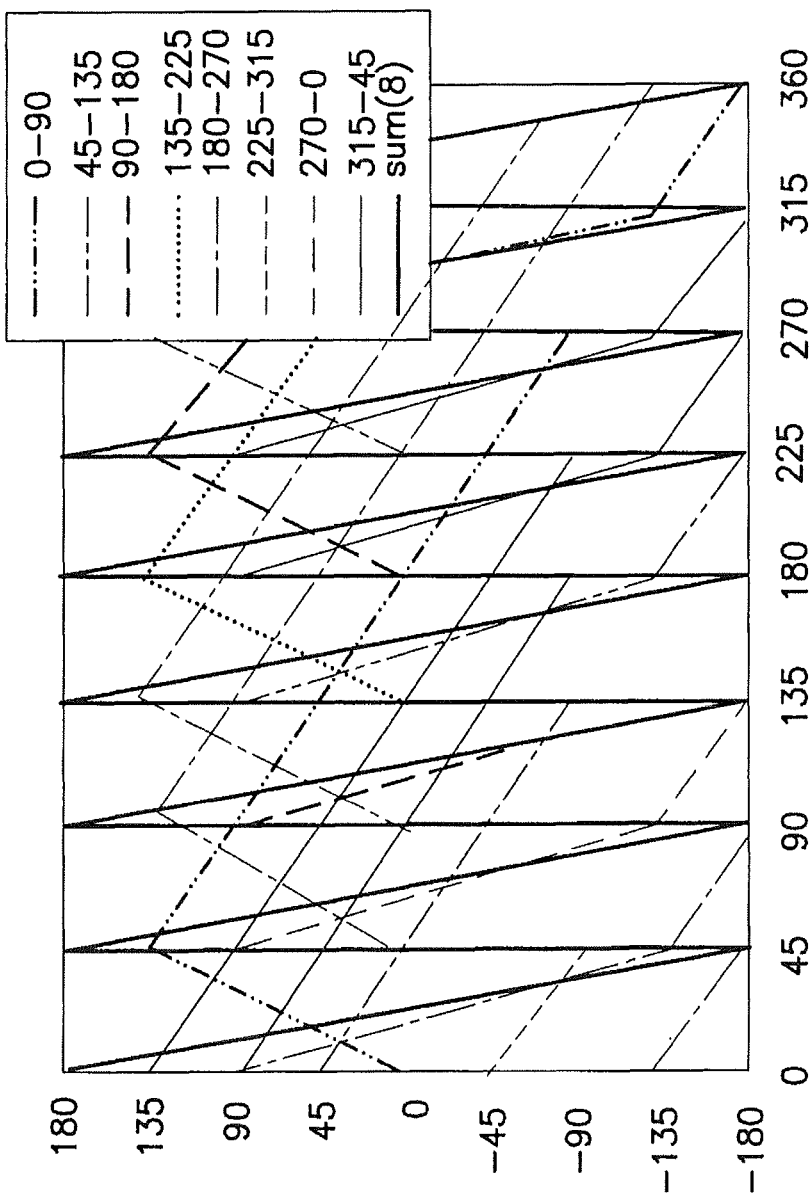

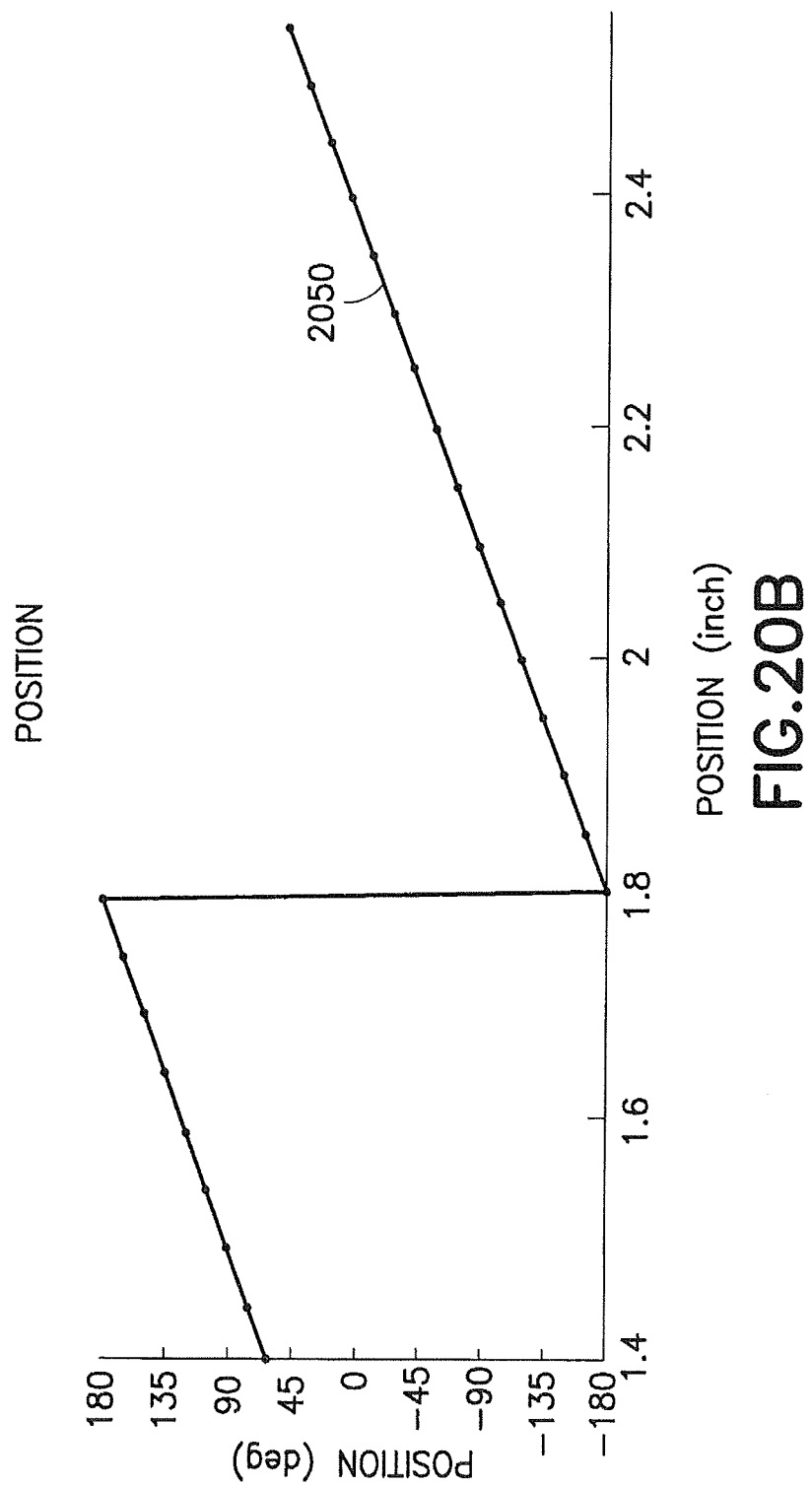

| | RMS, GAUSS | σ GAUSS | WEIGH, lb 4 PLATENS | EFFICIENCY, a.u. |
|---|---|---|---|---|
| DIAMOND | 1300 | 45 | 6.9 | 4 |
| DIAMOND (50 deg) | 1030 | 4 | 4.1 | 60 |
| CONE (60 deg) | 1050 | 4 | 3.8 | 72 |

MULTIPLE DIMENSION POSITION SENSOR

CROSS-REFERENCE TO RELATED APPLICATION(S)

This application is a continuation of U.S. patent application Ser. No. 12/163,716, filed on Jun. 27, 2008 and claims the benefit of U.S. Provisional Patent Application No. 60/946,542, filed on Jun. 27, 2007, the disclosures of which are incorporated by reference herein in their entireties.

BACKGROUND

1. Field

The present embodiments relate to position sensors and, more particularly, to position sensors for detecting a position of an object in multiple dimensions.

2. Brief Description of Related Developments

A number of methods exist for determining the position of a moving object. For example, there are vehicle guidance systems that use radar signals that interact with stripes on a roadway to determine the position of an automobile. Other position systems utilize wireless radio communications. However, both of these systems require a source of power to be available on the moving object. The radio waves are also subject to degradation from intervening structures and electrical signals.

Position may also be determined by, for example a linear variable differential transformer (LVDT) is a displacement transducer which utilizes a single primary and two secondary windings wound around a cylindrical bobbin. A movable nickel-iron core or armature is positioned inside the windings and the movement of the core is measured to obtain the position of the movable object. Hall effect sensors may be used in a similar manner to measure displacement. Generally LVDTs and Hall effect sensors are used to measure finite displacements such as the displacement of linear actuators and pistons.

For high precision positioning systems such as steppers, suspension and/or scanning stages and the like, conventional methods of position measurement use capacitive, inductive, optical and laser sensors. These sensors generally provide high resolution coupled with low positioning noise. However, the overall cost, limitations in travel range and desired number of degrees of freedom narrow the field of their applications.

By way of example, in conventional feedback devices employing periodic signals, such as sine and cosine signals, that are produced by the sensors are routed to an analog to digital converter (ADC) of, for example, a motor controller where the signals are processed in the digital domain for determining the position of an object. However, the sine/cosine period and ADC resolution may not be sufficient to produce the desired position resolution for certain applications that demand a high degree of position resolution.

It would be advantageous to be able to determine both two dimensional position and gap width measurements using the same sensors and magnets for both measurements. It would also be advantageous to provide a cost effective, high resolution absolute encoder. It would be further advantageous to increase the resolution of a position feedback device from a base resolution of a motor controller and/or encoder.

BRIEF DESCRIPTION OF THE DRAWINGS

The foregoing aspects and other features of the disclosed embodiments are explained in the following description, taken in connection with the accompanying drawings, wherein:

FIG. 3A illustrates yet another schematic view of a position measurement system in accordance with an exemplary embodiment;

FIG. 3B illustrates output signals from sensor components of the position measurement system in FIG. 3A in accordance with an exemplary embodiment;

FIGS. 12A and 12B illustrate sensor periods produced by different numbers of sensors over one magnetic pitch in accordance with exemplary embodiments;

FIGS. 20A-20C represent graphs of magnetic field geometry of yet another magnetic platen in accordance with an exemplary embodiment;

DETAILED DESCRIPTION OF THE EXEMPLARY EMBODIMENT(S)

Figure 1:
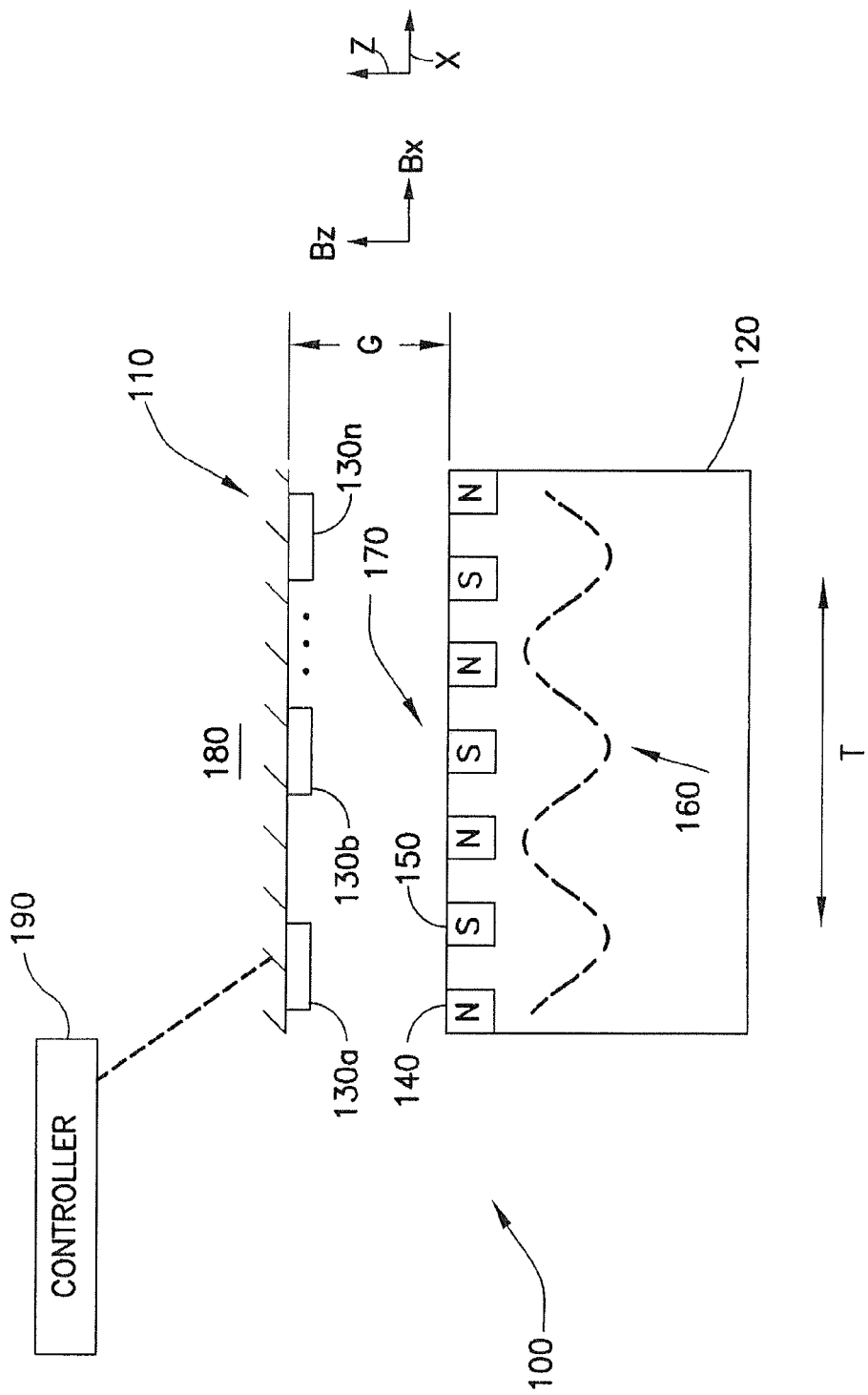
FIG. 1 illustrates a schematic view of a portion of a position measurement system in accordance with an exemplary embodiment.

FIG. 1 is a schematic illustration of an exemplary configuration of a sensor 100 for simultaneous measurements along multiple axes in accordance with an exemplary embodiment. Although the exemplary embodiments will be described with reference to the drawings, it should be understood that the exemplary embodiments can be embodied in many alternate forms. In addition, any suitable size, shape or type of elements or materials could be used.

The exemplary embodiments provide a sensor or sensor system 100, such as may be used in a closed loop control system, configured to provide, for example, unlimited length positional measurement at least along a first axis (such as disposed in a horizontal plane), and measurement along at least another axis, for example an axis substantially orthogonal or angled relative to the first axis such as a gap width as will be described below. The sensors of the sensor system may be simple and inexpensive single axis sensors having but one output corresponding to the sensor's single axis of measurement. The output of each of the single axis sensors corresponds to a sensed variance of, for example, a magnetic field (or any other field or phenomenon capable of being sensed by the sensors) along but one axis. These sensors that provide a single output from a single axis measurement are referred to herein for exemplary purposes as linear or single axis sensors. The sensor system 100 may include one or more single axis sensor units arranged along a path of travel of an object where each of the sensor units outputs a single signal in response to the movement of the object as will be described in greater detail below. The but one output of each single axis sensor unit is processed in such as way (as will be described in greater detail below) to produce, for example, a position measurement along one or more axes (from a measurement along but one axis) for the object adjacent to or in the vicinity of a respective sensor unit. As will be described below the individual single axis sensors may be arranged in any suitable manner so that position measurements may be simultaneously taken along any suitable axes. As a non-limiting example, the sensor 100 may be utilized in a transport system having magnetically levitated transports or platens such as that disclosed in United States Patent Publication No. 2004/0151562, which is incorporated herein by reference in its entirety. In alternate embodiments the sensor 100 may be utilized in any suitable transport system. The position measuring systems described herein may measure the transport's position along a direction of travel having any suitable distance (e.g. the X-axis), the transport's position along a second direction of travel having any suitable distance (e.g. the Z-axis), and/or the gap width G between, for example the magnetic platen 170 and a fixed surface 180 (e.g. the Y-axis). It is noted that the references made with respect to the X, Z and Y axes are made for exemplary purposes only and that position measurements described herein may equally apply to other suitable axes including, but not limited to, rotational axes. It should be realized that the exemplary sensors, using the single axis position sensors disclosed herein, can be utilized to sense the position of any suitable movable object, including but not limited to, objects that are movable in one dimension or multiple dimensions, including but not limited to, transports, actuators and any suitable drive system components. The signals produced by the position measuring sensors may be used for motor commutation for driving, for example, a transport or any other suitable movable object, from a first location to a second location. It should be realized that the exemplary embodiments described herein are not limited to utilization with motors but may also be utilized in any suitable device that requires single or multidimensional position information.

As can be seen in FIG. 1, in one exemplary embodiment, the sensor 100 may be configured to sense features of a magnetic platen 170, and may include one or more sensor groups 130a-130n. The sensor groups may include one or more single axis sensors as will be described below. The magnetic platen 170 may include one or more magnets 140, 150, arranged for example in a line or a grid, where the poles of the magnets are arranged in an alternating configuration (e.g. north-south-north-south, etc.) as can be seen in FIG. 1. The alternating poles of the magnets 140, 150 will produce a signal having a wave pattern 160, such as for example a sine or cosine pattern (e.g. a sinusoidal signal) or any other suitable pattern, as the magnets pass by the sensors 130 as will be described in greater detail below. The magnets 140, 150 may be any suitable magnets having any suitable field strength. In one exemplary embodiment the magnets may be permanent magnets such that the magnetic platen 170 does not require any power to be transferred to the platen 170 for position measurements. In alternate embodiments the magnets may be electromagnets. In still other alternate embodiments the platen 170 may include any suitable field generating apparatus that is capable of being sensed by the sensors 130a-130n. The platen 170 may include any suitable number of magnets having any suitable configuration. For example, the platen 170 may be the platen of a linear motor of any desired type, and as noted above, the magnets disposed on the platen may be permanent magnets of the motor and may be arranged in a straight line, or there may be multiple rows and/or columns of magnets, or the magnets may be in a staggered configuration, etc. The platen 170 may be affixed to an object 120 whose position is to be measured. In alternate embodiments the platen 170 and the object 120 may be one in the same. The object 120 may be any suitable object including, but not limited to, a transport cart, a piston/piston rod, an actuator, an end effector of a robot, a drive shaft, a motor rotor or any other object whose position is to be measured.

The sensors 130a-130n, may be any suitable single axis sensors including, but not limited to, Hall effect sensors, inductive sensors and/or capacitive sensors. In one exemplary embodiment, the sensors 130a-130n may be generally similar to each other. Each sensor may for example be capable of sensing variances along a single axis in the field (e.g. magnetic) generated by the magnet array of the platen. The output of the sensor may reflect the variance along the single axis sensed by the sensor, and hence, in the exemplary embodiment described, the sensor(s) may be referred to a linear or single axis sensors. The sensors 130a-130n may be placed, for example, along some component of the object's direction of travel T. It is noted that the direction of travel may include any suitable number of dimensions such as for example, the X, Y, Z direction (or any combination thereof) in a Cartesian coordinate system or R, θ (or any combination thereof) in a polar coordinate system. In alternate embodiments the direction(s) of travel may correspond to any suitable coordinate system. Any suitable number of sensors may be placed along the direction(s) of travel to accommodate any suitable range of travel. The sensors 130a-130n may be placed at predetermined distances along the direction(s) of travel as will be described in greater detail below so that the position of the object 120 can be determined. The sensors 130a-130n may be connected to a controller 190 which may be configured to receive at least the sensor output and calculate, for example, a two dimensional position of the object 120 along the direction of travel based on the single axis outputs and the predetermined location of the sensors 130a-130n. In alternate embodiments the controller may calculate the position of the object in more or less than two dimensions. The controller may also calculate the gap width G based on, for example, the strength of the magnetic field (e.g. flux density) produced by, for example, the magnetic platen 170 and/or amplitude of the signals output by the sensors. The controller 190 may include software and computer programs incorporating the process steps and instructions described herein and may utilize storage devices (e.g. any suitable computer readable medium) with computer readable program code for carrying out, for example the calculations described herein.

The exemplary embodiments described herein may allow for accurate positioning of an object over short or long distances, such as between, for example, FABS (e.g. fabrication facilities) in a manufacturing facility or between a transport cart and a load port to a processing station as will be described in greater detail below. In other exemplary embodiments, the position measuring systems described herein may be used in any suitable part of, for example, a facility where objects are transported such as with any suitable automated material handling system.

Figure 2A:
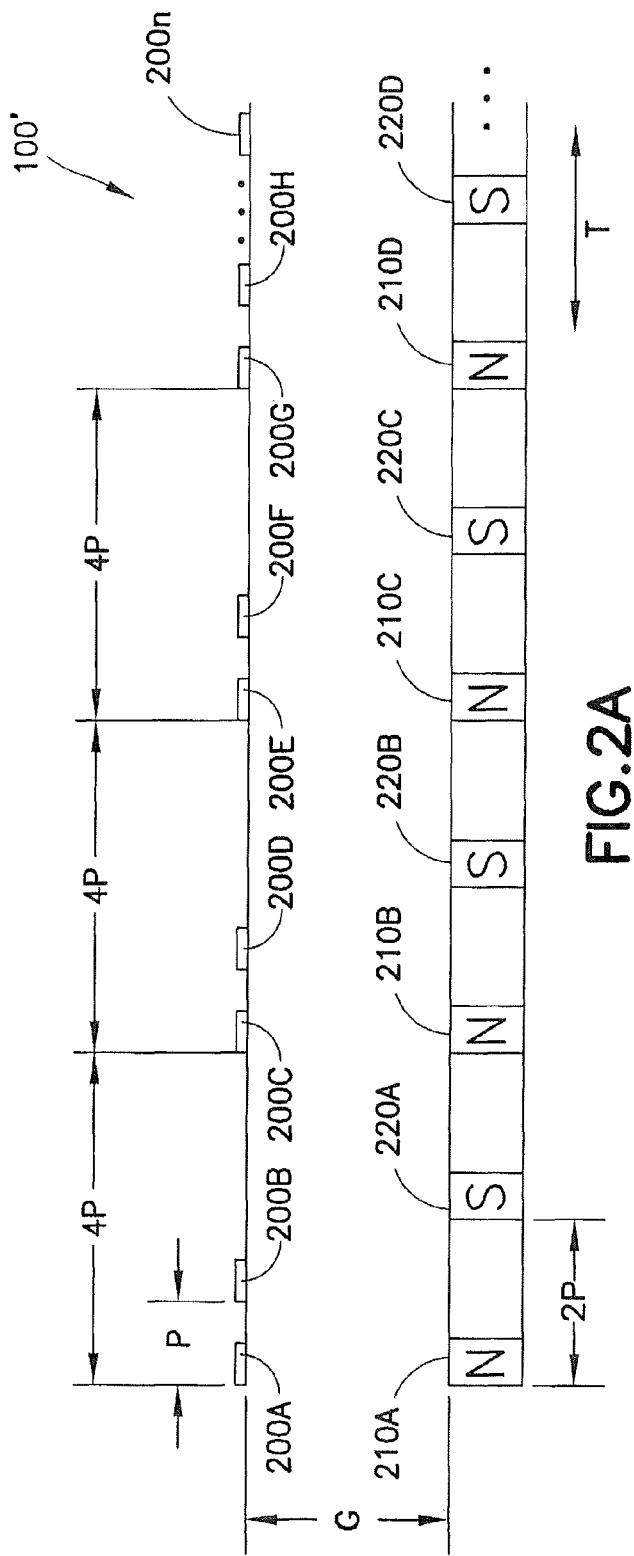
FIG. 2A illustrates another schematic view of a portion of a position measurement system in accordance with an exemplary embodiment.

Referring also to FIG. 2A, an exemplary configuration of sensors 100' is shown in accordance with an exemplary embodiment. In this exemplary embodiment pairs of single axis sensors are placed along the object's 120 direction of travel T. In this exemplary embodiment the sensors 200A-200n may be placed substantially along or collinear with the direction of travel. For example, magnetic sensors 200A, 200B form a first pair or doublet of sensors, sensors 200C, 200D form a second pair and so on. In alternate embodiments, the sensors 200A-200n may be staggered along the direction of travel with some of the sensors being located above and/or below the other sensors. In other alternate embodiments the sensors 200A-200n may have any suitable configuration. The sensors 200A-200n may be any suitable sensors including, but not limited to, for example, single axis Hall effect sensors, inductive sensors and capacitive sensors as described above.

In this exemplary embodiment the sensors in each pair of sensors or sensor doublet are spaced apart a predetermined distance or pitch P. Each doublet is spaced apart a distance of about four times the pitch P or 4P. In alternate embodiments the sensors 200A-200n may have any suitable spacing. The pairs of sensors 200A-200n are opposed by magnetic pole pieces or magnets 210A-210D, 220A-220D that are attached to or are otherwise part of the moving object 120. It should be realized that any suitable magnetic field generator may be used and that a magnet does not have to include both north and south poles. In this example, the poles of the magnets 210A-210D, 220A-220D opposite the sensors 200A-200n are arranged in an alternating configuration. For example, the north pole of the magnets 210A-210D is exposed to the sensors 200A-200n and the south pole of the magnets 220A-220D is exposed to the sensors 200A-200n. In the exemplary embodiment, the single axis sensors may be oriented to register variance in the normal component $B_Z$ (e.g. in the direction of the air gap) between the platen and the reference frame, See FIG. 1) of the field generated by the magnets, or may be oriented to register variance in the parallel component $B_X$ of the field. The alternating poles of the magnetic pole pieces 210A-210D, 220A-220D may produce a sinusoidal type sensor output pattern as the magnets 210A-210D, 220A-220D are moved by the sensors 200A-200n. In alternate embodiments the magnets may be arranged in any suitable configuration. In this exemplary embodiment the magnets 210A-210D, 220A-220D are spaced apart from each other at a distance which is about twice the pitch P or 2P. In alternate embodiments the magnetic pole pieces 210A-210D, 220A-220D may have any suitable spacing.

Figure 2C:
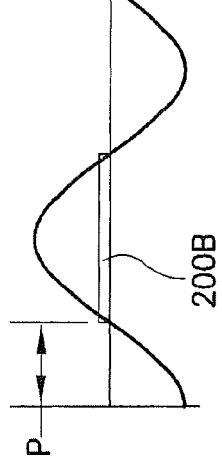
FIGS. 2B and 2C illustrates output signals from sensor components of the position measurement system in FIG. 2A in accordance with an exemplary embodiment.
Figure 2B:
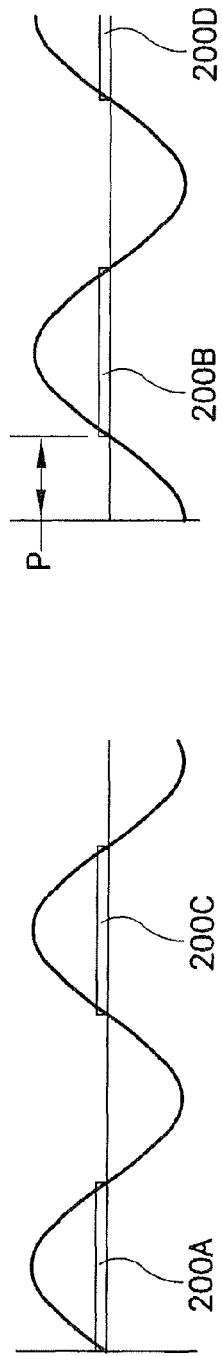

The spacing of sensors 200A-200n and the magnets 210A-210D, 220A-220D as described above may produce a sine/cosine relationship between the two sensor output signals that make up each sensor doublet as can be seen in FIGS. 2B and 2C. As a non-limiting example, sensor 200A may produce the sine wave shown in FIG. 2B while sensor 200B produces the cosine wave shown in FIG. 2C or vice versa. The sensor output signals can be used, for example, by programming in controller 190, to interpolate the position of the object 120 with respect to the sensors 200A-200n. For example, when an angle determined by the arctangent of the ratio of the two signals (e.g. one output signal from each sensor in the doublet) of, for example, sensors 200A, 200B is taken, an interpolated position of the object 120 can be determined which is proportional to a fraction of the distance 4P between the sensor pairs. Because each sensor doublet is located at a predetermined distance the interpolated position can be subtracted from or added to the predetermined distance to obtain the position of the object 120. For example, if sensor doublet 200A, 200B is located at distance C and the interpolated position between sensor doublet 200A, 200B and 200C, 200D is determined to be two times the pitch or 2P the position of the object 120 would be, for example, the distance C plus the position 2P (i.e. C+2P).

In the exemplary embodiment, the controller 190 may be programmed to determine the normal distance Z between platen and reference frame (e.g. gap width, See FIG. 1) using the signals from the single axis sensors 200A-200n. The gap width G between the sensors 200A-200n and the magnetic pole pieces 210A-210D, 220A, 220D (and thus the object 120 to which the magnets are mounted) can be determined by, for example, calculating the square root of the sum of the squares of the two sensor signals output by each sensor doublet to obtain the magnetic flux density in the gap. In alternate embodiments, any suitable calculation may be used to calculate the gap. The magnetic flux density may allow the determination of the distance G between the sensors 200A-200n and the magnetic pole pieces 210A-210D, 220A-220D. Thus, as may be realized, in the exemplary embodiment, the signals from at least one doublet of single axis sensors 20A-200n (e.g. oriented to sense field variation along a single common axis), the signals representing field variation along a single axis (see for example, FIGS. 2B-2C), are processed by the processor 190 to determine multi-axis position (e.g. position change along two or more axes, such as (X, Z)) of the platen. In alternate embodiments the gap width G may be determined in any suitable manner. For example, the extent or width of the magnetic gap G can be obtained by several methods including, but not limited to, the use of a look up table including measured flux versus distance and by knowledge of the sensor sensitivity to flux along with the magnet operating point on the demagnetization curve. In the exemplary embodiment, signals from doublets or adjacent sensors have been used for example purposes, and in alternate embodiments signals from any desired sensor doublets may be used. The processor 190 may be configured to calculate the gap G as described in greater detail below.

Depending on the number of sensors 200A-200n the resolution of the sensor 100' can be calculated as follows for an N-bit sensor:

$$\text{resolution} = \frac{4P}{10^N} \quad [1]$$

Where N is the number of bits. The resolution of the position measuring systems described herein may be affected, for example, by the uncertainty of measurement caused by environmental analog noise and the number of bits (Analog/Digital bits) output by the system. As may be realized the spacing or pitch between the sensors 200A-200n (i.e. the distance P between each sensor in the doublet and the distance of about 4P between the doublets) and the spacing between the magnets 210A-210D, 220A-220D (i.e. the distance of about 2P) can be scaled up or down to increase or decrease the resolution of the sensor 100'.

In operation the line of sensors 200A-200n may be sequentially scanned for output by the controller 190 with the first sensor being scanned, such as for example sensor 200A, for determining the base distance along the scanned line of sensors. This scanning of the sensors 200A-200n may allow for absolute position measurement of the object 120 with a high or maximized degree of resolution.

Figure 47:
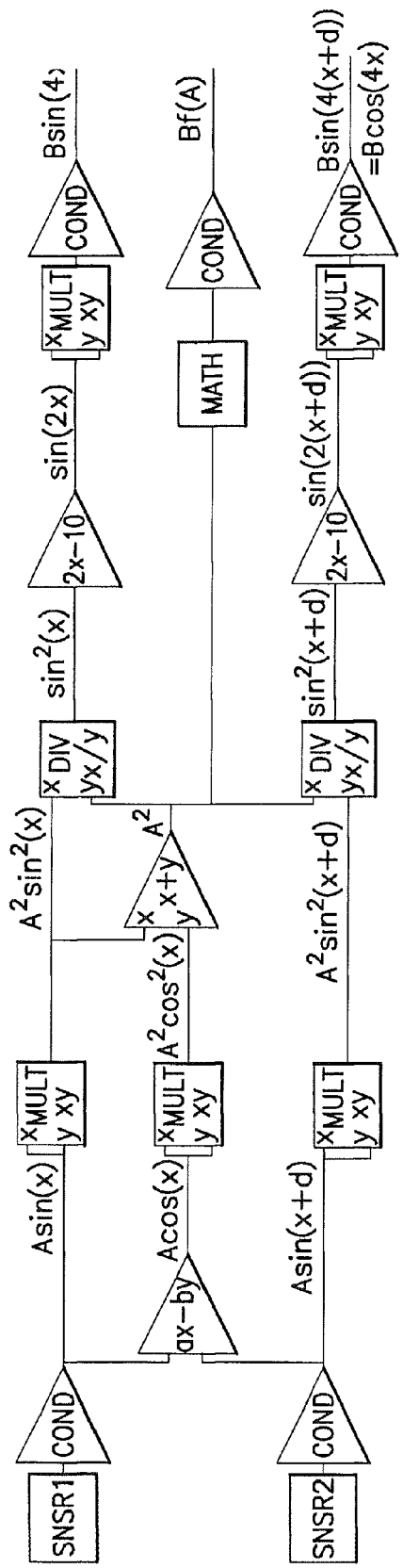
FIG. 47 illustrates an exemplary processor in accordance with an exemplary embodiment.
Figures 1, 47A:
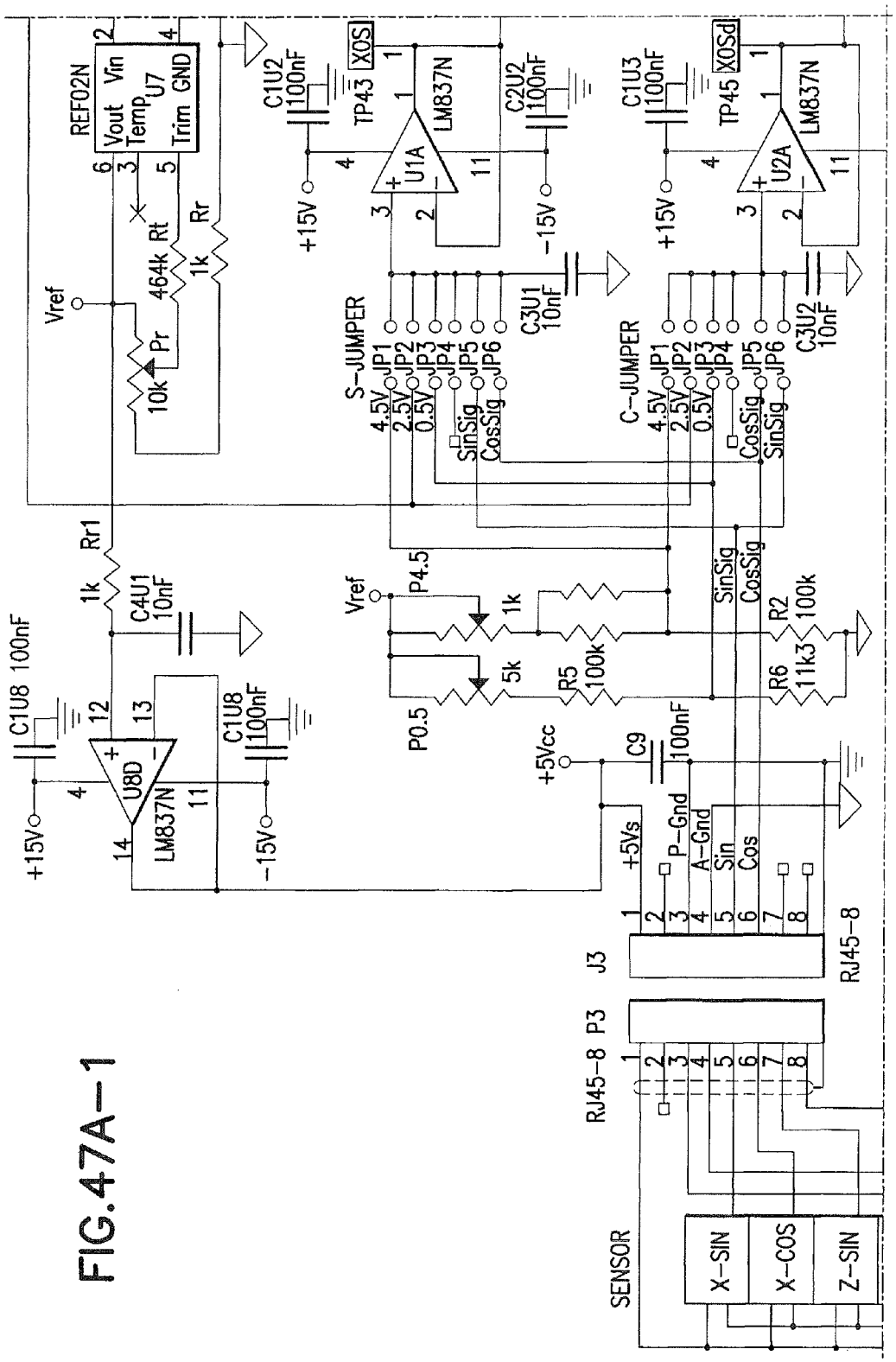
FIG. 47A illustrates an exemplary electrical schematic of the block diagram of FIG. 47 in accordance with an exemplary embodiment.
Figures 2, 47A:
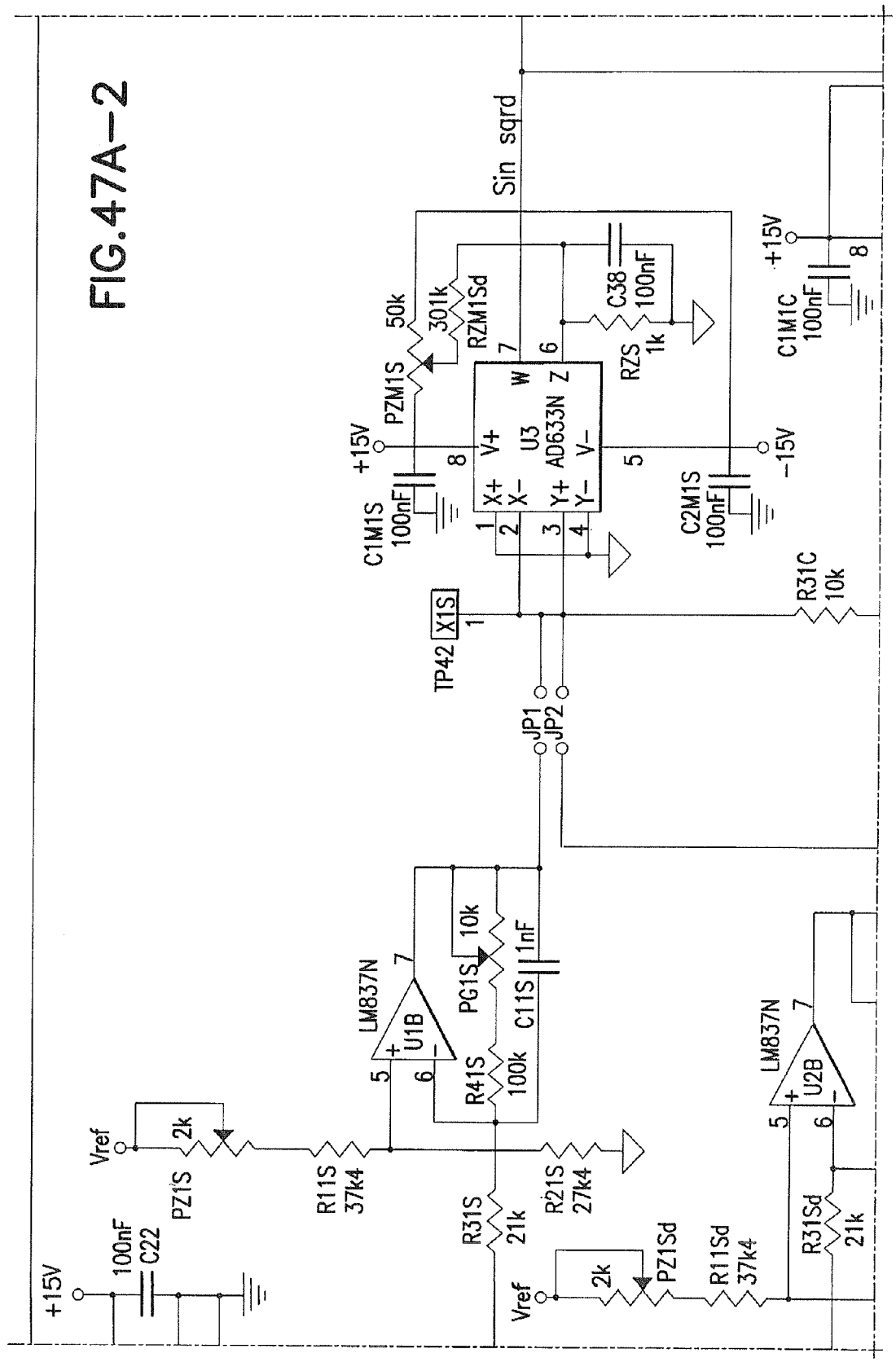
Figures 3, 47A:
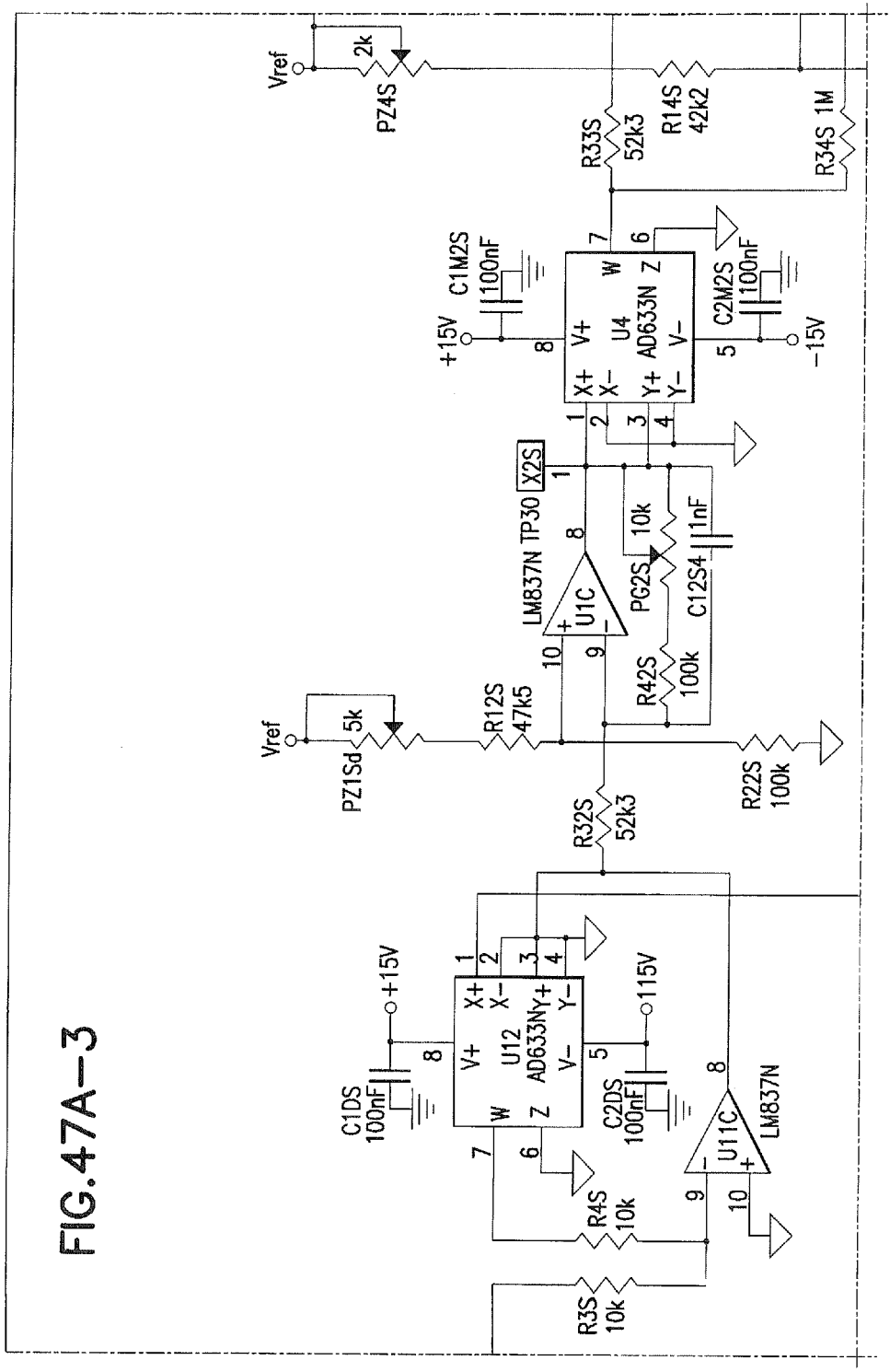
Figures 4, 47A:
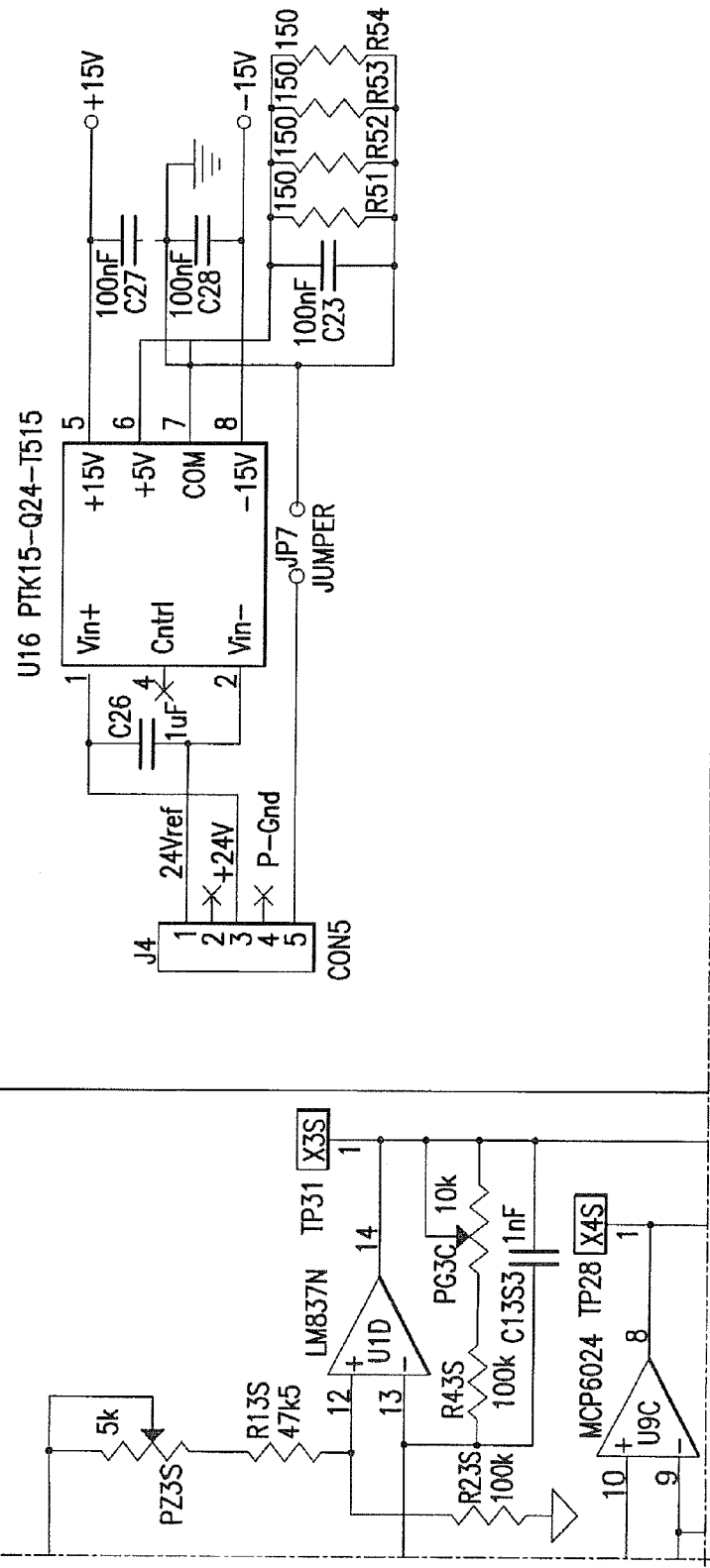
Figures 5, 47A:
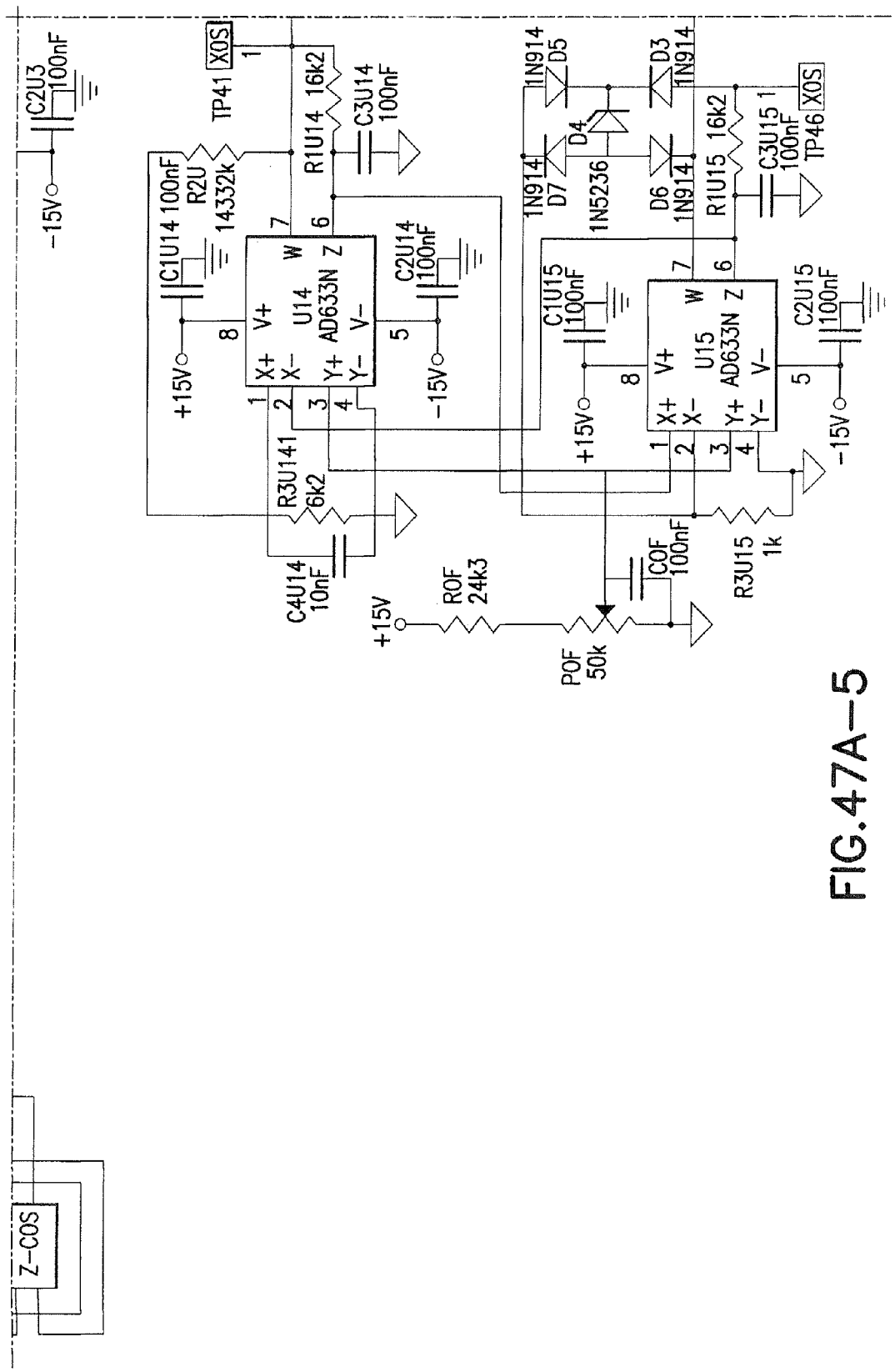
Figures 6, 47A:
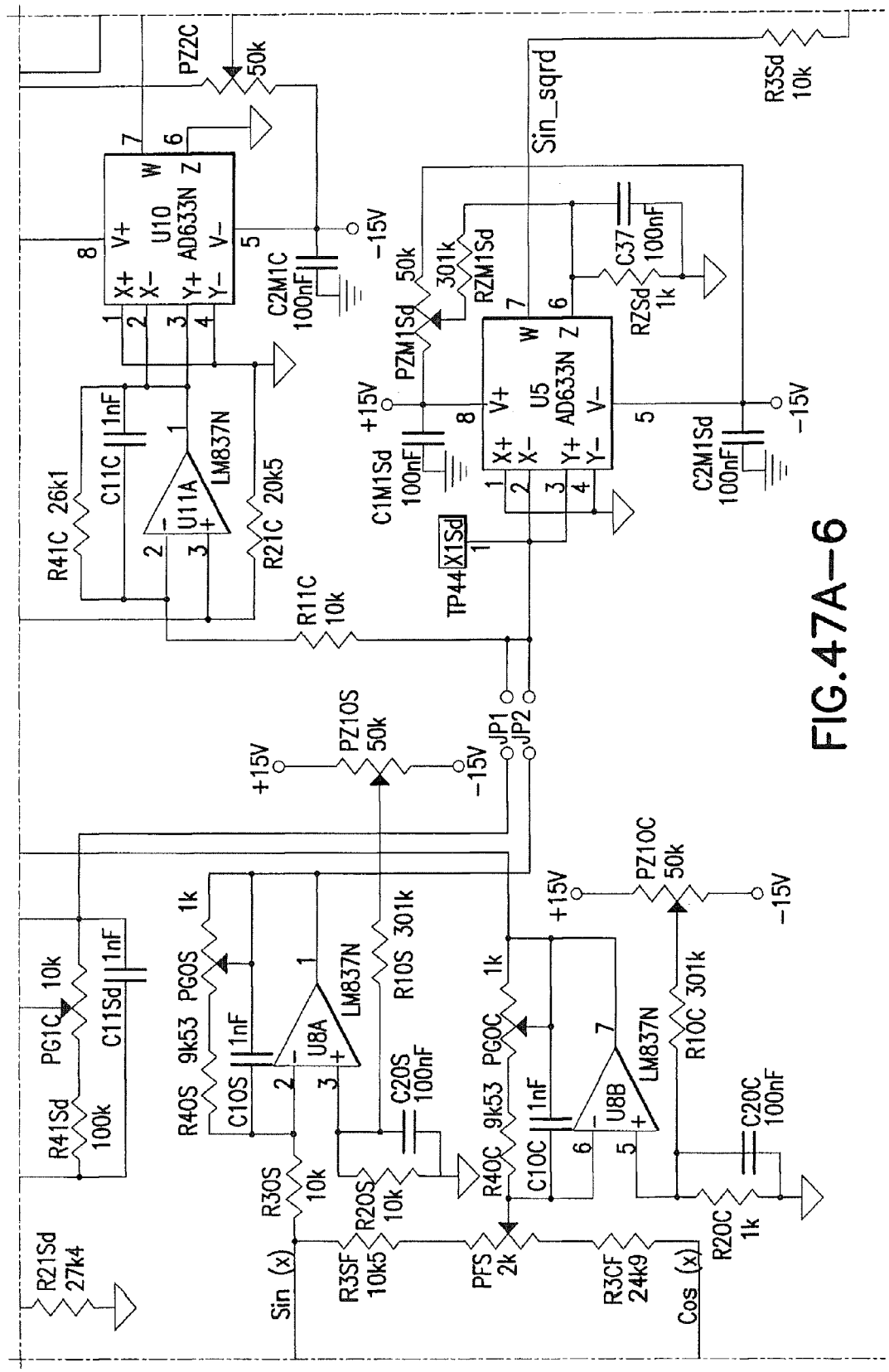
Figures 7, 47A:
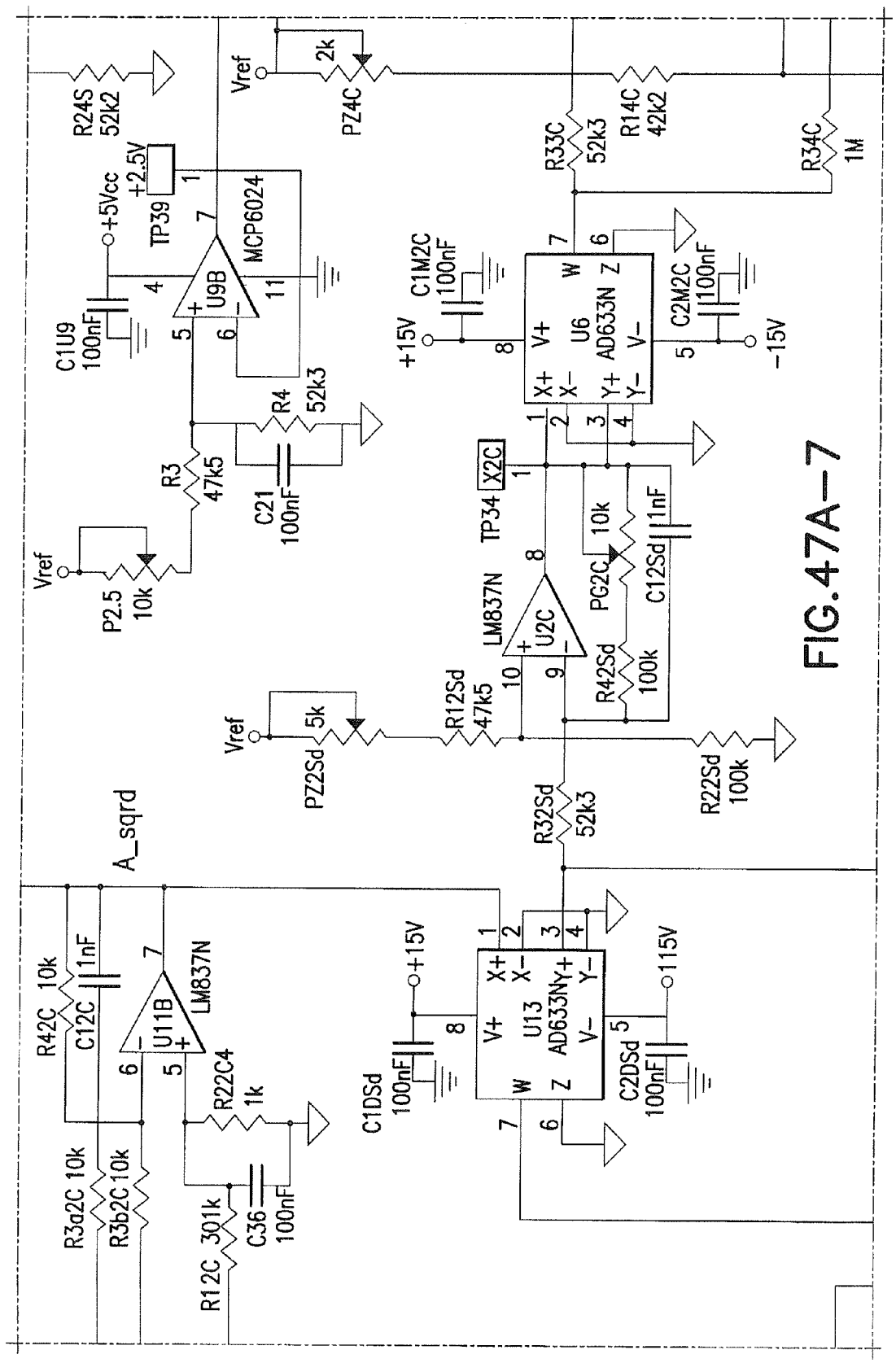
Figures 8, 47A:
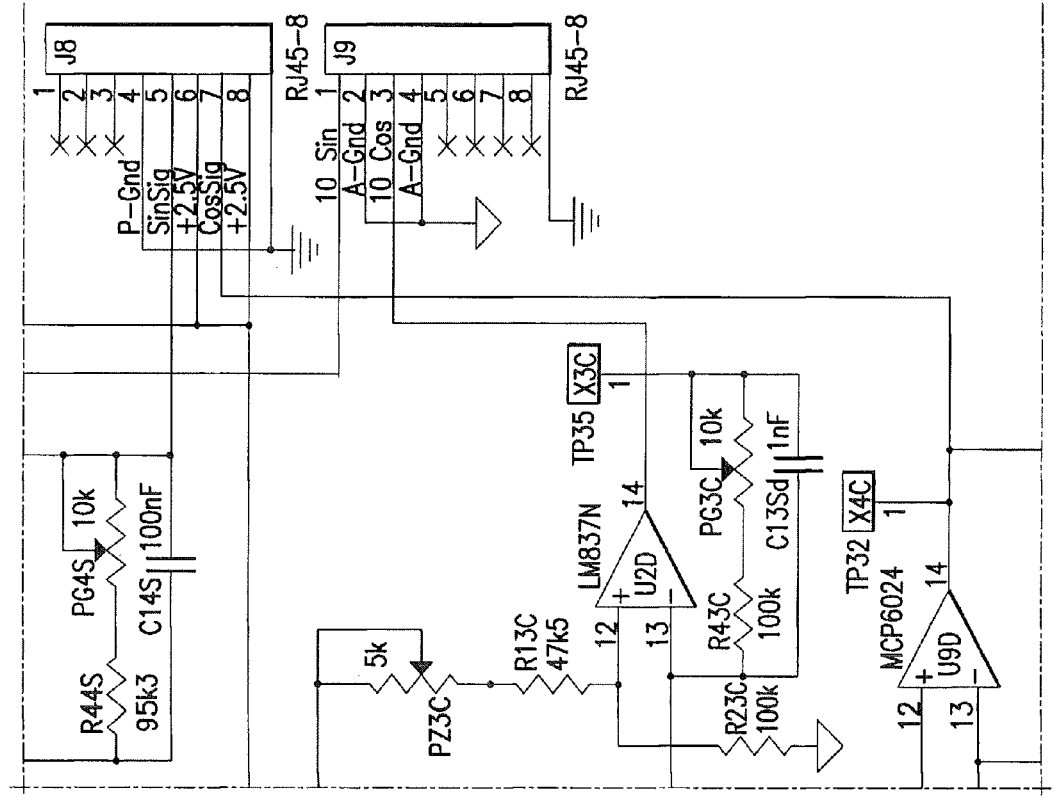
Figures 9, 47A:
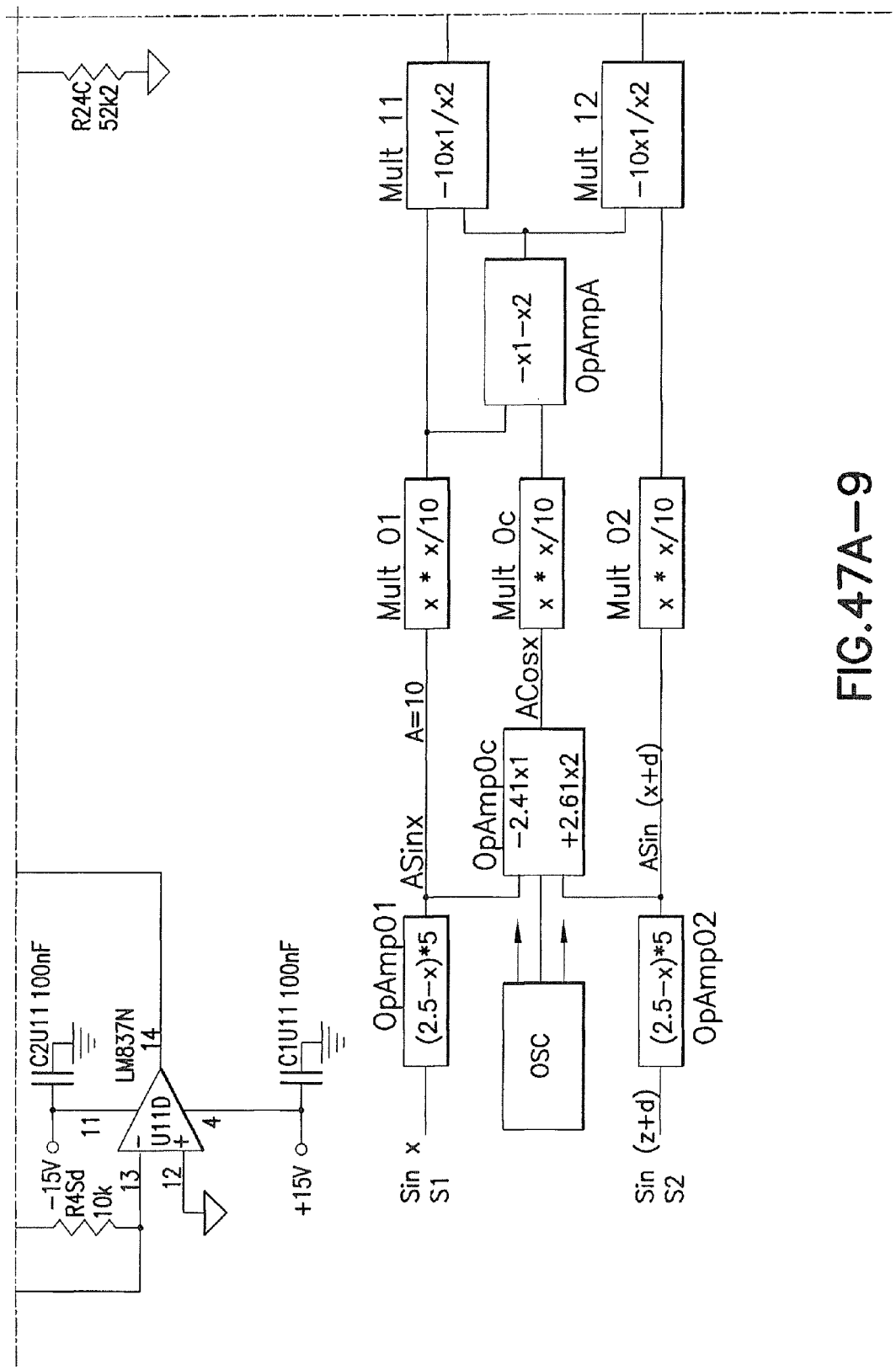
Figures 10, 47A:
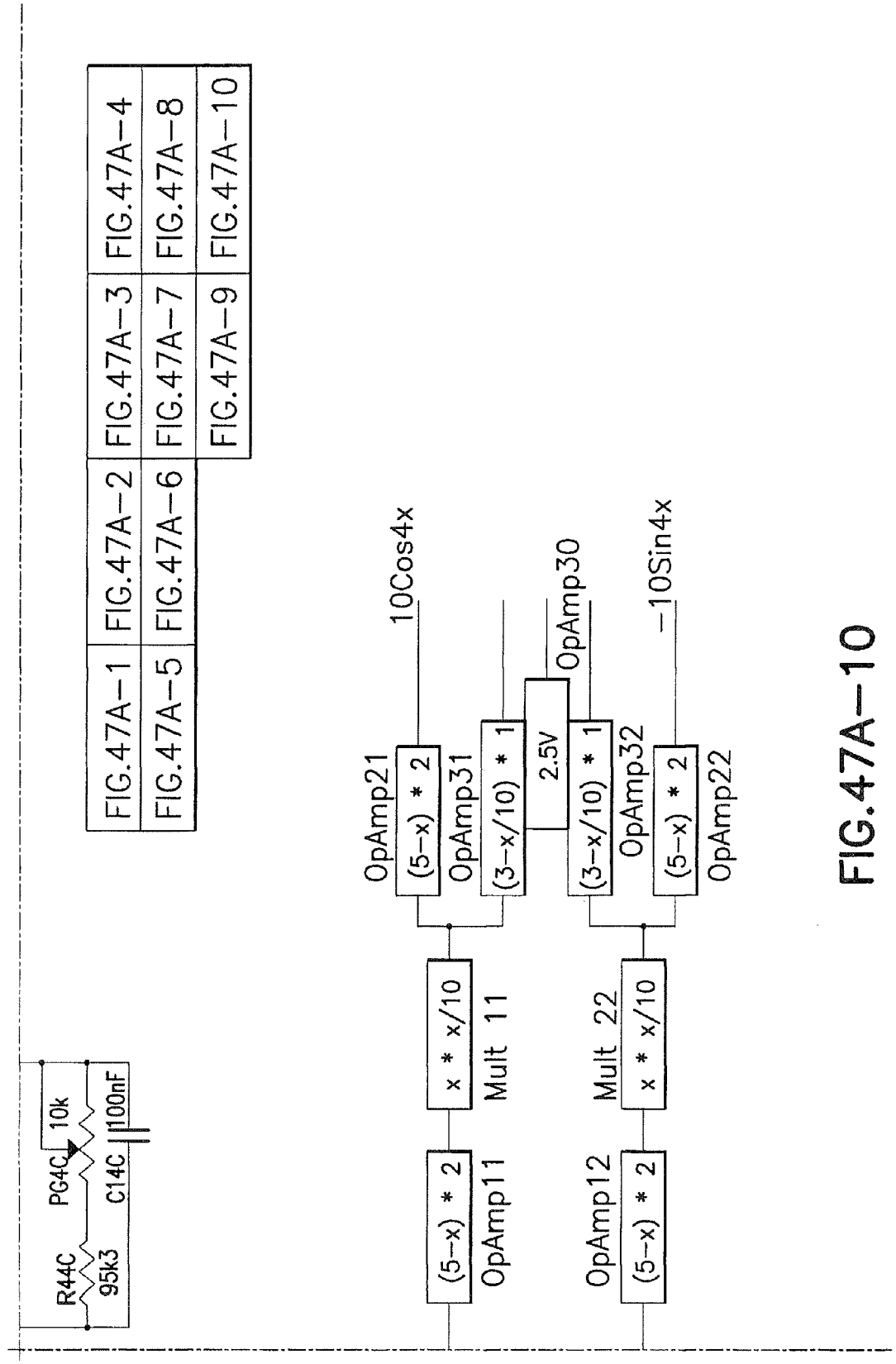

Referring now to FIGS. 1 and 3 another schematic of a sensor 100" is shown in accordance with an exemplary embodiment. In this exemplary embodiment single axis sensors 300A-300n are placed along the object's 120 direction of travel T. In this exemplary embodiment the sensors 300A-300n may be placed in a straight line or collinear with the direction of travel. In alternate embodiments, the sensors 300A-300n may be staggered along the direction of travel with some of the sensors being located above the others. In other alternate embodiments the sensors 300A-300n may have any suitable configuration. The sensors 300A-300n may be any suitable sensors including, but not limited to, Hall effect sensors, inductive sensors and capacitive sensors as described above.

As can be seen in FIG. 3 the sensors 300A-300n are spaced along the direction of travel at a predetermined distance or pitch P. In alternate embodiments the sensors may have any suitable spacing. The sensors 300A, 300B, 300E may be a first type of single axis sensor having, for example, a low sensitivity. The low sensitivity single axis sensors may have a sensitivity sufficient for producing an on/off signal and hence may be of generally low cost. Where the position of an object is to be tracked over longer intervals, dependent on geometrical features of the system to which the sensor 100" is part of, one or more doublets of sensors 300C, 300D (i.e. a sensor doublet) that may be a second type of sensor having, for example, a single axis sensor(s) but of greater sensitivity, when compared to the first type of sensor 300A, 300B, 300E, may be positioned in the line of sensors in the place of one of the lower sensitivity sensors as can be seen in FIG. 3. In alternate embodiments, more or less than one doublet of higher sensitivity sensors similar to sensors 300C, 300D may be used. In other alternate embodiments, all of the sensors, including the sensors of the sensor doublets may be low sensitivity sensors or higher sensitivity sensors. In still other alternate embodiments, the sensors may be mixed between low sensitivity and higher sensitivity sensors in any suitable manner. The use of low sensitivity sensors in combination with one or more sensor doublets may provide a position measurement system having a rough position (e.g. a position having an accuracy less that the position measurement obtained with the sensor doublets) that can be tracked using the singular sensors or sensor singlets and in areas where position is of greater concern the doublets may be employed to more accurately determine the objects position. The sensor doublets may also be utilized to "calibrate" an object's position as tracking the object with the singular sensors alone may introduce some drift or variation in the position measurements. The higher sensitivity sensors 300C, 300D may be spaced apart a predetermined distance that is, for example, about one-fourth the pitch P or P/4 so that the output signals of the sensors 300C, 300D produce signals with a sine/cosine relationship in a manner substantially similar to that described above with respect to FIGS. 2B and 2C.

The sensors 300A-300n are opposed by magnetic pole pieces or magnets 320A-320n that are attached to or are part of the moving object 120 as described above. It should be realized that any suitable magnetic field generator may be used such that the magnet does not have to include both north and south poles. The poles of the magnets opposite the sensors 300A-300n are arranged in an alternating configuration where the north pole of the magnets 320A, 320C, 320E, 320G is exposed to the sensors 300A-300n and the south pole of the magnets 320B, 320D, 320F is exposed to the sensors 300A-300n. The alternating poles of the magnetic pole pieces 320A-320n produce a sinusoidal type pattern as the magnets 320A-320n are moved by the sensors 300A-300n as can be seen in FIG. 3B. In alternate embodiments the magnets may be arranged in any suitable configuration. In this example, as the magnets pass by the singular sensors 300A, 300B, 300E a sinusoidal sensor output SW is generated. As the magnets pass by the sensor doublet 300C, 300D a sinusoidal output SW may be produced by sensor 300C while the sensor 300D produces a cosine type output CW relative to the output of sensor 300C or the distance P (i.e. the sine/cosine relationship). In this exemplary embodiment the magnets 320A-320n are spaced apart from each other at a distance which is about twice the pitch P or 2P. In alternate embodiments, the magnets 320A-320n may have a spacing that is more or less than 2P.

The processor 190 may be configured for mathematical manipulation of the output signals from sensors 300A-300n, to determine where within one base pitch, which in this example is P, the object 120 is located. Because the location of each of the sensors 300A-300n is known, as described above, the determined location within the base pitch P can be added to or subtracted from one of the known locations of a respective sensor 300A-300n to obtain the position of the object 120 with respect to the sensors 300A-300n. The gap G can be determined by the processor 190 in a manner substantially similar to that described above and as will be described in greater detail below with respect to FIG. 7 and the parallel field approach to position measurement. In alternate embodiments the gap G may be determined in any suitable manner including, but not limited to, those described herein. The output signals from the sensors 300A-300n may be used to determine an interpolated measure of the object's distance between sensors.

In operation the line of sensors 300A-300n may be sequentially scanned for output by the controller 190 with the first sensor being scanned, such as for example sensor 300A, for determining the base distance along the scanned line of sensors. This scanning of the sensors 300A-300n may allow for absolute position measurement of the object 120 with a high or maximized degree of resolution.

In one exemplary embodiment, the exemplary sensor configuration shown in FIG. 3A may allow for accurate positioning of an object over long distances, such as between manufacturing cells or FABS as will be described in greater detail below. In another exemplary embodiment, the sensor configuration shown in FIG. 3A may be used in any suitable part of, for example, any suitable facility where objects are transported. Examples of facilities include, but are not limited to, semiconductor processing plants, automotive production plants, or any other suitable facility utilizing, for example, mechanized material handling.

Figure 4:
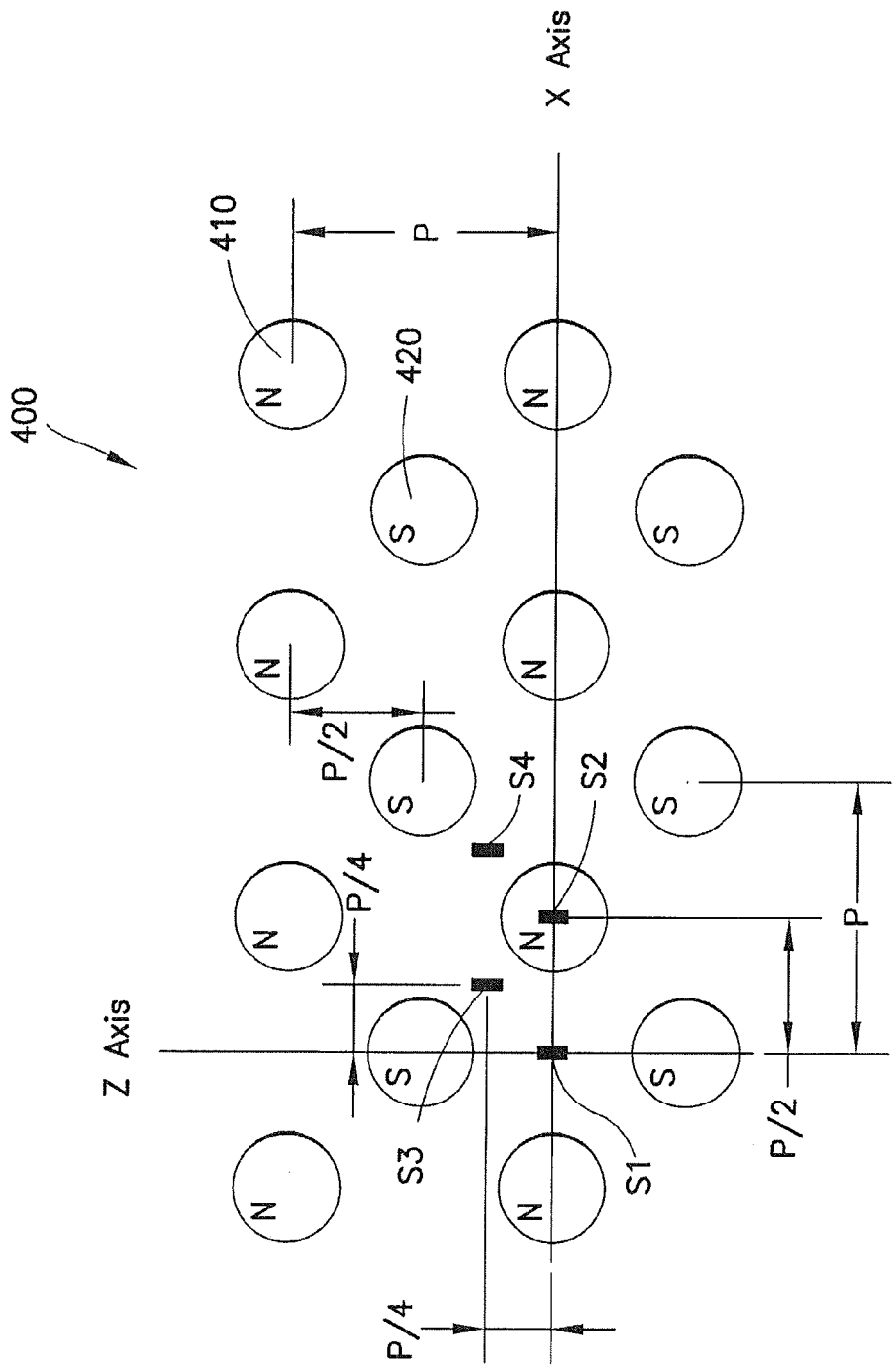
FIG. 4 shows an exemplary magnetic platen and sensor configuration in accordance with an exemplary embodiment.

Referring now to FIG. 4, a schematic view of the magnetic platen 400 and the single axis sensors S1-S4 is shown. In this exemplary embodiment, and for exemplary purposes only, the magnetic platen 400 includes magnetic pole pieces arrayed two dimensionally in the Z-direction and in the X-direction. As may be realized the array of magnetic pole pieces shown in FIG. 4 may be just a portion of the magnets included on the platen 400. In alternate embodiments, the platen 400 may have any suitable number of rows and/or columns of magnetic pole pieces. In this example, the rows of magnetic pole pieces have alternating magnetic poles and are staggered or spaced apart by a distance of about P/2 as can be seen in FIG. 4. Likewise, the columns are also arranged to have alternating magnetic poles and are spaced apart or staggered by a distance of about P/2. The pitch between each of the magnets in any particular row or column is P as can be seen in FIG. 4. In alternate embodiments, the magnetic pole pieces may have any suitable arrangement and any suitable spacing.

In this exemplary embodiment four single axis sensors S1-S4 are positioned in, for example, a substantially symmetric magnetic field generated by magnetic platen 400 such that the sensors S1-S4 are oriented to sense the same axis of the field. In alternate embodiments more or less than four sensors may be utilized. The sensors S1-S4 may be substantially similar to those described above with respect to FIGS. 2A and 3A. As can be seen in FIG. 4, the sensors S1 and S2 form a first pair of sensors that are substantially collinear in the X-direction and spaced from each other by a predetermined distance of about P/2 or one half the pitch. Sensors S3 and S4 form a second pair of sensors that are substantially collinear in the X-direction and are also spaced apart from each other by a distance of about P/2. The sensor pair S3, S4 is offset from the sensor pair S1, S2 in the X-direction by a distance that is about one-quarter of the pitch P or P/4. The sensor pair S3, S4 is offset from the sensor pair S1, S2 in the Z-direction by a distance that is about one-quarter of the pitch P or P/4. In alternate embodiments, the sensors within the sensor pairs may have any suitable spaced relationship. In still other alternate embodiments the sensor pairs may have any suitable spaced apart relationship.

In this exemplary embodiment the sensors S1-S4 may sense the component of the magnetic field that is normal to the plane of the magnetic pole pieces (i.e. the "normal field approach" for position measurement). The sensor pairs S1, S2 and S3, S4 provide respective output signals that have a sine/cosine relationship substantially similar to that described above with respect to FIGS. 2B and 2C. For example, in this exemplary embodiment if the signal from sensor S2 is subtracted from the signal from sensor S1 by, for example, processor 190, a signal results that is proportional to the sine of the distance along the X-axis. The signal proportionate to the sine of the distance along the X-axis repeats with a spatial period that is equal to the magnet pitch P. If the signal from sensor S4 is subtracted from the signal from sensor S3 by, for example, processor 190, a signal results that is proportional to the cosine of the distance along the X-axis. The signal that is proportional to the cosine of the distance along the X-axis also repeats with a spatial period that is equal to the magnetic pitch P.

In addition to position measurement along the X-axis, the sensor S1-S4 and platen 400 configuration in this exemplary embodiment may also provide position measurement along the Z-axis. For example, if the output signal from sensor S2 is added to the output signal from S1 by, for example, processor 190, a signal results that is proportional to the sine of the distance along the Z-axis. The signal that is proportional to the sine of the distance along the Z-axis repeats with a spatial period that is equal to the magnetic pitch P. If the output signal from sensor S4 is added to the output signal from sensor S3 by, for example, processor 190, a signal results that is proportional to the cosine of the distance along the Z-axis. The signal that is proportional to the cosine of the distance along the Z-axis also repeats with a spatial period that is equal to the magnet pitch P.

The sine and cosine signals may be used by processor 190 to generate a value of angle varying from zero to three-hundred-sixty degrees over a distance that is equal to the magnetic pitch allowing an accurate determination of position of the sensor array relative to the magnet array or vice versa.

Figure 5:
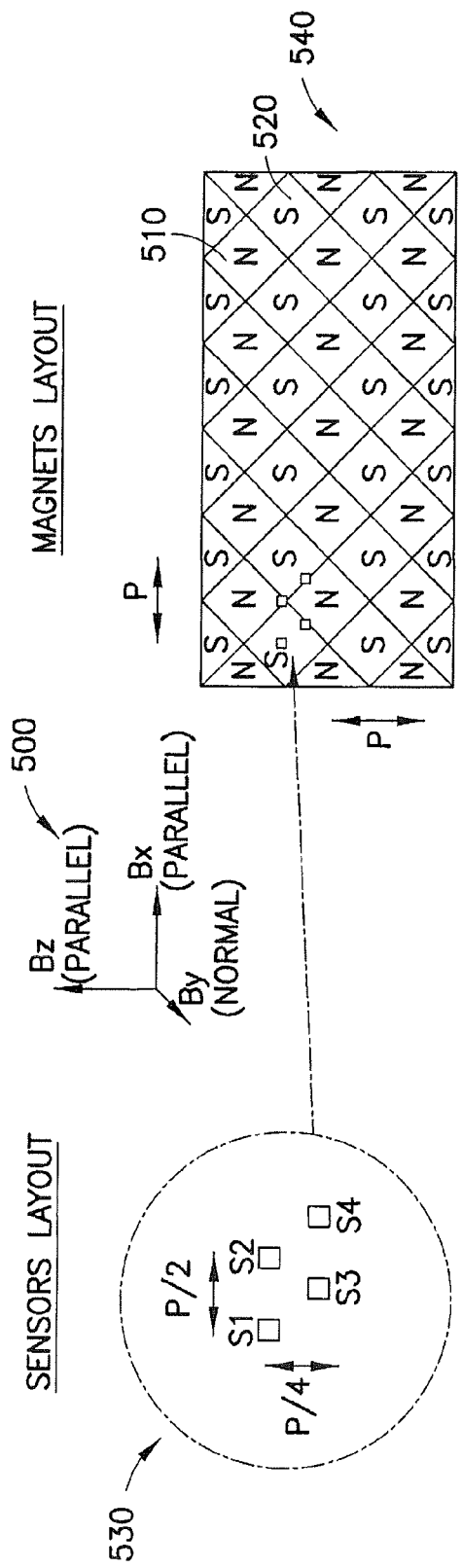
FIG. 5 shows another exemplary magnetic platen and sensor configuration in accordance with an exemplary embodiment.

Referring now to FIG. 5, the position measurement system of FIG. 4 will be described in greater detail. As may be realized the position of the sensor pairs S1, S2 and S3, S4 can vary with respect to each other. For example in FIG. 5 the sensor pair S3, S4 is located below the sensor pair S1, S2 while in FIG. 4 the sensor pair S3, S4 is shown as being located above the sensor pair S1, S2. In alternate embodiments, the sensor pairs may have any suitable configuration and/or spacing such that a sine/cosine relationship exists between the sensor pairs. As can be seen in FIG. 5 the sensor group 530, which includes single axis sensors S1-S4 substantially similar to those described above with respect to FIG. 4, is located adjacent or proximate a magnetic platen 540 that includes magnetic pole elements 510, 520. The magnetic pole elements may be arranged in an alternating configuration as shown in FIG. 5 where the north pole of magnetic pole elements 510 is exposed to the sensor group 530 and the south pole of magnetic pole elements 520 is exposed to the sensor group 530. The spacing of the magnetic pole elements may be substantially similar to those described above with respect to FIG. 4. In alternate embodiments, the magnetic pole elements 510, 520 may have any suitable spacing.

Figure 6A:
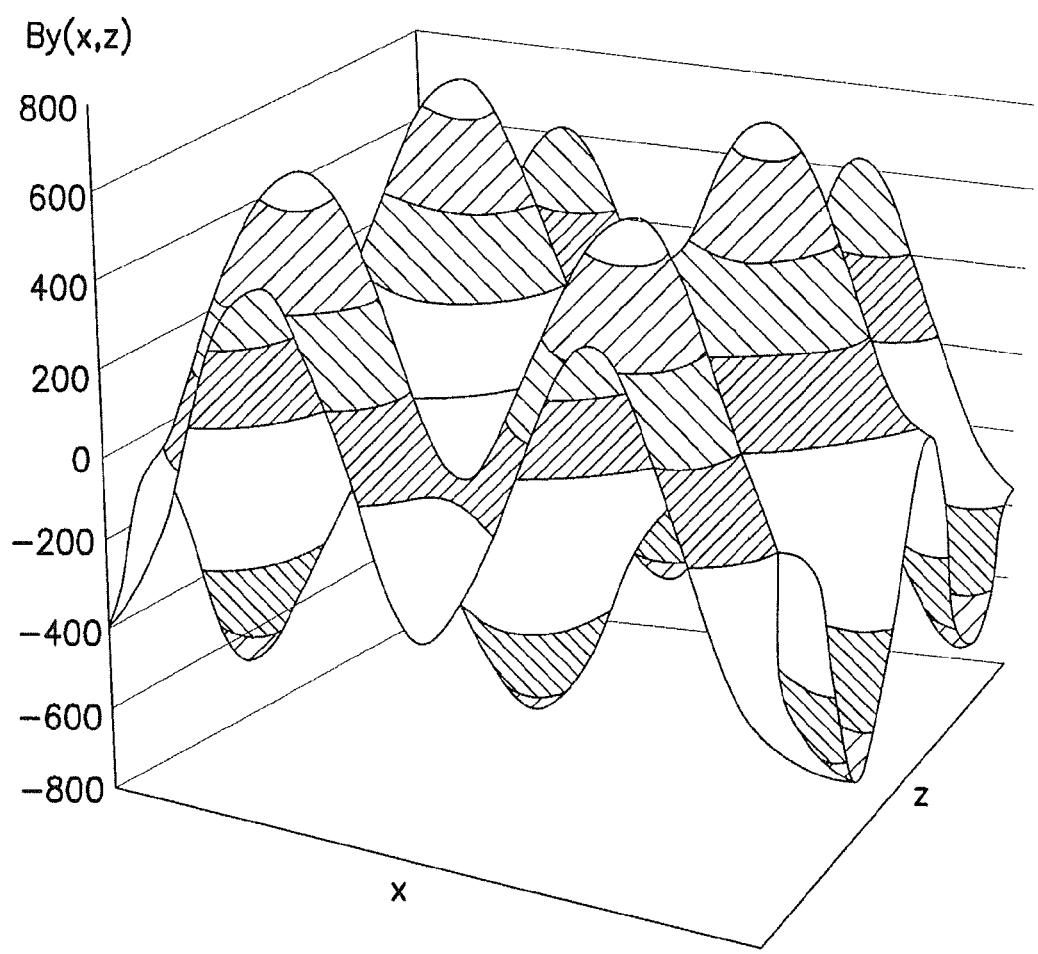
FIGS. 6A and 6B show graphs of the strength of the magnetic field generated by the magnetic platen as sensed by the sensors in FIG. 5.
Figure 6B:
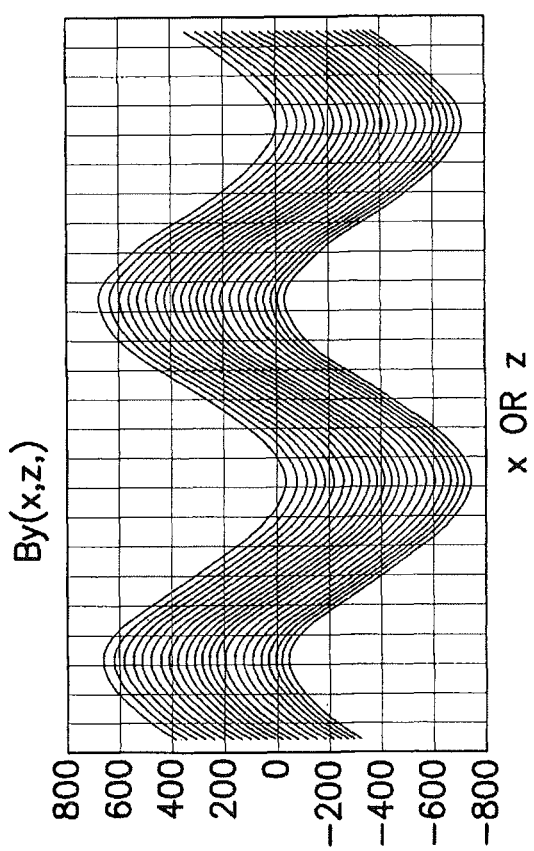
Figure 9A:
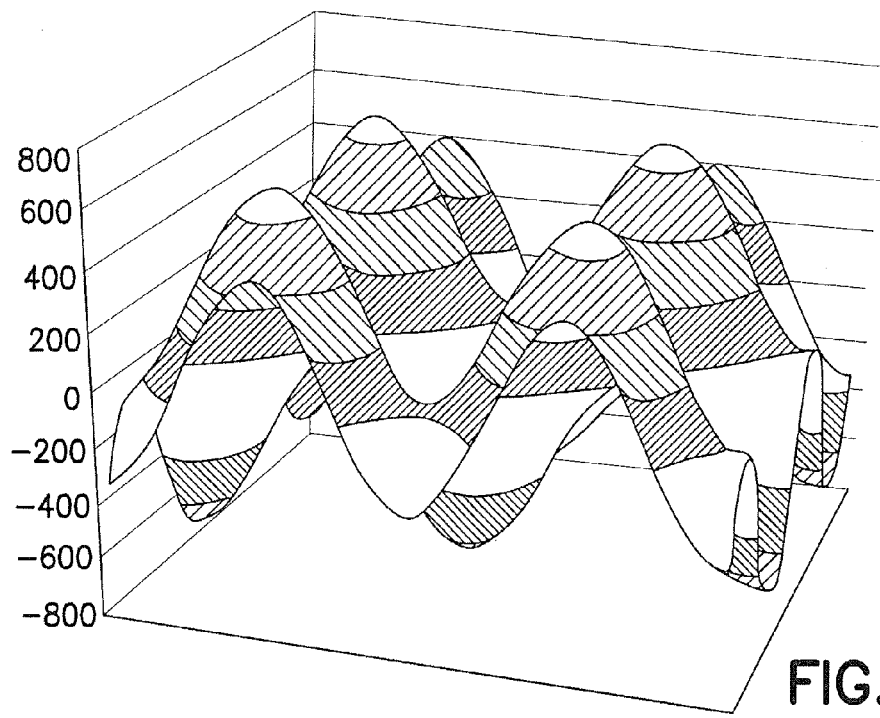
FIGS. 9A and 9B illustrate graphs representing sensor output in accordance with an exemplary embodiment.
Figure 9B:
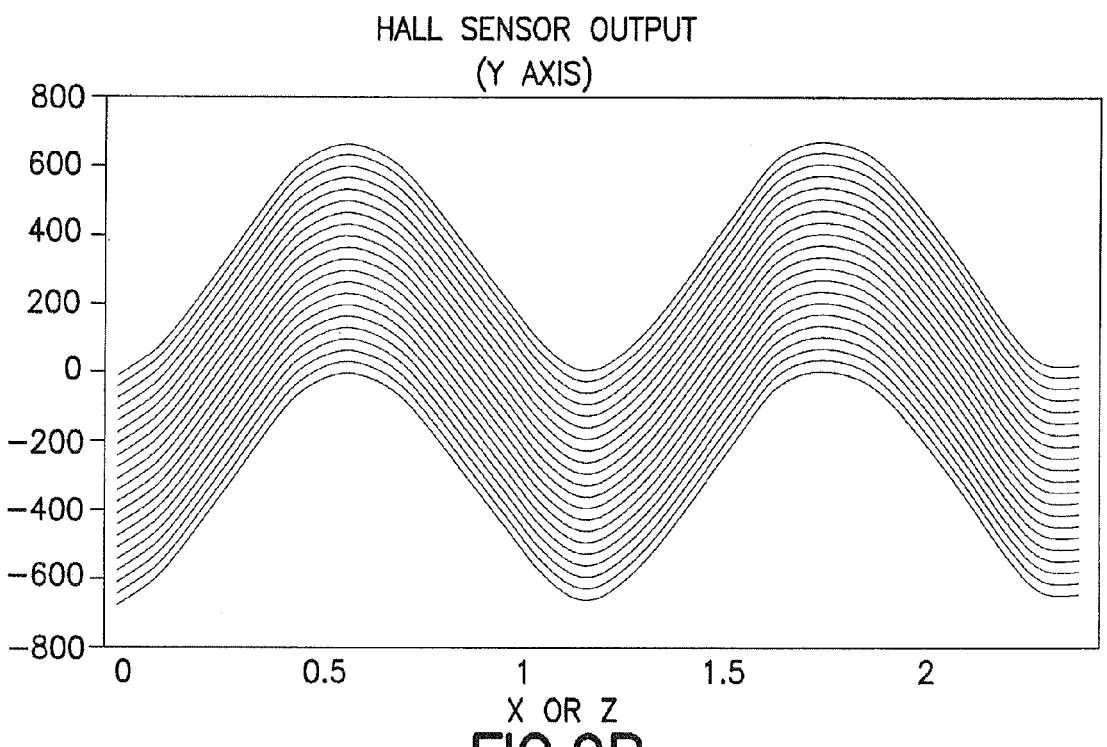

In this exemplary embodiment, the four single axis sensors S1-S4 produce, for example, two sets of signals having, for example, a sine/cosine relationship (i.e. the output signals from sensors S1, S2 have a sine/cosine relationship and the output signals from sensors S3, S4 have a sine/cosine relationship). As described above, the configuration of the sensors S1-S4 shown in FIG. 5 allows each of the sensors to sense the magnetic field that is normal to the magnetic platen 540 as shown by the illustration of the exemplary coordinate system 500. A three dimensional plot of the magnetic field generated by the magnetic platen 540 is shown in FIGS. 6A and 9A where the strength of the magnetic field in the Y-direction is plotted against positions along the X-axis and Z-axis. FIGS. 6B and 9B show two-dimensional plots of the sensor output in accordance with the magnetic field shown in FIGS. 6A and 9A respectively.

In the normal field approach for position measurement, shown in FIGS. 4 and 5, the sine and cosine relationships between the respective sensor pairs S1, S2 and S3, S4 are utilized by the processor 190 to calculate the position of the object 120 to which the magnetic platen 540 is attached. For example, the processor 190 can calculate the sine of the sensor signals along the X-axis using the following exemplary equation:

$$\sin_X = \frac{S1 - S2}{2} \quad [2]$$

where S1 and S2 represent outputs of their respective sensors S1, S2. The cosine of the sensor signals along the X-axis can be calculated by the processor 190 using the following exemplary equation:

$$\cos_X = \frac{S3 - S4}{2} \quad [3]$$

where S3 and S4 represent outputs of their respective sensors S1, S2. The position of the object 120 within the pitch P can be calculated by the processor 190 using the $\sin_X$ and $\cos_X$ as follows:

$$X = \arctan\frac{\sin_X}{\cos_X} \quad [4]$$

where X is proportional to a fraction of the distance along the magnetic pitch P. Because each sensor group 530 is located at a predetermined distance the interpolated position $D_X$ corresponding to X can be subtracted from or added to the predetermined distance to obtain the position of the object 120. For example, if sensor group 530 is located at distance C along the X-axis and the interpolated position $D_X$ is equal to P/3 then the position of the object 120 in the X-direction would be, for example, the distance C plus the position $D_X$ (i.e. C+P/3).

Similarly the position along the Z-axis can be determined by the processor 190 by calculating sine and cosine of the sensor signals in the Z-direction as follows:

$$\sin_Z = \frac{S1 + S2}{2} \quad [5]$$

$$\cos_Z = \frac{S3 + S4}{2} \quad [6]$$

where, as above, S1-S4 represent outputs of respective sensors S1-S4. The position of the object 120 within the pitch P in the Z-direction can be calculated by the processor 190 using the $\sin_z$ and $\cos_z$ as follows:

$$Z = \arctan\frac{\sin_Z}{\cos_Z} \quad [7]$$

where Z is proportional to a fraction of the distance along the magnetic pitch. As may be realized the sensor group(s) 530 may be positioned at predetermined distances along the Z-axis such that the position of the object 120 in the Z-direction can be obtained by adding or subtracting the distance $D_Z$ corresponding to proportion Z to or from the predetermined distance. For example, if sensor group 530 is located at distance B along the Z-axis and the interpolated position $D_Z$ is equal to P/3 then the position of the object 120 in the Z-direction would be, for example, the distance B plus the position $D_Z$ (i.e. B+P/3).

The processor 190 may be configured to calculate the square root of the sum of the squares of the sine and cosine to obtain a measure of the magnetic flux density. The magnetic flux density may be proportional to the distance G between the magnet array or platen 540 and the sensors 530. As such, the gap G between the sensor group 530 and the magnetic platen 540 (i.e. the position along the Y-axis) can be, for example, determined as follows:

$$\text{Gap} = t * \ln\left(\frac{A}{\sqrt{\sin^2 + \cos^2}}\right) \quad [8]$$

where t and A are constants dependent on magnet geometry. As described above, a three-dimensional position of the object can be determined in accordance with the exemplary embodiment using single axis sensors where each sensor produces an output signal along but one axis.

Figure 7:
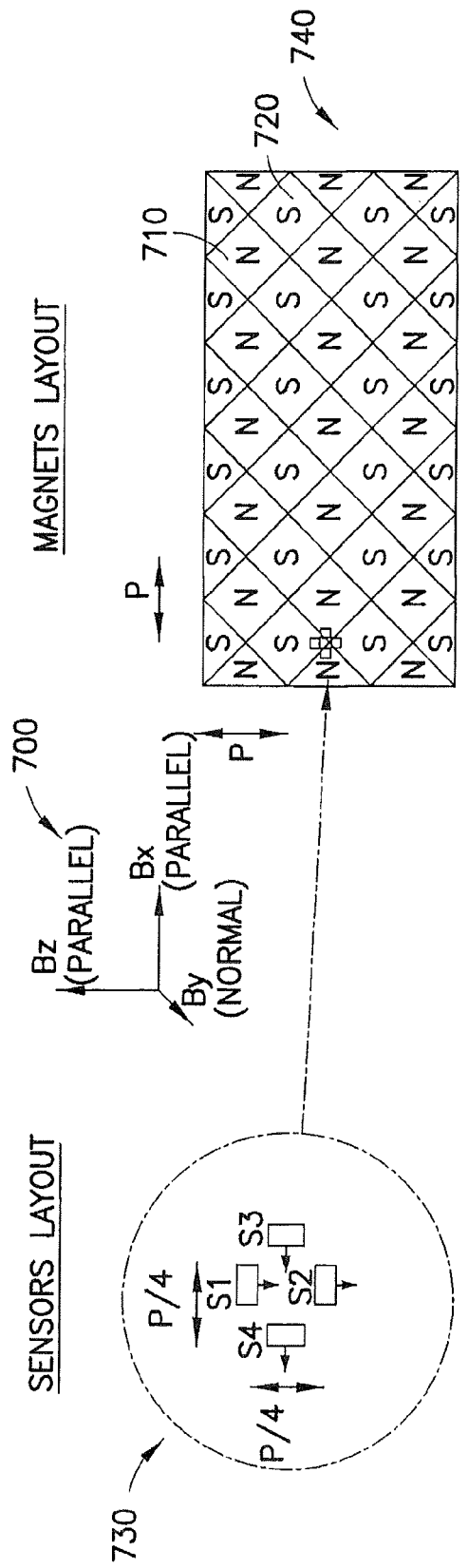
FIG. 7 shows yet another exemplary magnetic platen and sensor configuration in accordance with an exemplary embodiment.

Referring now to FIG. 7, in another exemplary embodiment, the position measuring system may be configured to measure the parallel components of the magnetic field (i.e. the "parallel field approach"). As can be seen in FIG. 7, the position measuring system includes sensor group 730 and magnetic platen 740. The magnetic platen 740 may be substantially similar to that described above with respect to FIG. 5 in that the platen 740 includes magnetic pole elements 710 (north pole element), 720 (south pole element) arranged in an alternating manner as can be seen in FIG. 7. In this exemplary embodiment, the sensor group 730 includes four single axis sensors S1-S4 substantially similar to those described above with respect to FIGS. 4 and 5. In alternate embodiments, any suitable number of sensors may be included in the sensor group 730. The sensors S1-S4 may be any suitable sensors including, but not limited to, single axis Hall sensors, inductive or capacitive sensors as described above. Sensors S1, S2 form a first pair of sensors and sensors S3, S4 form a second pair of sensors. The sensors S1, S2 are arranged substantially collinearly in the Z-direction (as can be seen from the exemplary coordinate system representation 700) and are spaced apart from each other a distance of about one-quarter of the magnet pitch or P/4. The sensors S3, S4 are arranged substantially collinearly in the X-direction and are spaced apart from each other a distance of about one-quarter of the magnet pitch or P/4. In alternate embodiments, the sensors may have any suitable spatial relationship. As can be seen in FIG. 7, the sensors S1, S2 are located between sensors S3, S4 in the X-direction while sensors S3, S4 are located between sensors S1, S2 in the Z-direction. In alternate embodiments the sensors S1, S2 may be located in any suitable position relative to sensors S3, S4. The distance of about P/4 between the sensors and the magnetic pitch P may provide sensor outputs having a sine/cosine relationship. For example, sensors S1, S2 may have a sine/cosine relationship along the Z-axis and sensors S3, S4 may have a sine/cosine relationship along the X-axis.

Figure 8A:
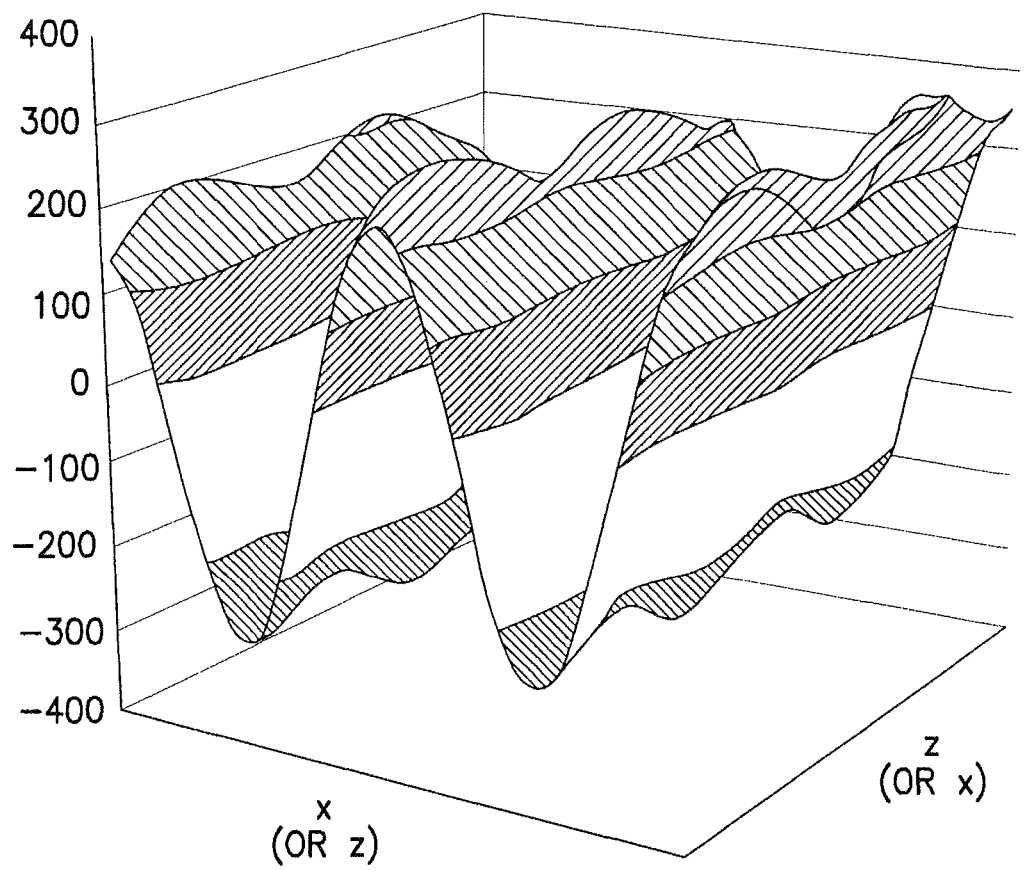
FIGS. 8A and 8B show graphs of the strength of the magnetic field generated by the magnetic platen as sensed by the sensors in FIG. 7.
Figure 8B:
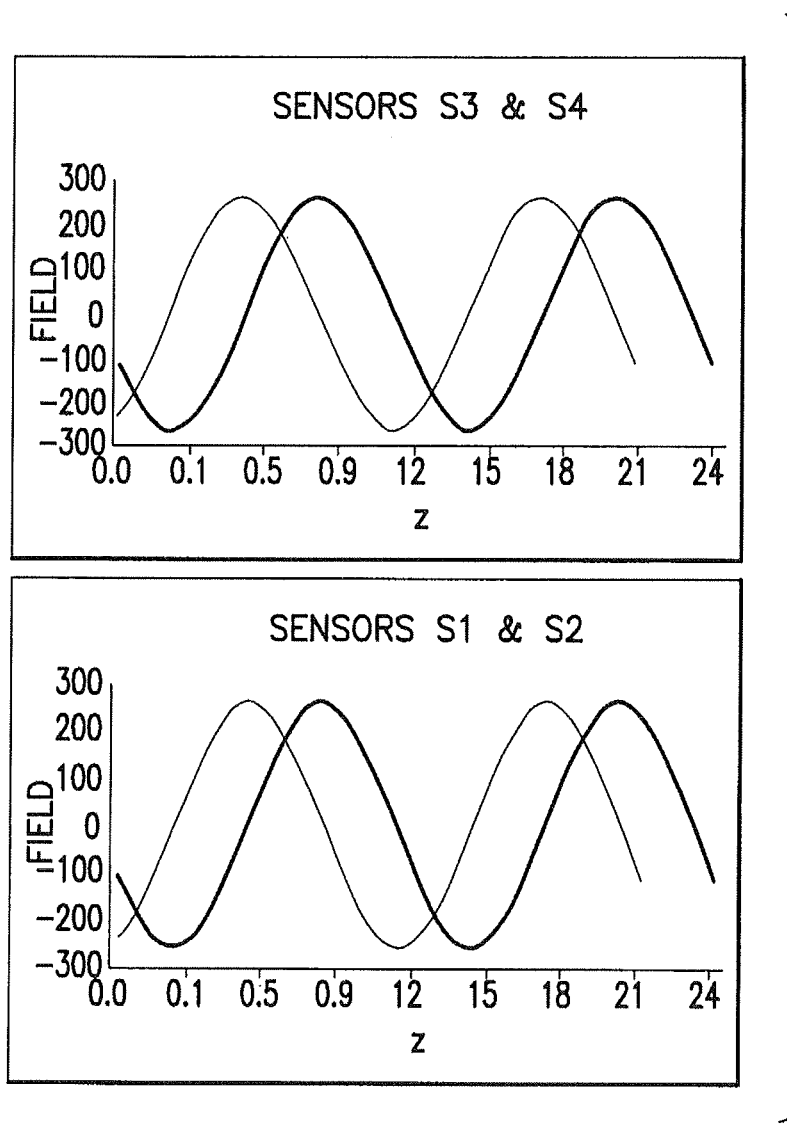
Figure 10A:
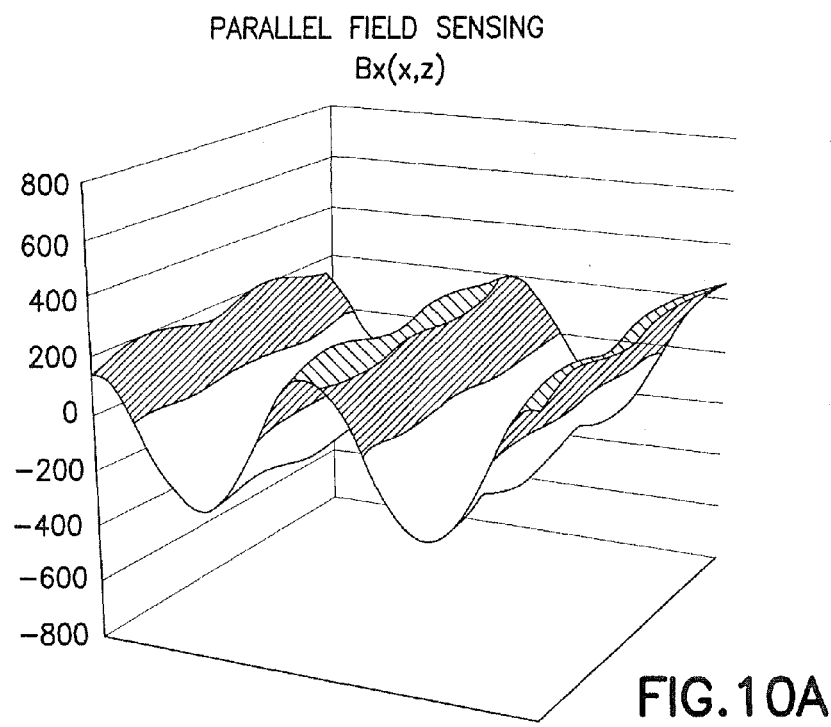
FIGS. 10A-11B show graphs representing sensor output in accordance with another exemplary embodiment.
Figure 10B:
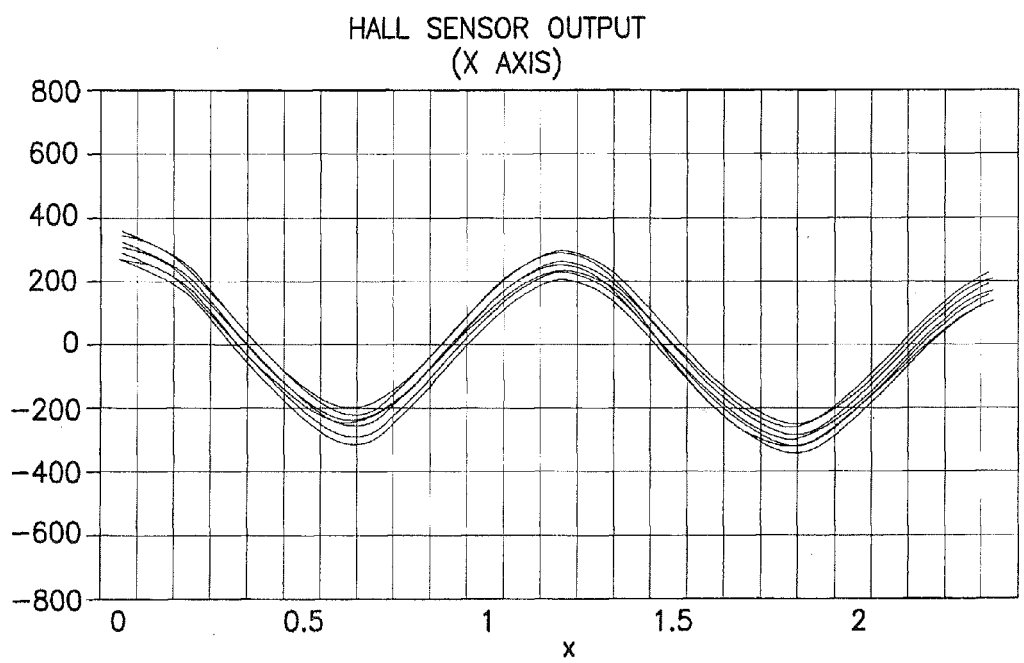
Figure 11A:
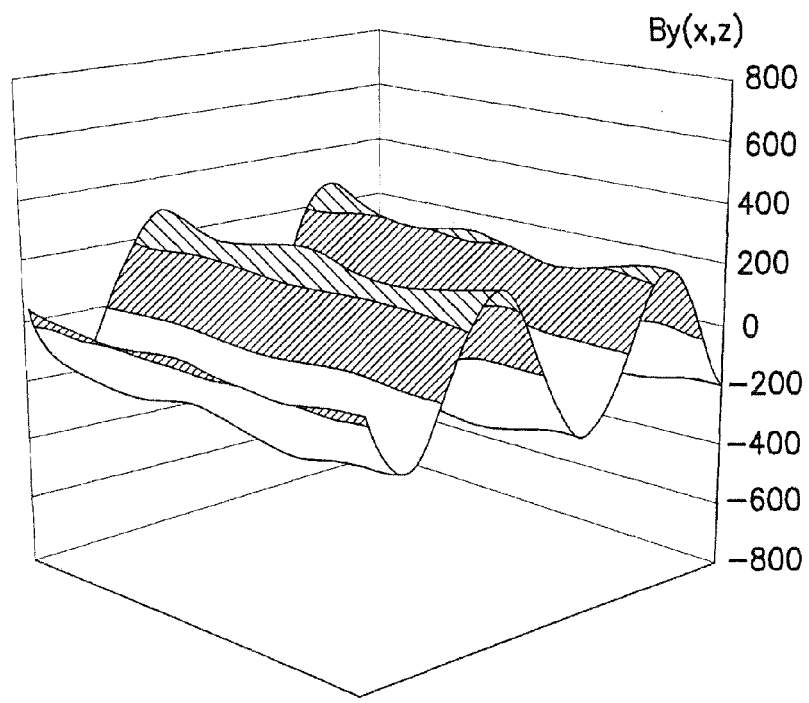
Figure 11B:
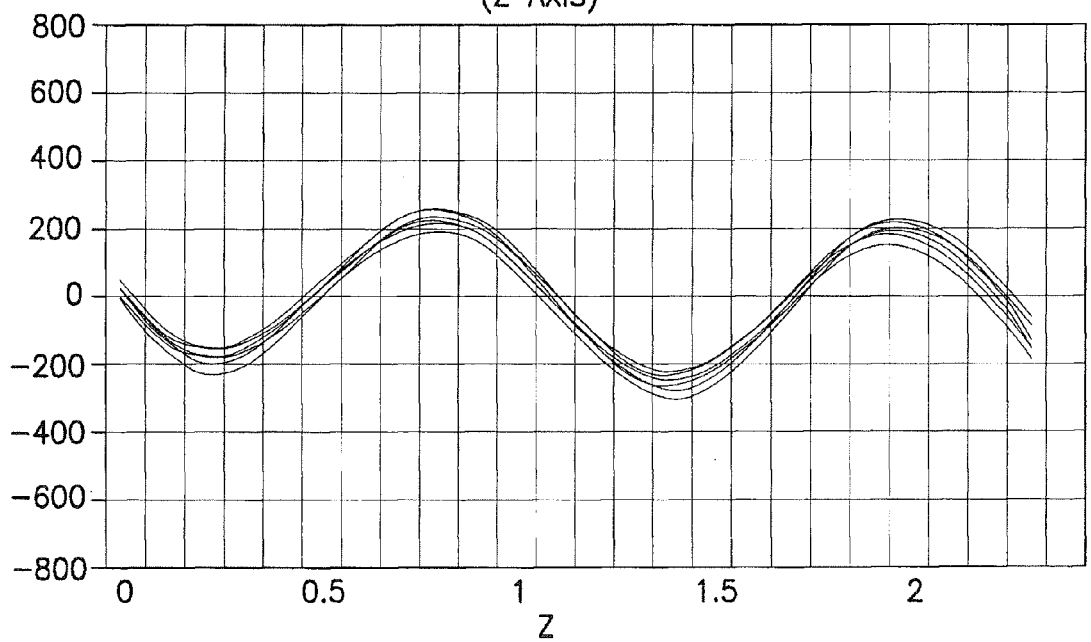

Referring to FIGS. 8A, 10A and 11A, a three-dimensional plot of the magnetic field strength along the X-axis and Z-axis is shown as obtained from parallel field sensing. FIGS. 8B, 10B and 11B show two-dimensional plots of the sensor output versus X or Z position according to the magnetic field strength shown in FIGS. 8A, 10A and 11A as obtained from parallel field sensing. As can be seen in FIG. 8B, a sine/cosine relationship is shown between sensors S3, S4 and between sensors S1, S2.

These sine/cosine relationships may be utilized by the processor 190 to determine the position of the magnetic platen 740 relative to the sensor group 730 along the X-axis and Z-axis. The sine/cosine relationships between the sensor outputs may also be utilized by the processor to calculate the gap G between the platen 740 and the sensor group 730 along the Y-axis. For example, the position of the platen 740 along the X-axis can be calculated by the processor as follows:

$$X = \arctan\frac{S3}{S4} \quad [9]$$

where X is proportional to a fraction of the distance along the magnetic pitch and S3, S4 represent outputs of their respective sensors S3, S4. Because each sensor group 730 is located at a predetermined distance the interpolated position $D_X$ corresponding to X can be subtracted from or added to the predetermined distance to obtain the position of the magnetic platen 740 (and the object 120 to which the platen 740 is attached) relative to the sensors 730. For example, if sensor group 730 is located at distance C along the X-axis and the interpolated position $D_X$ is equal to P/3 then the position of the object 120 in the X-direction would be, for example, the distance C plus the position $D_X$ (i.e. C+P/3).

The position of the platen 740 along the Z-axis can be calculated by the processor as follows:

$$Z = \arctan\frac{S1}{S2} \quad [10]$$

where Z is proportional to a fraction of the distance along the magnetic pitch and S1, S2 represent output signals from their respective sensors S1, S2. Because each sensor group 730 is located at a predetermined distance the interpolated position $D_Z$ corresponding to Z can be subtracted from or added to the predetermined distance to obtain the position of the magnetic platen 740 (and the object 120 to which the platen 740 is attached) relative to the sensors 730. For example, if sensor group 730 is located at distance B along the Z-axis and the interpolated position $D_Z$ is equal to P/3 then the position of the object 120 in the Z-direction would be, for example, the distance B plus the position $D_Z$ (i.e. B+P/3).

The gap between the sensor group 730 and the magnetic platen 740 (i.e. the position along the Y-axis) can, for example, be calculated by the processor 190 as follows:

$$\text{Gap} = t*\ln\left(\frac{A}{\sqrt{S1^2 + S2^2}}\right) \quad [11]$$

where t and A are constants dependent on magnet geometry. Here, as described above, a three dimensional position of the object can be determined in accordance with the exemplary embodiment using single axis sensors where each sensor produces an output signal along but one axis.

Figure 32:
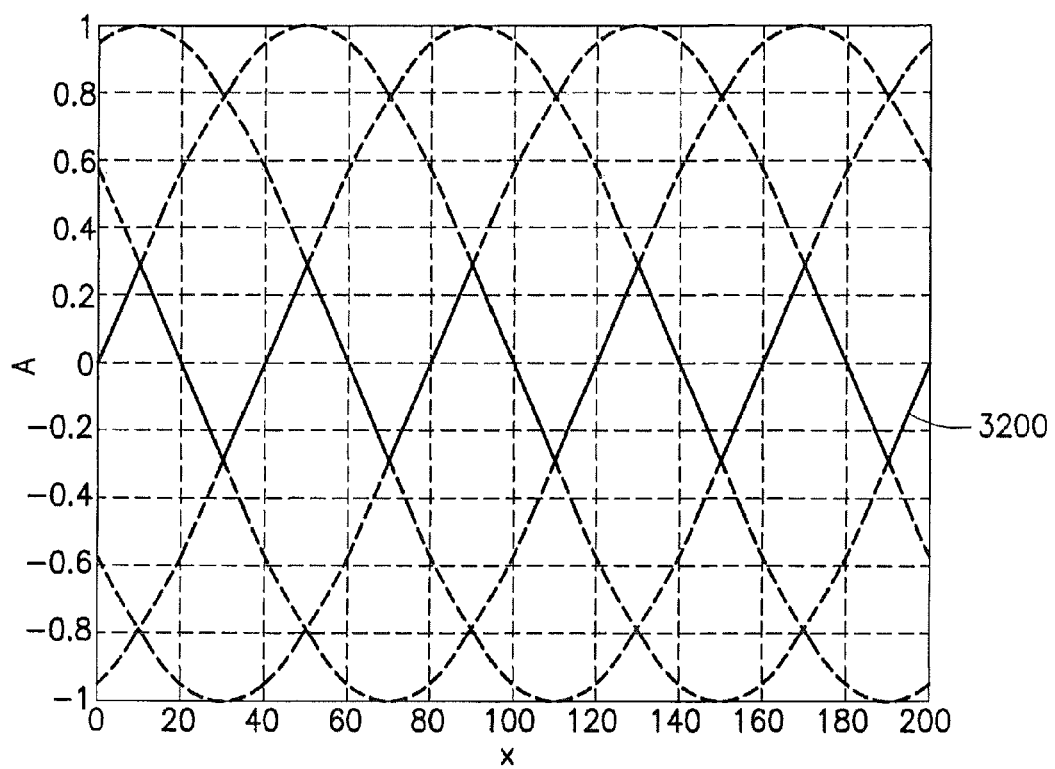
FIGS. 32 and 33 illustrate graphs of added sensor output in accordance with an exemplary embodiment.
Figure 33:
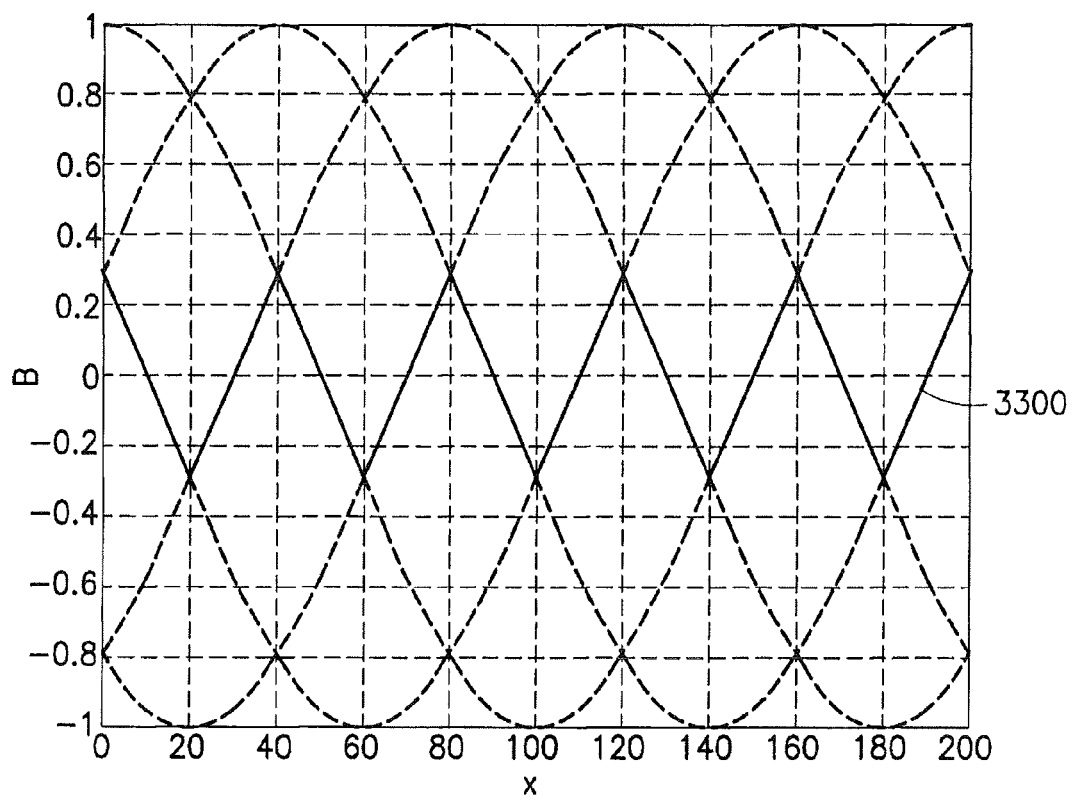
Figure 34:
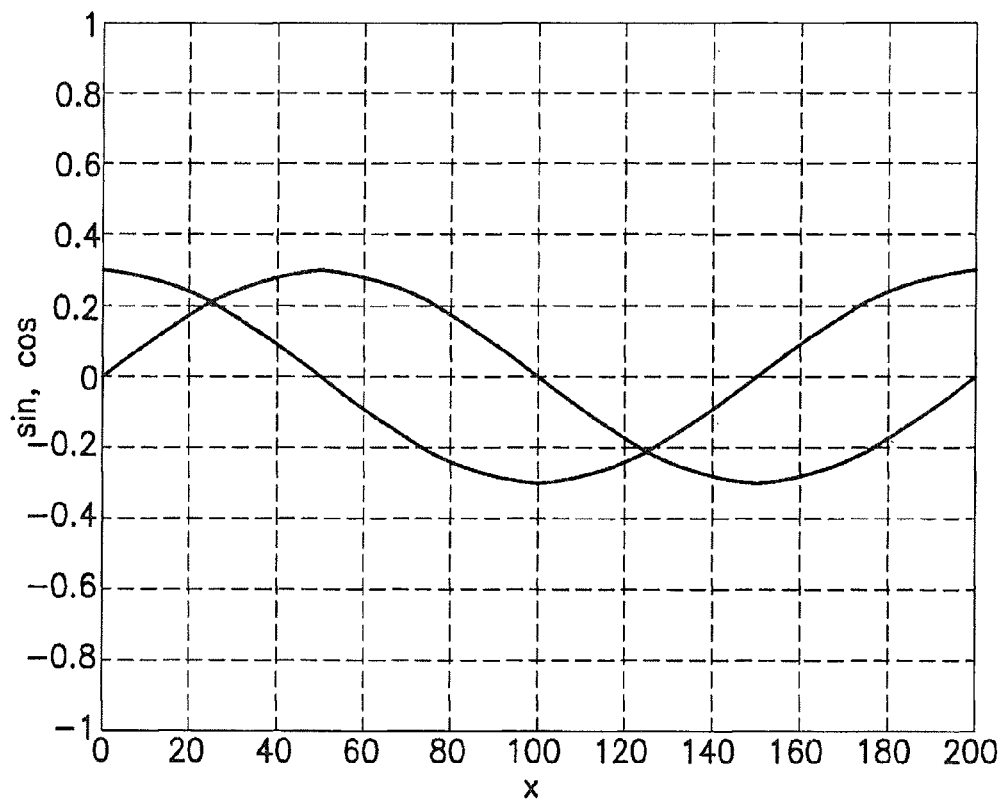
FIG. 34 illustrates a graph of sensor output in accordance with another exemplary embodiment.

Referring now to FIGS. 26-34, in one exemplary embodiment the position measurement system may include a magnetic array M including magnetic pole elements 2601, 2602, a first bank of single axis sensors A1-A5, a second bank of single axis sensors B1-B5, analog electronics 2630 and analog to digital converters 2640, 2645. The single axis sensors may be substantially similar to those described above. It is noted that the analog electronics 2630 and the analog to digital converters 2640, 2645 may be part of the controller 190. In alternate embodiments the analog electronics 2630 and the analog to digital converters 2640, 2645 may be separate from but connected to the controller 190. In other alternate embodiments the sensors A1-A5, B1-B5 may be configured to provide a digital output. In this exemplary embodiment, the distance D between the sensors in each bank of sensors is equal to the magnetic pitch (P) of the magnets in the magnetic array divided by the number of sensors (n) in each bank or P/n where P is the magnetic pitch and n is the number of sensors in each bank. In alternate embodiments the distance between the sensors in each bank may be any suitable distance that may be greater or less than P/n. The two banks of sensors A1-A5, B1-B5 may be offset from each other by a distance of about D/2. In alternate embodiments, the distance between the sensors in each bank and the offset between the two banks of sensors may be any suitable distance(s). As described above periodic signals may be produced by the sensor banks A1-A5, B1-B5 as the magnetic array M moves by the sensors in a direction such as, for example, direction X. In this exemplary embodiment, the sensors A1-A5, B1-B5 are located sufficiently close to the magnetic array M so that each of the sensors A1-A5, B1-B5 reaches its saturation limit. Exemplary signals from sensors A1-A5 are shown in FIGS. 27-31. As can be seen in FIGS. 27-31 the plateaus or horizontal portions of the sinusoidal signals 2700, 2800, 2900, 3000, 3100 represent the saturation limits of each of the sensors. As may be realized the sensors B1-B5 may have saturation limits similar to those shown in FIGS. 27-31 (although the output may be shifted along, for example, the X-axis or any other suitable axis). The analog electronics 2630 may sum the signals from sensors A1-A5 to produce signal A shown in FIG. 32. The analog electronics may also sum the signals from sensors B1-B5 to produce signal B as shown in FIG. 33. In alternate embodiments, the analog electronics may be replaced with digital electronics where the sensors provide digital outputs. It is noted that when summing the signals from the sensors, some of the signals such as those from for example sensors A2 and A4 (e.g. every other sensor signal) may be inverted. In alternate embodiments, the signal from any suitable sensor(s) may be inverted. In other alternate embodiments, the signals may or may not be inverted. The summation of the saturated signals produces a phase shifted saw-tooth signal 3200, 3300 for each of the sensor banks A1-A5, B1-B5 as shown in FIGS. 32 and 33. The signals A 3200, B 3300 can be utilized to determine the position of the magnetic array or platen M relative to the sensors A1-A5, B1-B5 as will be described below. It is further noted that the summation of the saturated signals, when compared to a pair of unsaturated sine/cosine waves as shown in FIG. 34, produces a shorter period that may allow for a higher rate of change with respect to sensor response to the magnetic array M and increased sensor resolution.

As may be realized, the position measurements performed by the disclosed embodiments may be affected for various reasons, including a non-uniform magnetic field. In the case of the normal field approach the position measurements may be affected through, for example, motor coils that create a magnetic field. Position measurements with respect to the parallel field approach may be affected by, for example the magnetic platen itself. The position measurements affected by, for example a non-uniform magnetic field or motor coils can be corrected in a number of ways, including but not limited to, providing additional sensors, look up tables and/or magnet shaping.

Additional sensors can be added to the position measuring systems such that the pitch between the sensors is, for example, decreased to increase sensor resolution and noise immunity. By way of example only, in the case of the normal field measurement approach, with an additional two sensors, four combinations of angles or tangents can be calculated by, for example, processor 190. These four angles will produce four periods of tangents within one magnetic pitch as can be seen in FIG. 12A. Similarly, by way of example only, if an additional four sensors are added to the sensor groups 530, 730 described above eight periods of tangent will be produced for one magnetic pitch as can be seen in FIG. 12B.

Figure 12C:
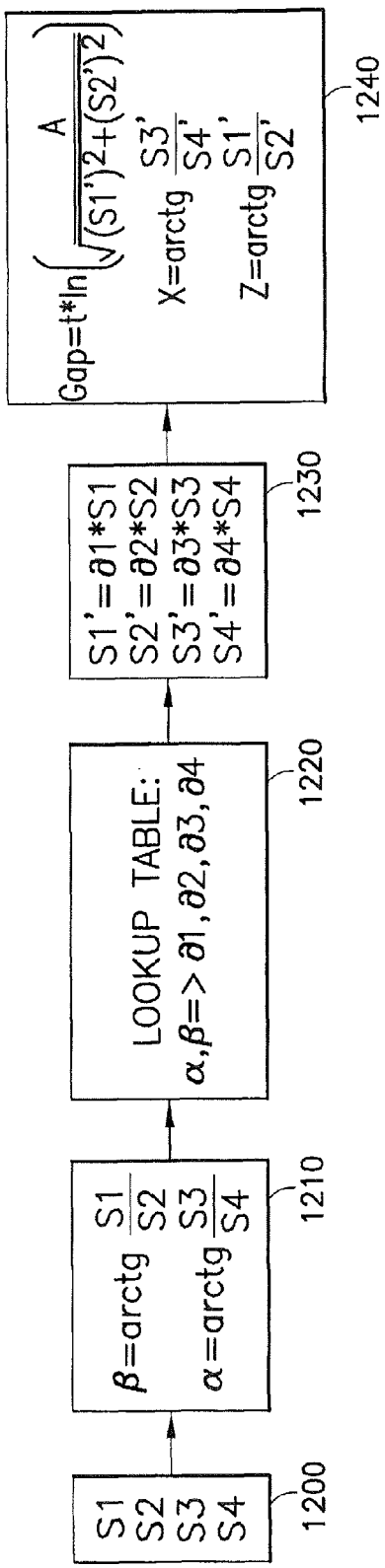
FIG. 12C illustrates a flow diagram in accordance with an exemplary embodiment.

Correction factors may also be utilized to provide increased noise immunity and increase the accuracy of the sensor. For example, in the parallel field approach, referring to FIG. 12C, single axis sensor readings S1-S4 are taken (FIG. 12C, Block 1200) and the initial position measurements are calculated by the processor as follows (FIG. 12C, Block 1210):

$$\alpha = \arctan\frac{S3}{S4} \quad [12]$$

$$\beta = \arctan\frac{S1}{S2} \quad [13]$$

where α represents the uncorrected position along the X-axis and β represents the uncorrected position along the Z-axis and S1-S4 represent outputs from their respective sensors S1-S4. Correction factors δ1, δ2, δ3, δ4 . . . δn are obtained from, for example, a look up table (FIG. 12C, Block 1220). The correction factors δ1-δn may be any suitable correction factors that may be obtained through, for example, experimentation, knowledge of the sensor sensitivity, the magnet operating point on the demagnetization curve and/or any other suitable information. The correction factors δ1-δn are utilized to calculate corrected sensor output values S1'-S4' as follows (FIG. 12C, Block 1230):

$$S1'=\delta1*S1 \quad [14]$$

$$S2'=\delta2*S2 \quad [15]$$

$$S3'=\delta3*S3 \quad [16]$$

$$S4'=\delta4*S4 \quad [17]$$

Figure 13:
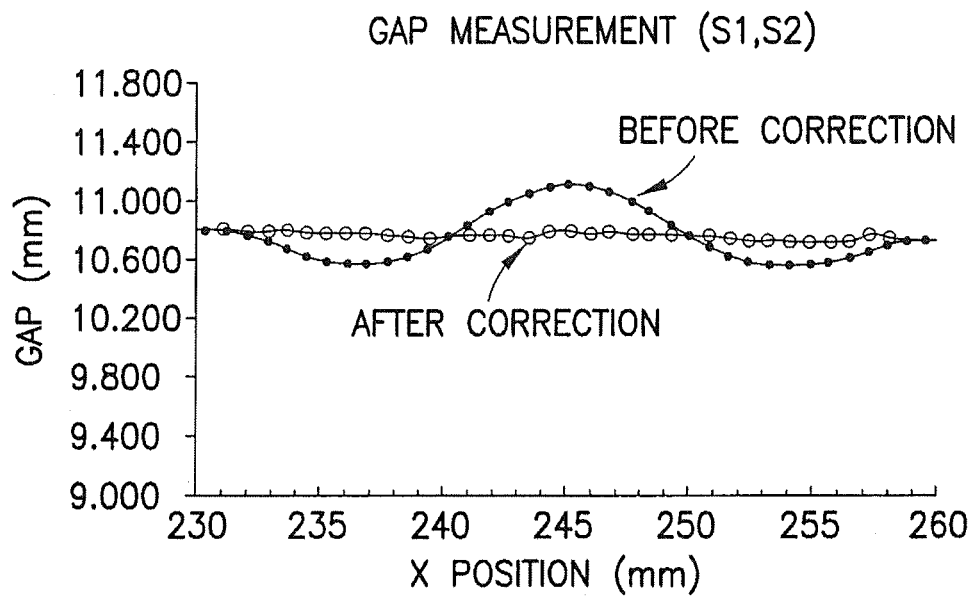
FIGS. 13 and 14 illustrate graphs representing different position measurement results in accordance with exemplary embodiments.
Figure 14:
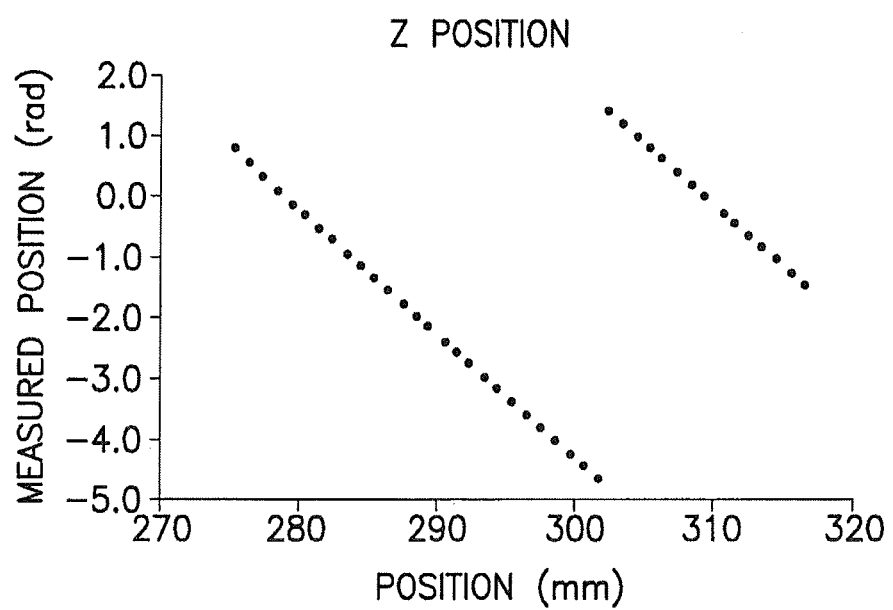

The corrected position along the X-axis, Z-axis and the corrected gap between the sensor group 730 and the magnetic platen 740 can be calculated by the processor 190 using the following exemplary formulas (FIG. 12C, Block 1240):

$$X = \arctan\frac{S3'}{S4'} \quad [18]$$

$$Z = \arctan\frac{S1'}{S2'} \quad [19]$$

$$\text{Gap} = t*\ln\left(\frac{A}{\sqrt{(S1')^2+(S2')^2}}\right) \quad [20]$$

where t and A are constants dependent on magnet geometry. FIGS. 13 and 14 show exemplary graphs of gap measurements and Z-axis measurements after the correction factors have been applied. Although the application of the correction factors was described with respect to the parallel field approach it should be realized that the correction factors can be applied to the normal field approach in a manner that is substantially similar to that described above.

As noted above, the magnets may also be shaped to increase the accuracy of the position measuring systems described herein. In the exemplary embodiments shown in the Figures, the magnets on the magnetic platen are shown has having a circular or diamond shape. However, it should be realized that the magnets may have any suitable shape including but not limited to, square, diamond, oval, rectangular, trapezoidal, circular, triangular, etc.

The shapes of the magnets on the magnetic platen can be configured to produce, for example, a sinusoidal type wave while minimizing error induced into the measurement as a result of a non-uniform magnetic field. Although the shaping of the magnets will be described below with respect to diamond and circular shaped magnets, the manner of optimization described herein can be applied to any suitably shaped magnet.

Figure 15A:
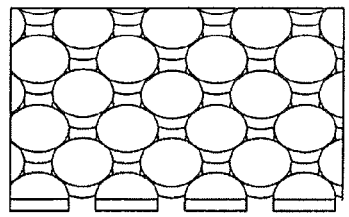
FIGS. 15A-15C show magnetic platen configurations in accordance with exemplary embodiments.
Figure 15B:
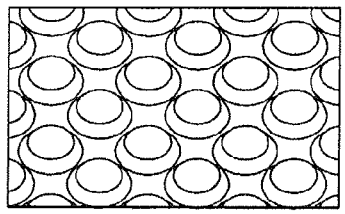
Figure 15C:
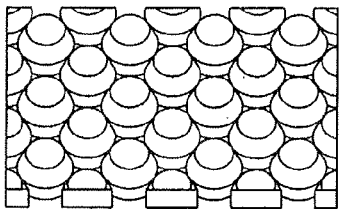
Figure 16A:
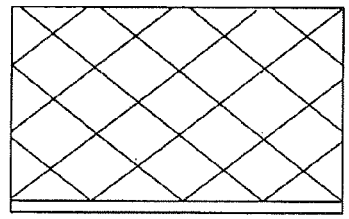
FIGS. 16A and 16B show magnetic platen configurations in accordance with other exemplary embodiments.
Figure 16B:
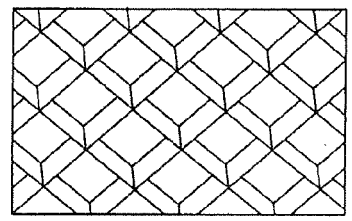

Referring now to FIGS. 15A-15C and 16A-16B, exemplary magnetic platens are shown. As can be seen in FIG. 15A, the magnetic platen includes an array of circular or cylindrical magnets. FIGS. 15B and 15C show the cylindrical magnets in an shaped such that each magnet in the array of magnets has a substantial cone shape (with a flat top). FIG. 15B illustrates the magnets having about a 50 degree edge or trim angle while FIG. 15C illustrates the magnets as having about a 60 degree edge or trim angle. FIG. 16A shows diamond shaped magnets in while FIG. 16B shows diamond shaped magnets having about a 50 degree edge or trim angle. In alternate embodiments the magnets may have any suitable edge angle. In still other alternate embodiments the magnets may have any suitable shape other than a substantial cone shape.

Figure 17:
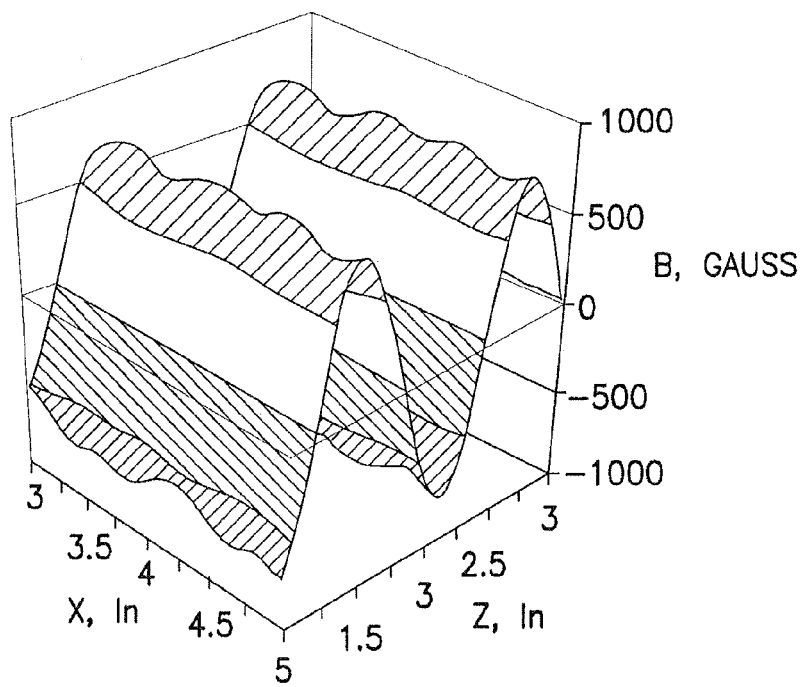
FIG. 17 represents a graph of a magnetic field generated by a magnetic platen.
Figure 19A:
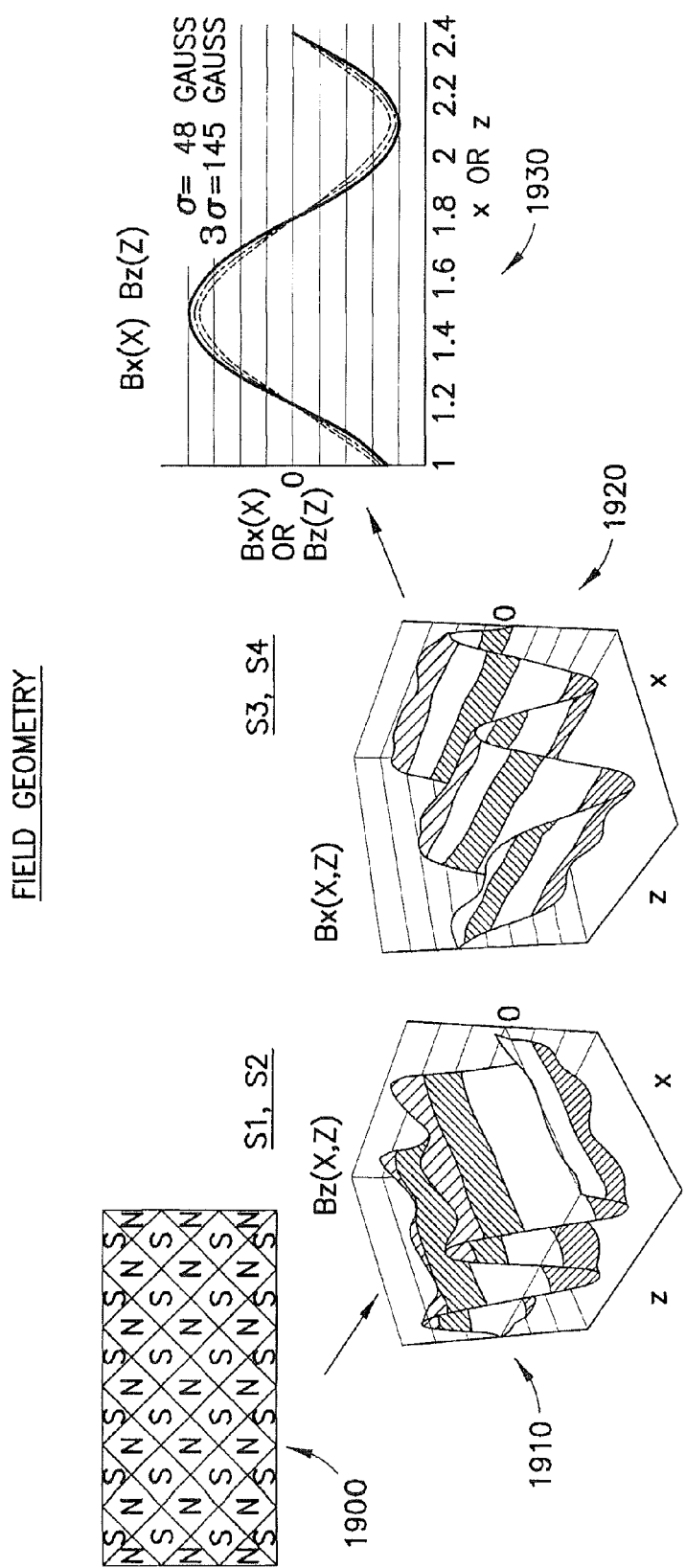
FIGS. 19A-19C represent graphs of magnetic field geometry of yet another magnetic platen in accordance with an exemplary embodiment.
Figure 19B:
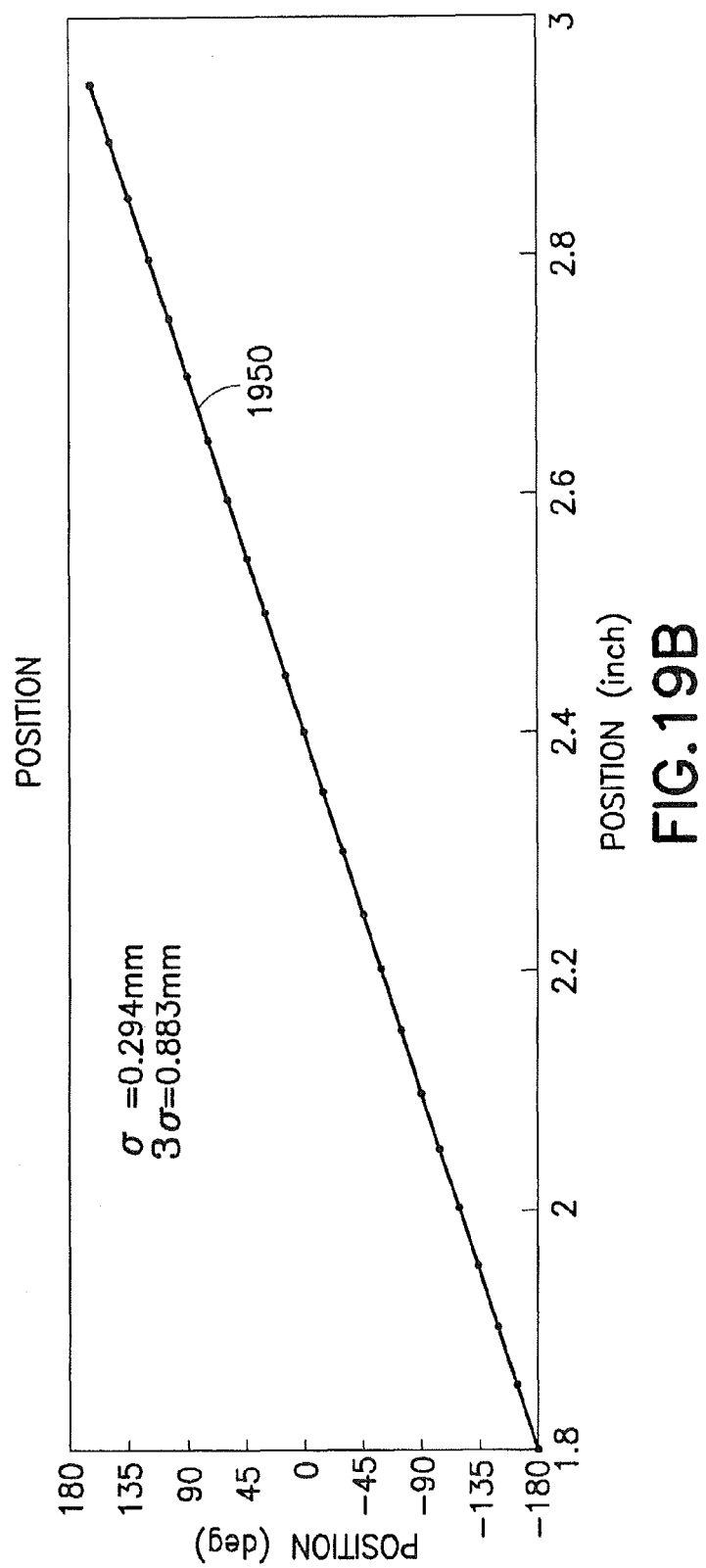
Figure 19C:
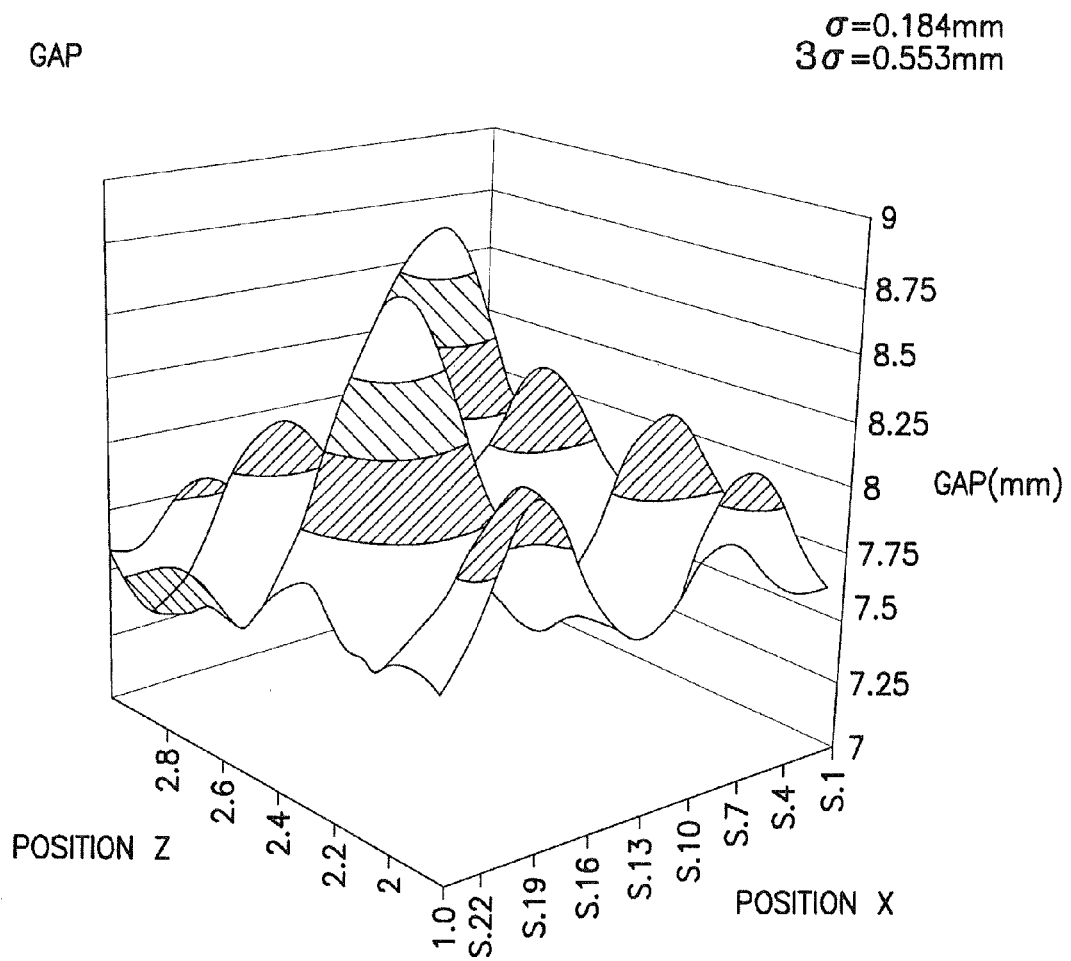

FIG. 17 illustrates the sinusoidal wave generated by the cylindrical magnets of for example, FIG. 15A as the platen passes by the sensors. As can be seen in FIG. 17, the sine wave is not smooth and there is fluctuation in the wave pattern along all axes (X, Z and magnetic field strength axes). With respect to the diamond shaped magnets, FIGS. 19A-19C illustrate the signals produced by a magnetic platen 1900 (see also FIG. 16A) in greater detail with respect to the parallel field approach. As can be seen in graphs 1910, 1920 of FIG. 19A the magnetic field strength in the Z-direction and X-direction, which is plotted against the positions along the X-axis and Z-axis is shown as having non-uniform peaks and valleys. These non-uniform peaks and valleys are also illustrated on the two-dimensional graph 1930 where the magnetic field strength is plotted versus the position along the X and Z axes. When the position along the X or Z axis is determined and the results are plotted on a graph as shown in FIG. 19B, positional data points corresponding to the angle of the sinusoidal wave are shown as being on both sides of a best fit line 1950. Similarly, when the gap distance between the magnetic platen and the sensors are plotted the gap is not illustrated as having a uniform distance measurement as can be seen in FIG. 19C.

Figure 18:
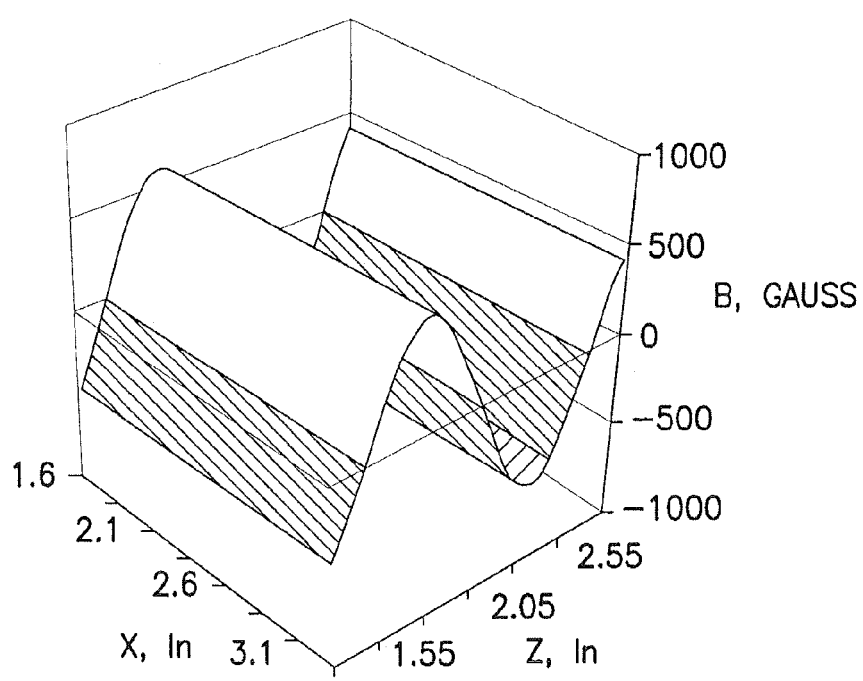
FIG. 18 represents a graph of a magnetic field generated by another magnetic platen.
Figure 20A:
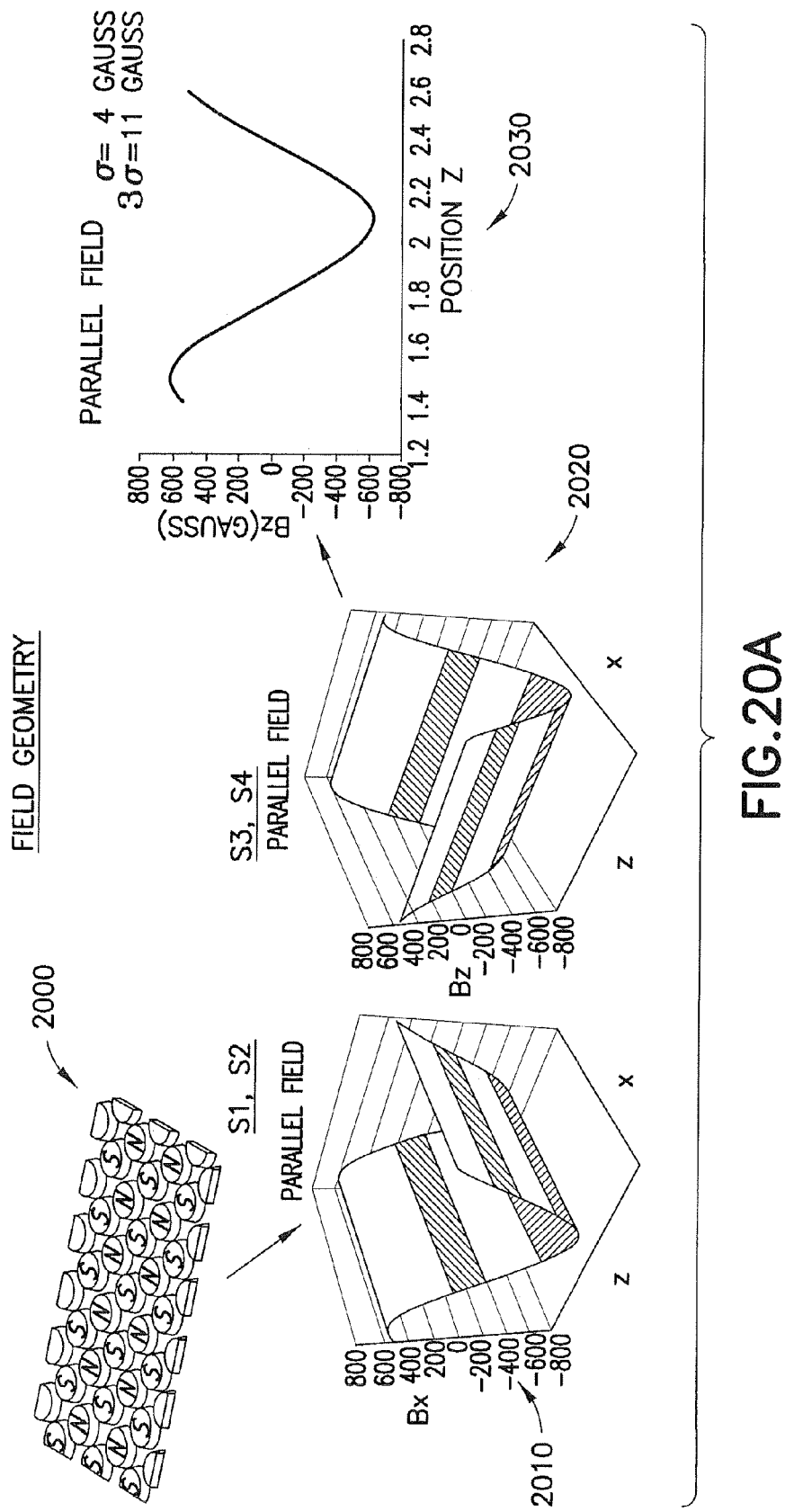
Figure 20C:
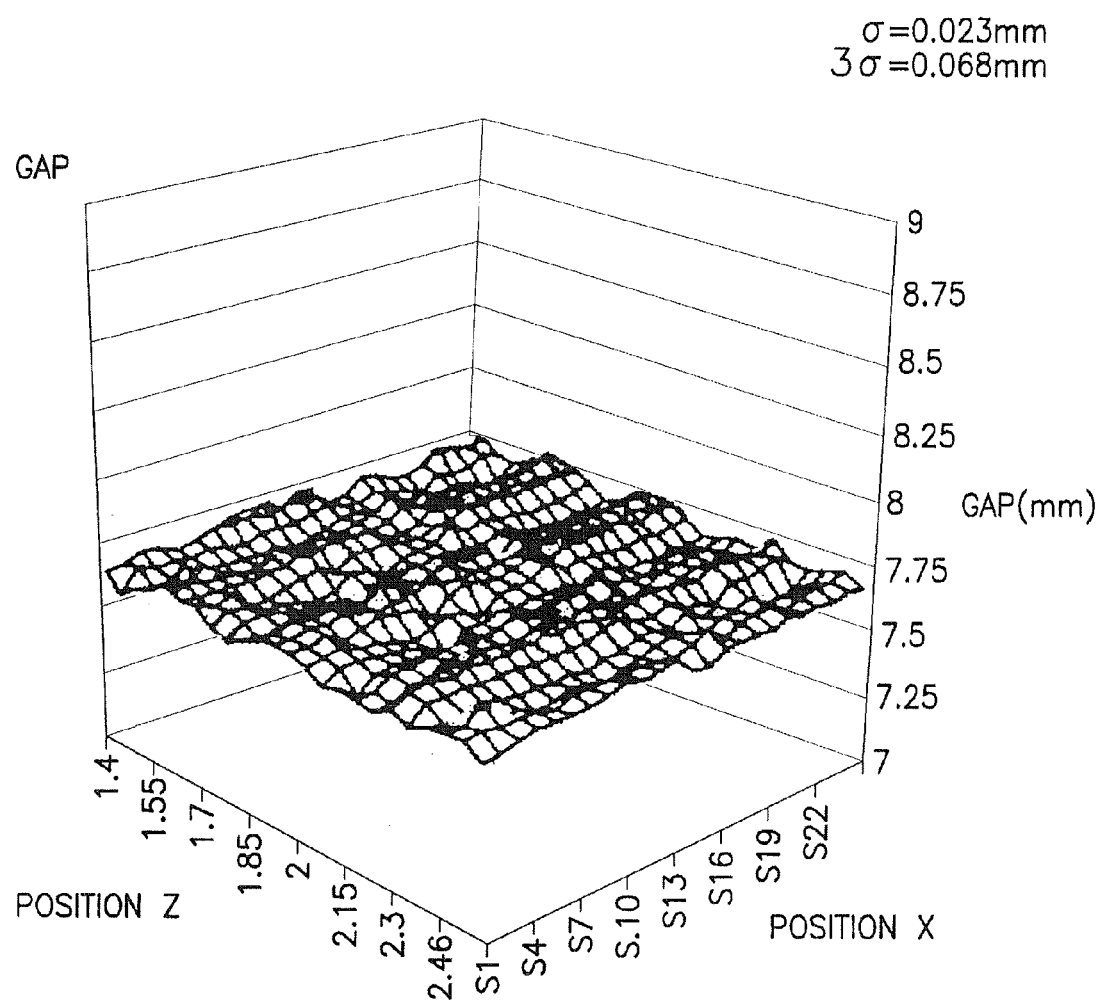

FIG. 18 illustrates the sinusoidal wave generated by the shaped magnets of, for example, FIGS. 15B, 15C and 16B as the platen passes by the sensors. As can be seen in FIG. 18, the sine wave is smooth such that positional measurements can be derived from the optimized sine wave with greater accuracy than those obtained from the non-smooth sine wave. FIG. 20A illustrates an exemplary optimized magnetic platen 2000. The magnetic platen 2000 may have a configuration that is substantially similar to that described above with respect to FIG. 4. As can be seen in FIG. 20A when the magnetic field strength is plotted against either the X-axis, Z-axis or both the X and Z axes the resulting sinusoidal wave 2010, 2020, 2030 is smooth such that measurements can be taken with minimized error when compared to measurements taken with the non-smoothed sine wave. As can be seen in FIG. 20B the positional data points corresponding to the angle of the sinusoidal wave are shown as being substantially along the line 2050. Similarly, when the gap distance between the magnetic platen and the sensors are plotted the gap is illustrated as having a substantially uniform distance measurement as can be seen in FIG. 20C.

Figure 21:
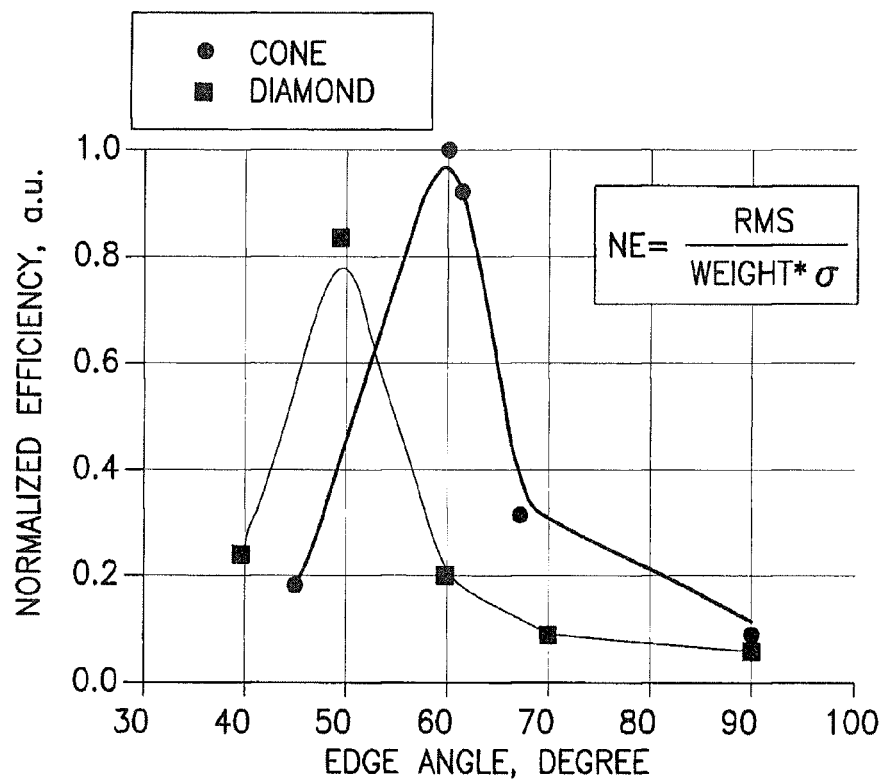
FIGS. 21-25 represent charts and graphs pertaining to the different magnetic platens in accordance with exemplary embodiments.
Figure 22:
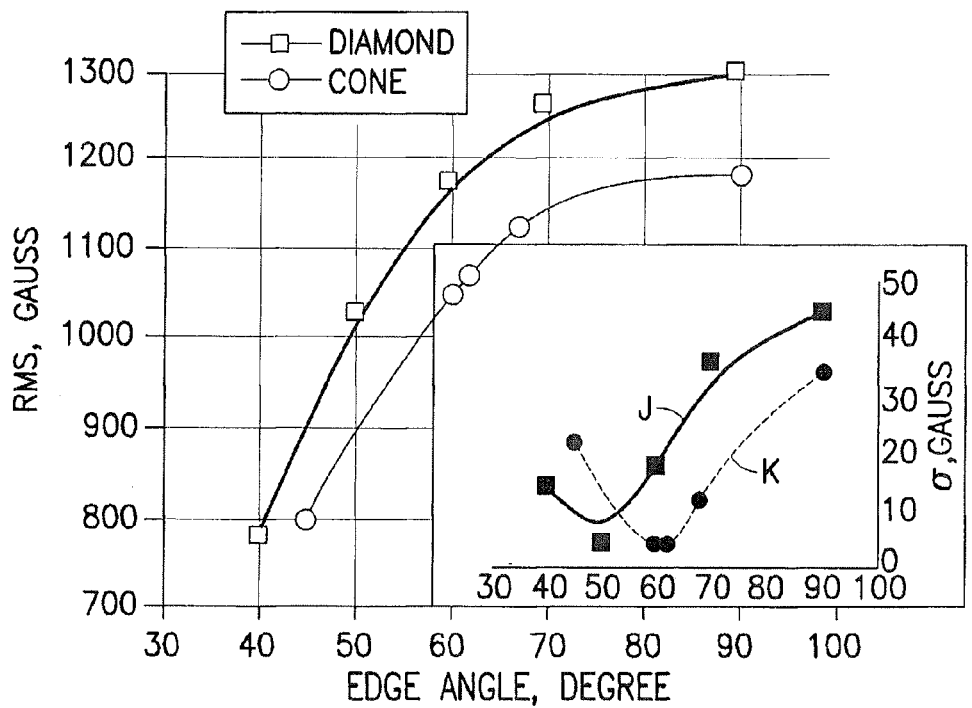
Figure 23:
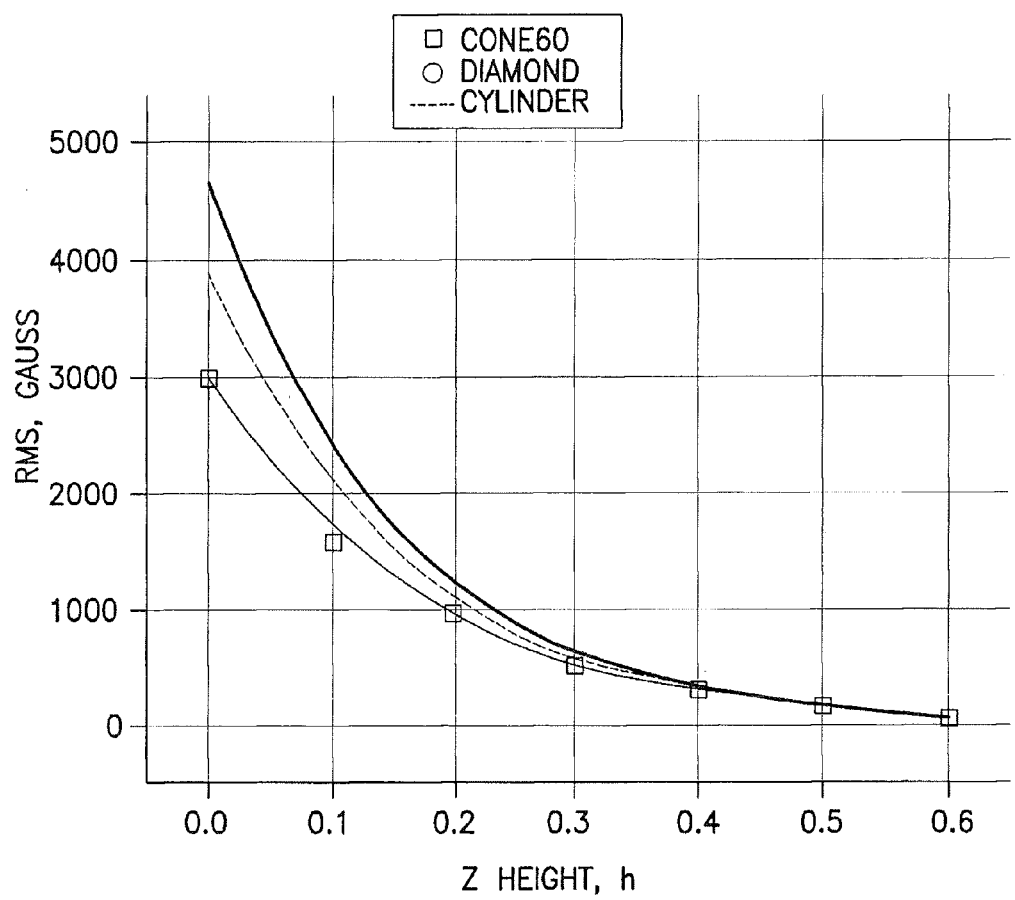
Figures 24, 25:
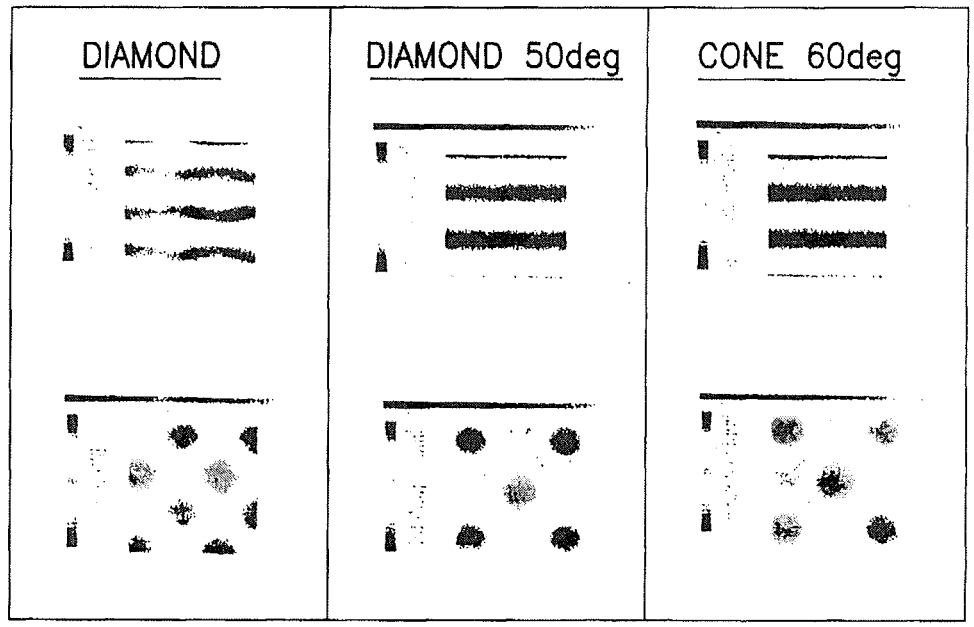
Figure 26:
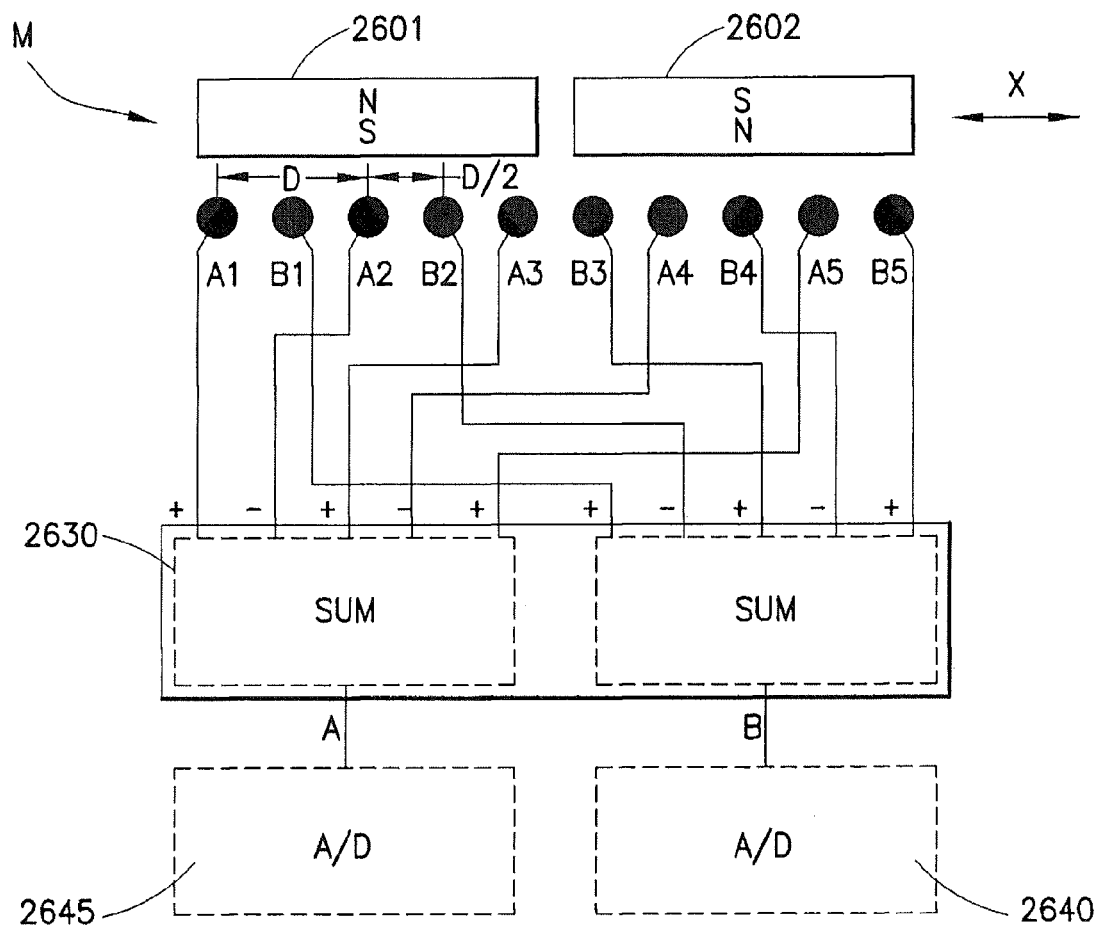
FIG. 26 is a schematic illustration of a portion of a position measurement system in accordance with an exemplary embodiment.
Figure 27:
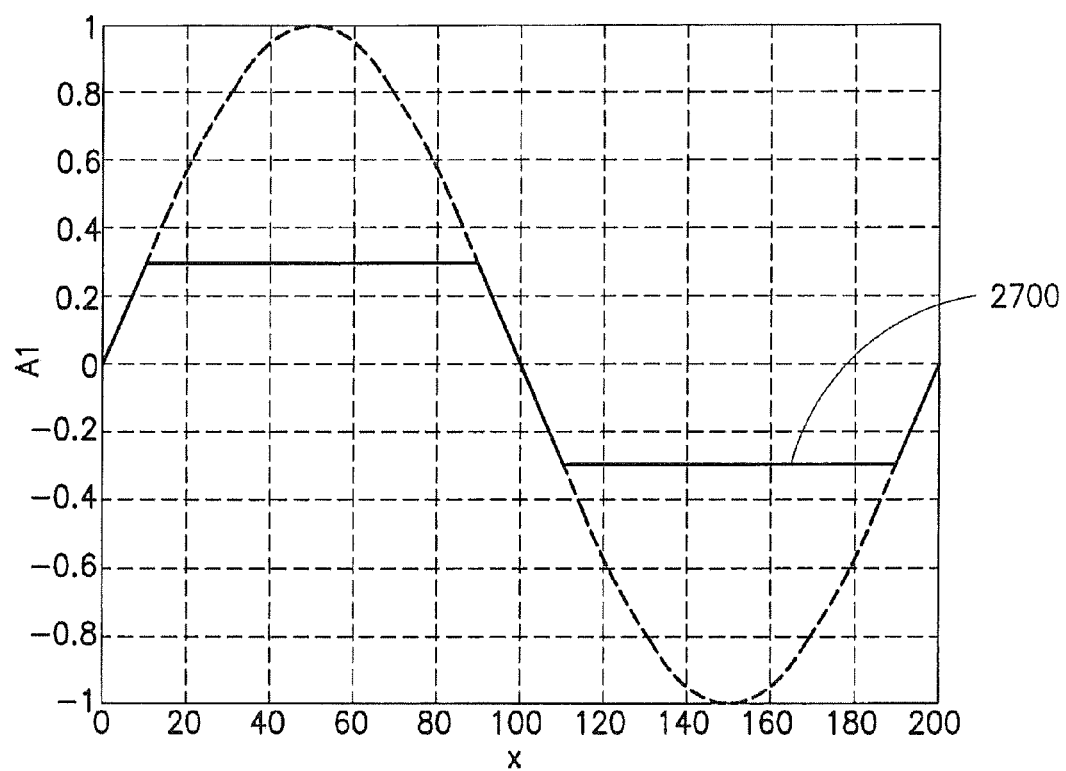
FIGS. 27-31 illustrate graphs of sensor output in accordance with an exemplary embodiment.
Figure 28:
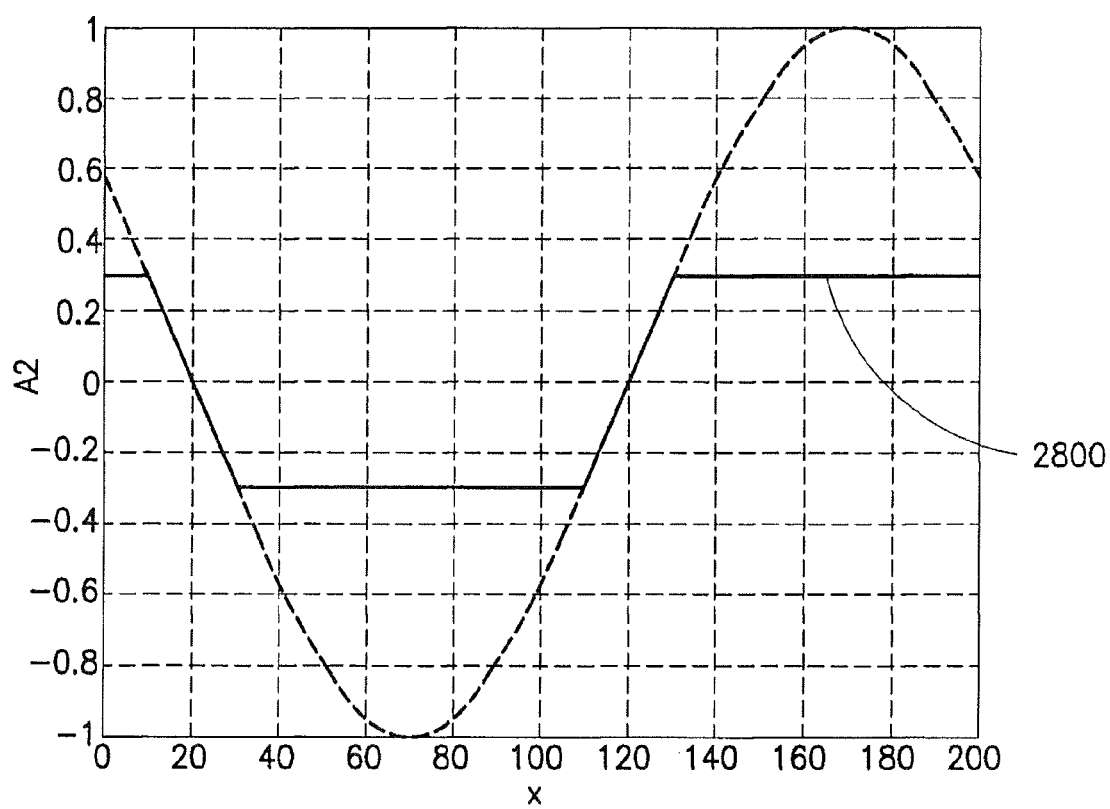
Figure 29:
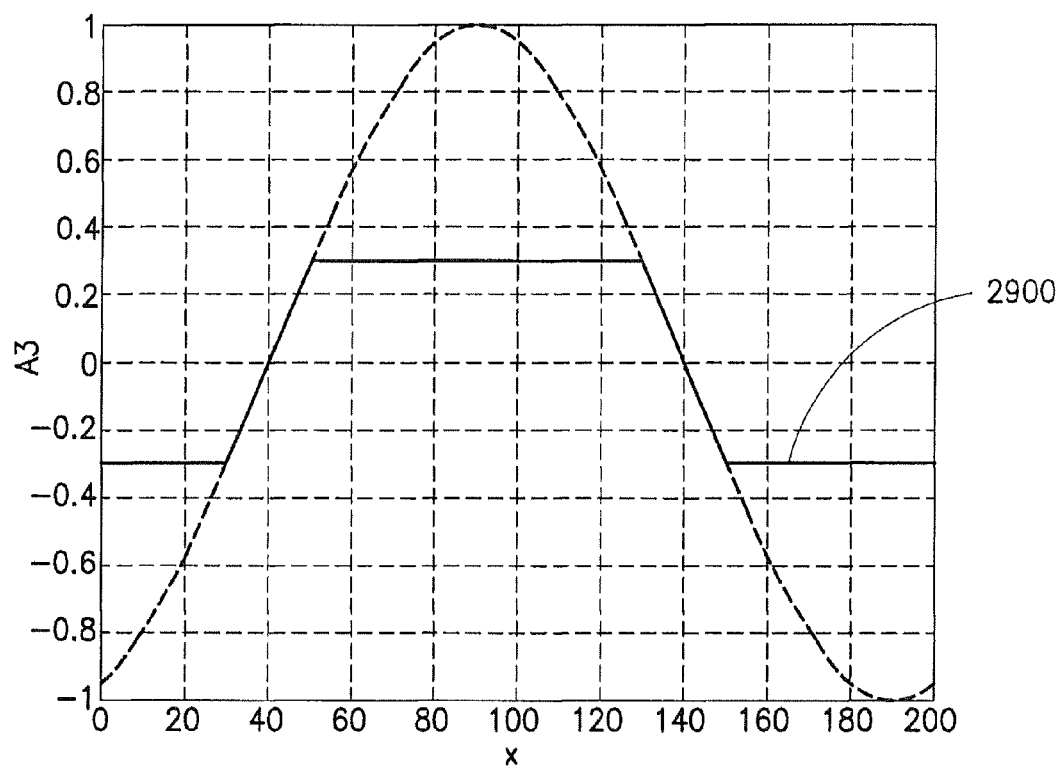
Figure 30:
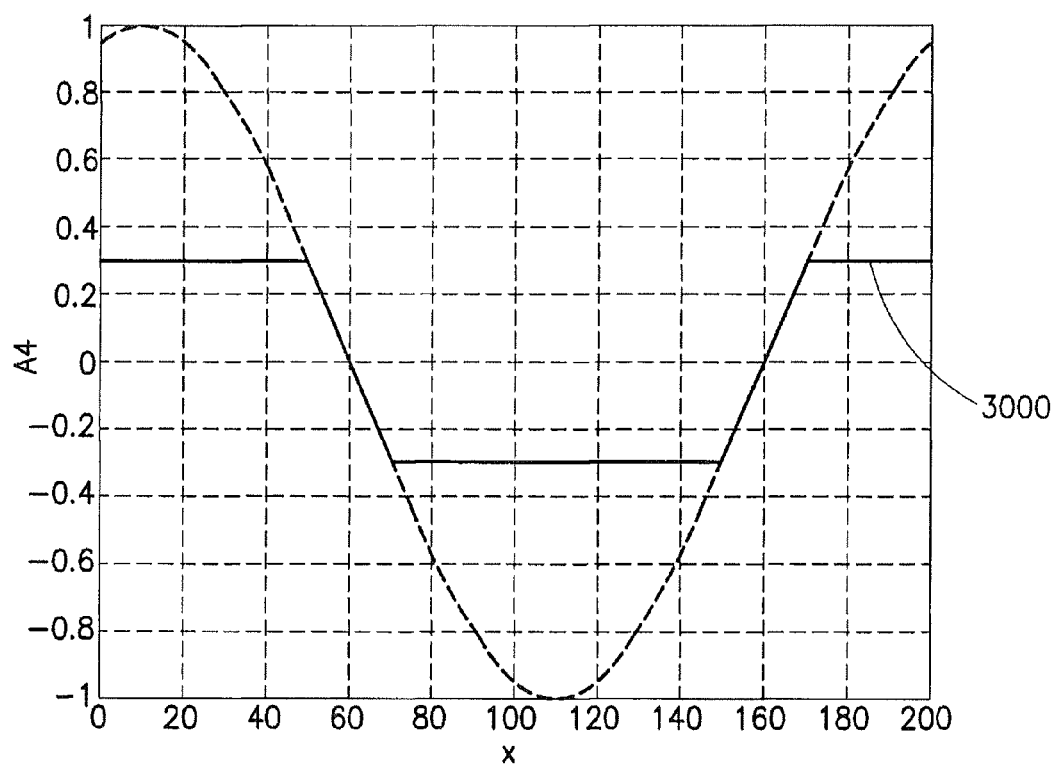
Figure 31:
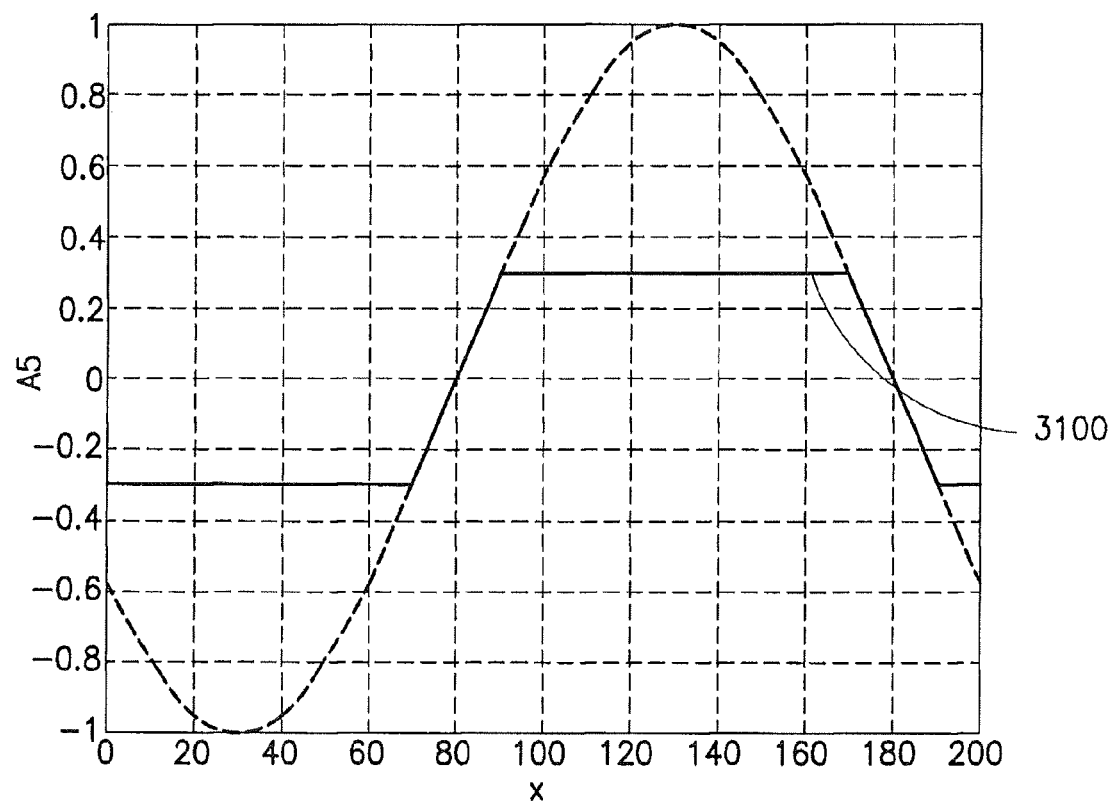

The magnetic field smoothing can be achieved by, for example trimming the edges or sides of the individual magnets of the magnetic platen. The value of the trim angle can be determined using standard deviation σ as a measure of the magnetic field distortion at the sensor location. For example, referring to FIG. 22 the standard deviation σ is closest to zero when the edge angle is about 50 degrees (See point "J") for the diamond shaped magnets and about 60 degrees (See point "K") for the cone shaped magnets. As can be seen in FIG. 21 the normalized efficiency of the magnetic field is also greatest when the trim angle for the diamond shaped magnet is about 50 degrees and when the trim angle for the cone shaped magnet is about 60 degrees where the normalized efficiency (NE) is defined as:

$$NE = \frac{RMS}{\text{Weight} * \sigma} \qquad [21]$$

where σ is the standard deviation, the weight is the weight of the magnetic platen(s) and RMS is the root mean square of the magnetic field strength (See also, FIG. 25 for exemplary values of NE). FIG. 23 further illustrates the relationship between the strength of the magnetic field with respect to a distance from the magnets of the magnetic platen while FIG. 24 illustrates the effects of the magnetic field for a diamond magnet that produces a non-smooth field and the shaped diamond and cone magnets that produce smooth fields. In alternate embodiments, the magnetic field can be smoothed in any suitable manner.

In accordance with another exemplary embodiment a position sensing resolution enhancer (PSRE) is provided to allow for increasing the resolution of a position feedback device (when compared with a base resolution of the feedback device), such as those described herein, in the analog domain. In one exemplary embodiment the PSRE may be part of the processor 190 while in alternate embodiments the PSRE may be separate from the controller 190. In one exemplary embodiment the PSRE can be positioned between, for example, the output(s) of one or more feedback sensors and an input of a motor controller. In alternate embodiments the PSRE may be positioned in any suitable location for modifying the signals produced by a sensor. It is noted that while a motor controller is used in the examples, that the controller may be any suitable controller that receives signals from position sensors. In this exemplary embodiment the PSRE operates on the position sensor signal through one or more of multiplication, division and amplification to double, quadruple, etc. the frequency of, for example, the sinusoidal distribution of the position signals to increase the position sensing resolution by a factor of 2, 4, etc. respectively. In other exemplary embodiments the PSRE may also allow for optimized monitoring of the signal amplitude, which can be used as, for example, a rotor-stator gap measuring device. In alternate embodiments the optimized monitoring of the signal amplitude can be used for any suitable diagnostic purpose in rotary or linear applications, such as (but not limited to) for example, those described herein.

As will be described in greater detail below, in one exemplary embodiment, squaring both the sine and cosine signals from sensor results (such as from the sensors described above) in derived signals that are sinusoidal signals but with a period of just half of their respective original signals, which in this example, doubles the sensor resolution. However, if signal amplitude is variable, such as with magnetic sensors due to, for example, changing gap and/or temperature, analog to digital converters generally produce fewer significant bits with smaller amplitude, effectively reducing the position resolution. The signals resulting from the variable amplitude have to be offset by a value proportional to the amplitude. To avoid the problems due to variable amplitudes, the exemplary embodiments, in one example, separate the phase from the amplitude of the signal. This can be done by squaring both the sine and cosine signals and adding their squares to obtain the square of the amplitude. The amplitude variation is substantially eliminated by dividing the squared signals by the squared amplitude such that the phase related signals remain within analog to digital converter range to provide the same angular resolution independent of signal variation. As noted before, consecutive signal squaring doubles position resolution accordingly.

It should be realized that if the amplitude of the sensors is to be used for processing such as, sensing the magnetic gap variation or any other suitable purpose, the pure squared amplitude signal can be pre-processed in the analog domain to achieve optimized linearity and resolution in the range of interest.

Figure 35:
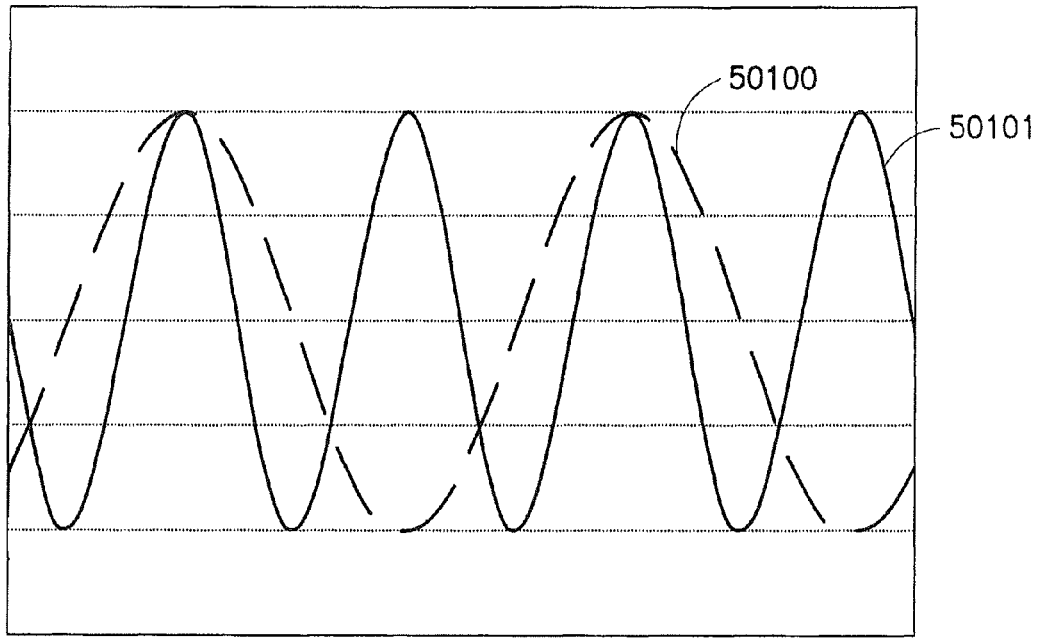
FIG. 35 illustrates exemplary signal processing in accordance with an exemplary embodiment.
Figure 36:
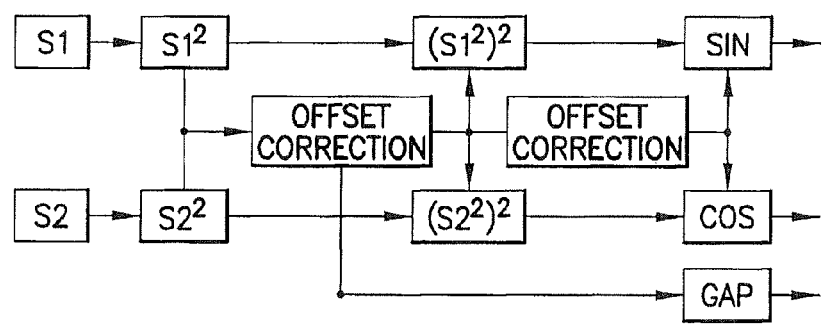
FIG. 36 is a block diagram illustrating signal processing in accordance with an exemplary embodiment.
Figure 37:
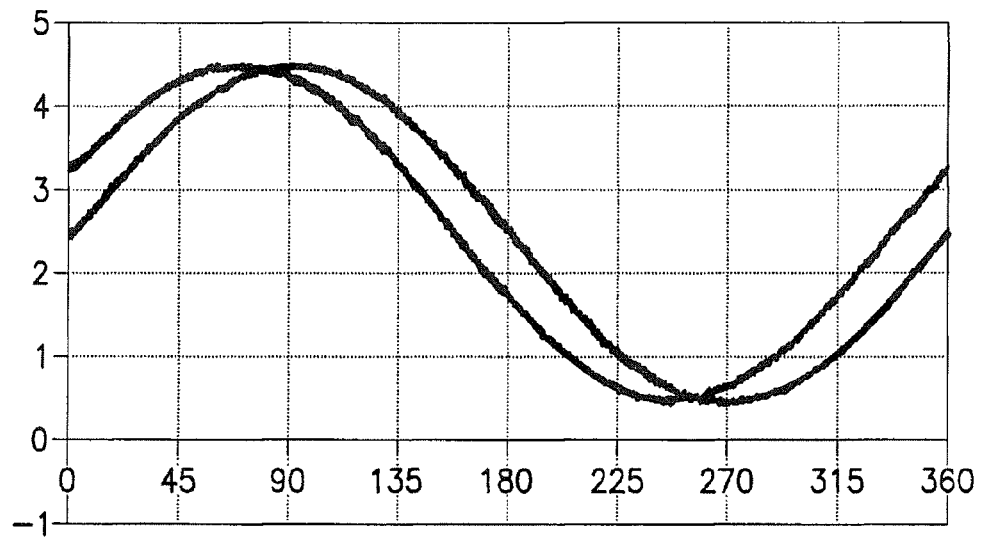
FIGS. 37-39 illustrate signals processed in accordance with the exemplary embodiments.
Figure 38:
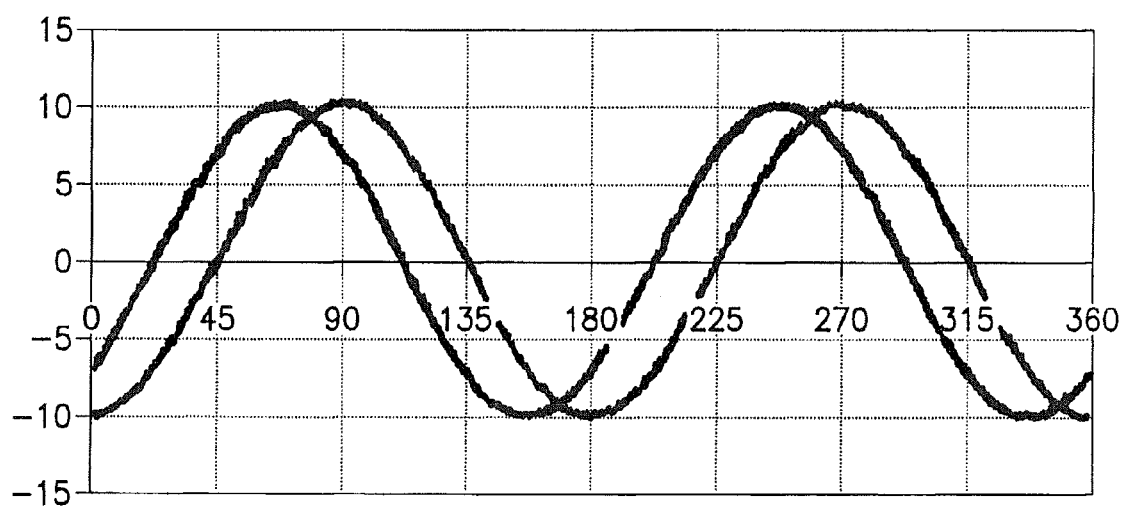

Referring now to FIG. 35 the resolution enhancement as performed by the PSRE described above is illustrated. In one example, signals obtained with single axis sensors sensing a magnetic field with a sinusoidal distribution are squared and then offset to obtain, for example, a desired direct current level for doubling (quadrupling, etc.) the resolution of the signals. As can be seen in FIG. 35, line 50100 represents the original sensor signals and line 50101 represent the signal after doubling as will be described herein. As can be seen in the figure, the doubled signal 50101 has a period substantially half of the original signal 50100. FIG. 35 illustrates a block diagram of an exemplary process to, for example, double and quadruple the resolution of a sensor in accordance with the exemplary embodiments. In alternate embodiments the resolution of the sensor can be doubled (quadrupled, etc.) in any suitable manner. In FIG. 36 S1, S2 represent the original or base single axis sensor signals, as shown in FIG. 37 where $$S1 = A\sin(x) \qquad [22]$$

and $$S2 = A\sin(x+\Phi) \qquad [23]$$

where Φ is a fixed phase shift between the two signals and A is the amplitude. In one exemplary embodiment, Φ may be for example, a hardware determined phase shift. In alternate embodiments the value of Φ may be determined in any suitable manner. For ease of explanation the position related to sinusoidal signal distribution will be referred to herein as "frequency". In one exemplary embodiment to obtain sine and cosine signals of a quadruple frequency, the value of Φ may be equal to about 22.5°. In alternate embodiments the value of Φ may be any other suitable value for obtaining the desired frequency. S1$^2$, S2$^2$, as shown in FIG. 36 represent signals S1, S2 after corresponding offsets and correction squaring. It is noted that the frequency of S1$^2$, S2$^2$ is substantially doubled.

It is noted that in one exemplary embodiment, the offset may be corrected by the PSRE by constructing the cosine signal based on the initial sin(x) and sin(x+Φ) signals using the exemplary mathematical relationship:

$$\sin(x+\Phi) = \sin x \cos \Phi + \cos x \sin \Phi \quad [24]$$

where sin Φ and cos Φ are known constant coefficients determined by, for example, sensor spacing. In alternate embodiments, sin Φ and cos Φ may have any suitable values.

The above exemplary equation [24] may be physically represented by:

$$A \sin(x+\Phi) = A \sin x \cos \Phi + A \cos x \sin \Phi \quad [25]$$

where A is the amplitude of the signal voltage swing. As such, $$A\cos(x) = \frac{A\sin(x+\Phi) - A\sin(x)\cos(\Phi)}{\sin(\Phi)} \quad [26]$$

Both the sin(x), cos(x) functions may be squared to calculate an amplitude as follows $$A^2 \sin^2(x) + A^2 \cos^2(x) = A^2 \quad [27]$$

Figure 39:
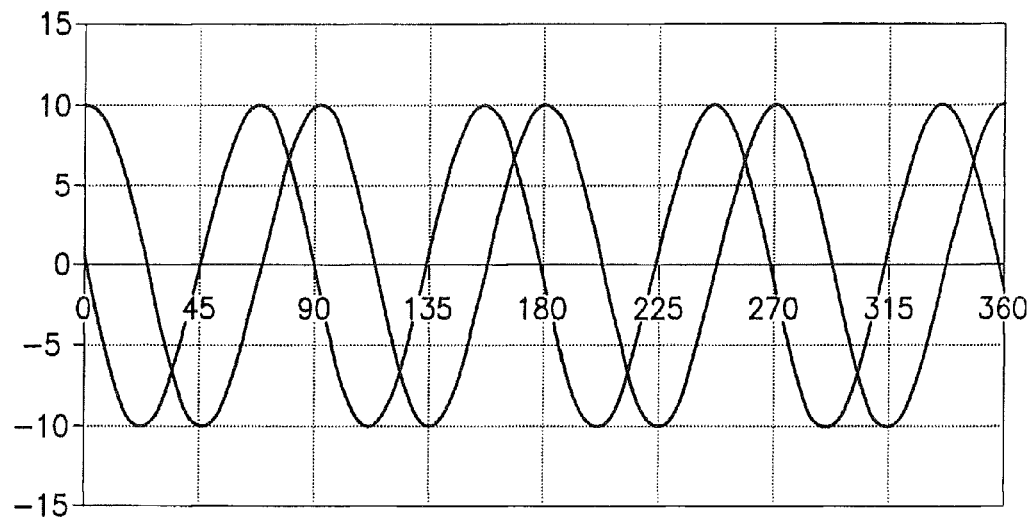

This amplitude may be used for offset correction and signal conditioning such as to, for example, change the amplitude to a level optimal for further processing, by dividing both signals by $A^2$ $$\frac{A^2 \sin^2(x)}{A^2} = \sin^2(x) \quad [28]$$

$$\frac{A^2 \sin^2(x+\Phi)}{A^2} = \sin^3(x+\Phi) \quad [29]$$

to produce signals independent from amplitude variation. After a second offset correction and multiplication of two sine/cosine signals a quadruple frequency can be obtained with respect to the original input signals S1, S2 as shown in FIG. 39. It is noted that, the signals can be adjusted repeatedly to obtain a desired accuracy as can be seen in FIG. 36 where the doubled signals S1$^2$, S2$^2$ are again doubled to form the quadrupled signals (S1$^2$)$^2$, (S2$^2$)$^2$.

Figure 40:
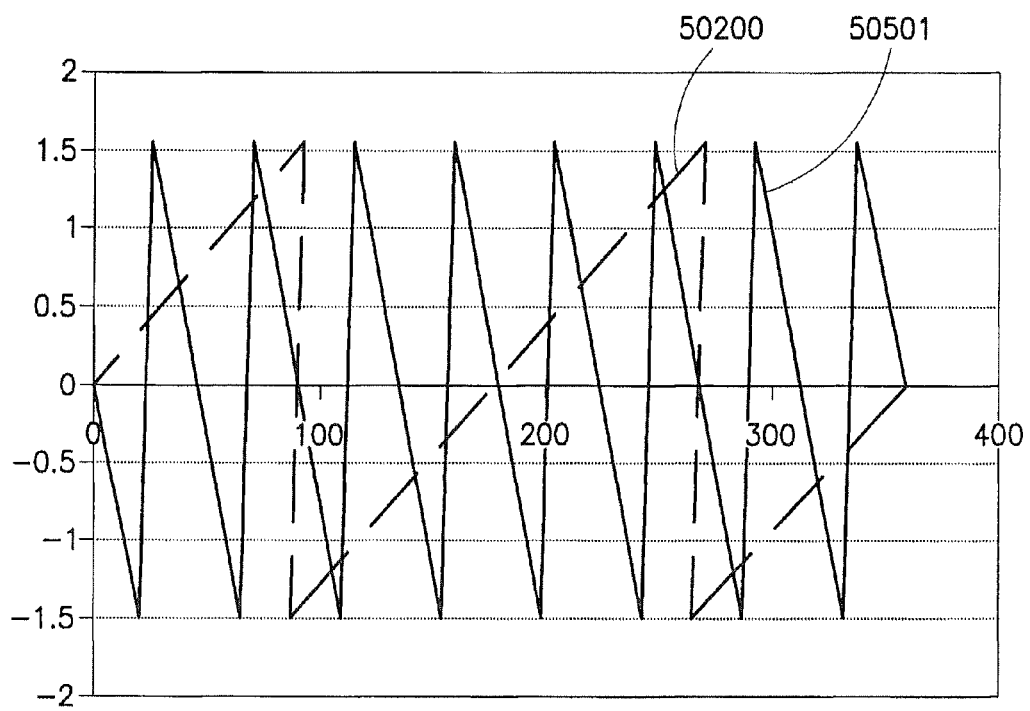
FIG. 40 illustrates frequency signals in accordance with an exemplary embodiment.

Frequency multiplication as described herein may lead to increased position accuracy, which in the case of, for example, ideal signals is illustrated as shown in FIG. 40. As can be seen in FIG. 40, both of the lines 50200, 50201 represent arctan(sine/cosine) functions used for position calculations. The line 50200 may be expected for a signal with a frequency f (or magnetic pitch P), while the line 50201 may be expected for the frequency 4*f (or pitch P/4). As can be seen in FIG. 40, the exemplary embodiments virtually lower the magnetic pitch to increase resolution of the position sensors, such as the sensor described herein.

Figure 41:
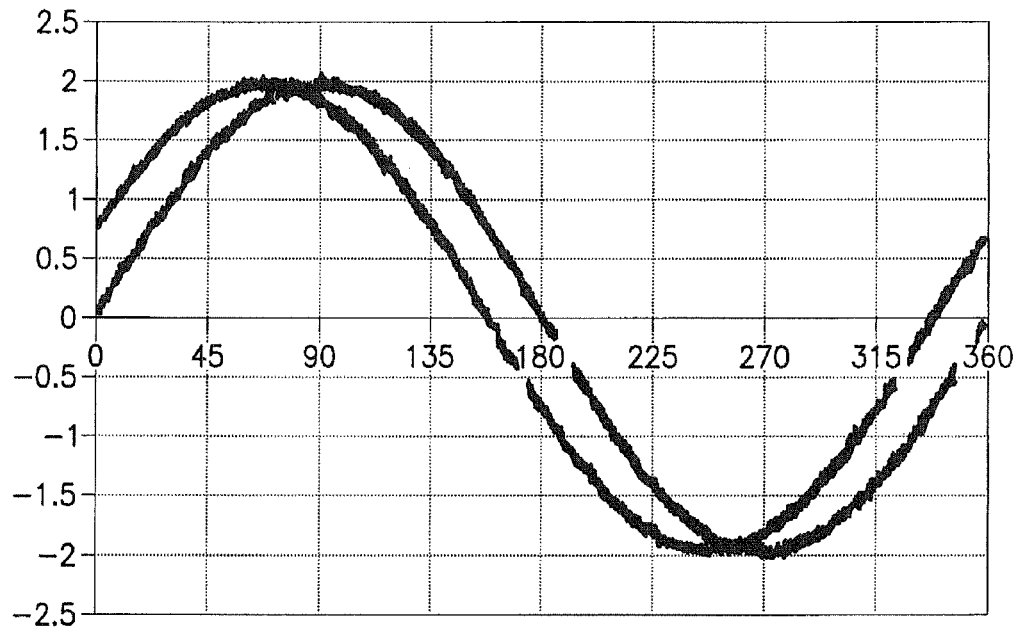
FIGS. 41-44 illustrate input and output signals considering signal errors in accordance with an exemplary embodiment.
Figure 42:
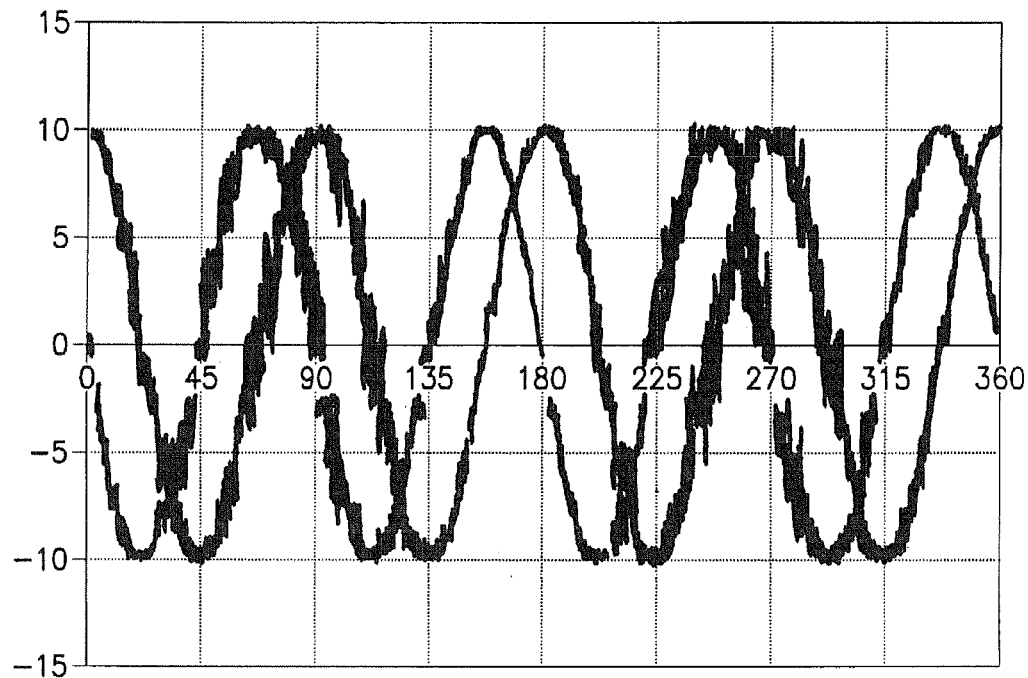

The stability of the resolution enhancement disclosed herein will be described with respect to FIGS. 41-44. In the examples below, randomly generated disturbances of the corresponding input signals are introduced. In one example, FIG. 41 shows an input signal having, for example, about a 5% error and FIG. 42 shows the corresponding output signal. As may be realized, by applying double squaring, as described above, for the channels of the sensor signal, any additive noise may be quadrupled. The amplification of the noise may be reduced by dynamic automatic gain control matching single amplitude to analog to digital converter range and optimizing digitization inherent error, a noise high frequency band can be filtered out before signal processing, cross correlating the channels (e.g. amplitude calculation) to at least partially dampen synchronous remaining noise and relating asynchronous remaining noise to quadrupled position resolution. In alternate embodiments the amplification of noise can be reduced in any suitable manner. It is also noted that in some cases the noise introduced by the sensor electronics may be neglected.

In accordance with an exemplary embodiment, position resolution may be estimated for a position feedback system that uses position dependant sinusoidal functions. In the example, for illustration purposes only, the feedback system uses two stationary Hall effect sensors (or any other suitable single axis sensors) positioned ¼ magnetic pitch apart (i.e. 90° phase shift) for sensing a sinusoidal magnetic field generated by a rotor/platen with permanent magnets. In alternate embodiments the system may use any suitable number or any suitable type of sensors. As may be realized the two single axis sensors produce rotor/platen dependent sinusoidal signals (e.g. sine and cosine signals). By taking the arctangent of the ratio of these two signal values $$\alpha = \arctan\left(\frac{\sin}{\cos}\right) \quad [30]$$

the periodic position of the motor (in degrees) can be determined. In equation [30] sin and cos represent periodic signals, not the functions. In alternate embodiments the feedback system may use any suitable number of single axis sensors for determining the position of the motor in any suitable unit of measure. To calculate the position resolution error $\varepsilon_\alpha$ the PSRE may take the partial derivatives $\partial/\partial$ sin and $\partial/\partial$ cos from equation [30]

$$\varepsilon_\alpha = \varepsilon_{sin} * \frac{\partial}{\partial \sin}\left[\arctan\left(\frac{\sin}{\cos}\right)\right] + \varepsilon_{cos} * \frac{\partial}{\partial \cos}\left[\arctan\left(\frac{\sin}{\cos}\right)\right] \quad [31]$$

where $\varepsilon_{sin}$ and $\varepsilon_{cos}$ are individual errors for sin and cos signals, correspondingly. Using the following simplifications $$\frac{d}{dx}[\arctan(U(x))] = \frac{1}{1+U^2} * \frac{dU}{dx} \quad [32]$$

$$\frac{d}{d\sin}\left[\frac{\sin}{\cos}\right] = \frac{1}{\cos} \quad [33]$$

$$\frac{d}{d\cos}\left[\frac{\sin}{\cos}\right] = -\frac{\sin}{\cos^2} \quad [34]$$

one can find $\epsilon_\alpha$ equal to $$\epsilon_\alpha = \left[\epsilon_{sin} * \left(\frac{1}{1+\sin^2/\cos^2}\right) + \left(\frac{1}{\cos}\right)\right] + \quad [35]$$
$$\left[\epsilon_{cos} * \left(\frac{1}{1+\sin^2/\cos^2}\right) + \left(\frac{-\sin}{\cos^2}\right)\right]$$
$$= \left[\epsilon_{sin} + \left(\frac{\cos}{\sin^2+\cos^2}\right)\right] - \left[\epsilon_{cos} * \left(\frac{\sin}{\sin^2+\cos^2}\right)\right]$$

Figure 45:
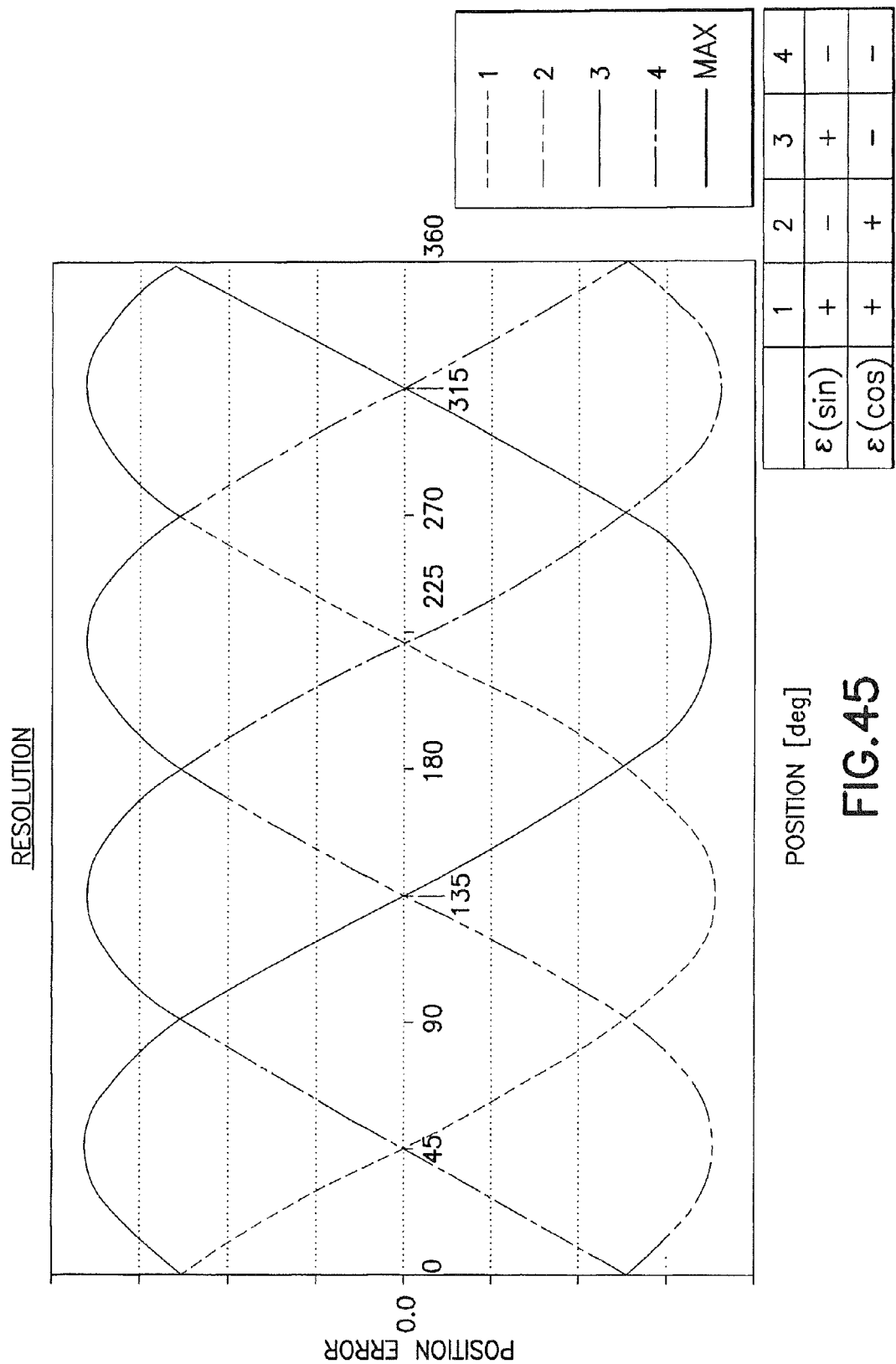
FIGS. 45 and 46 respectively illustrate sensor and gap resolution functions in accordance with the exemplary embodiments.

If the sine and cosine signals are replaced with the sine and cosine functions equation [35] can be rewritten as $$\epsilon_\alpha = \left[\epsilon_{sin} * \left(\frac{A\cos\alpha}{A^2\sin\alpha^2 + A^2\cos\alpha^2}\right)\right] - \left[\epsilon_{cos} * \left(\frac{A\sin\alpha}{A^2\sin\alpha^2 + A^2\cos\alpha^2}\right)\right] \quad [36]$$
$$= \frac{A}{A^2(\sin\alpha^2 + \cos\alpha^2)} * [\epsilon_{sin} * \cos\alpha - \epsilon_{cos} * \sin\alpha]$$
$$= \frac{1}{A} * [\epsilon_{sin} * \cos\alpha - \epsilon_{cos} * \sin\alpha]$$

where A is the amplitude of the signals. If it is assumed that the range of the analog to digital converter is equal to 2*A (volts) (i.e. the full range of the analog to digital converter is used) and the main source of the signal uncertainty errors is the analog to digital converter resolution $N(bits)=(2*A)/2^N$ (volts), linear position resolution $\epsilon_X$ can be described as $$\epsilon_X = \epsilon_\alpha * \frac{P}{2\pi} = \frac{P}{2\pi} * \frac{1}{A} * \left[\left(\pm \frac{2A}{2^N}\cos\alpha\right) - \left(\pm \frac{2A}{2^N}\sin\alpha\right)\right] \Rightarrow \quad [37]$$
$$\epsilon_X = \frac{P}{\pi * 2^N} * [(\pm\cos\alpha) - (\pm\sin\alpha)]$$

where P is the sine/cosine signal period (e.g. magnetic pitch). As can be seen from equation [37], a sensor's overall resolution is a periodic function with maximum values at, for example, 45, 135, 225 and 315 degrees as shown in FIG. 45.

Where the sensors are connected to an analog to digital converter through a resolution multiplier such as that shown in block diagram form in FIG. 47 (it is noted that FIG. 47 represents an exemplary multiplier and in alternate embodiments the multiplier may have any suitable configuration and components for carrying out signal multiplication as described herein), it should be realized that the noise level of the signals output from the multiplier should not exceed the resolution of the analog to digital converter. FIG. 47A illustrates an exemplary electrical schematic of the block diagram of FIG. 47. As may be realized in alternate embodiments any suitable electrical circuit may be employed for carrying out the block diagram of FIG. 47. The noise based on the number of consecutive signal multiplications can be expressed as $$S = \sin^{2*n} \Rightarrow \quad [38]$$
$$\epsilon_S = \epsilon_{sin} * \frac{\partial}{\partial \sin}\sin^{2*n} = \epsilon_{sin} * 2 * n * \sin^{2*n-1}$$

where n is the number of multiplications. As described above, squaring the sinusoidal function produces a sinusoidal function with a doubled frequency (e.g. half the period) such that the linear position resolution $\epsilon_X$ can be rewritten as $$\epsilon_X = \frac{P}{\pi * 2^N * (2*n)} * [(\pm\cos\alpha) - (\pm\sin\alpha)] \quad [39]$$

where P is the period of the original signal. As may be realized each additional signal multiplication is doubling linear resolution of the feedback device. It should be realized that the above equations used by the PSRE showing the linear position resolution are exemplary only and that the position resolution can be derived using any suitable equations.

Figure 43:
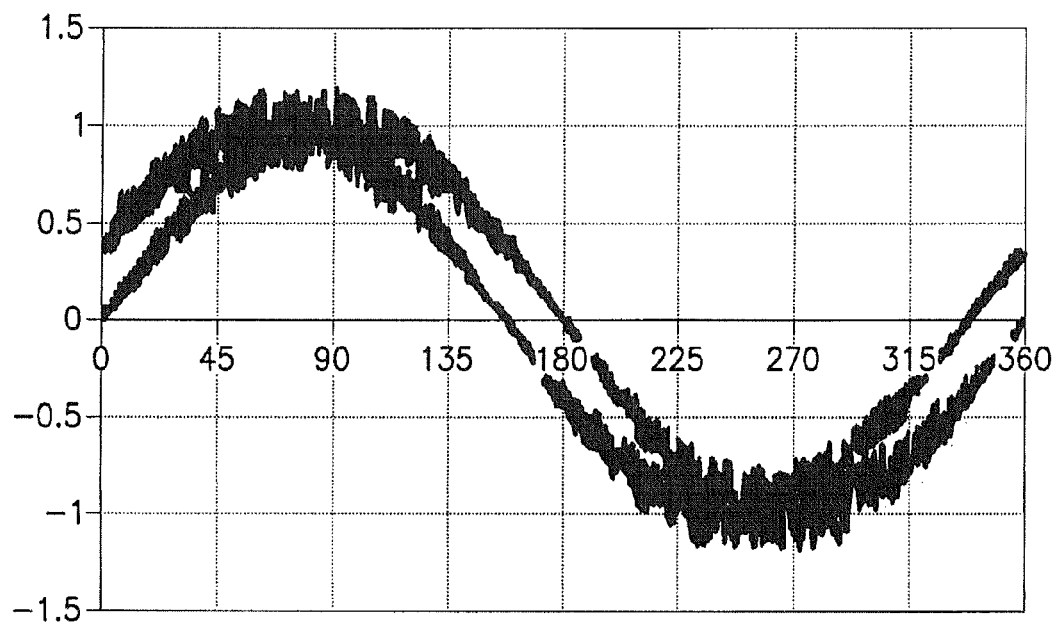
Figure 44:
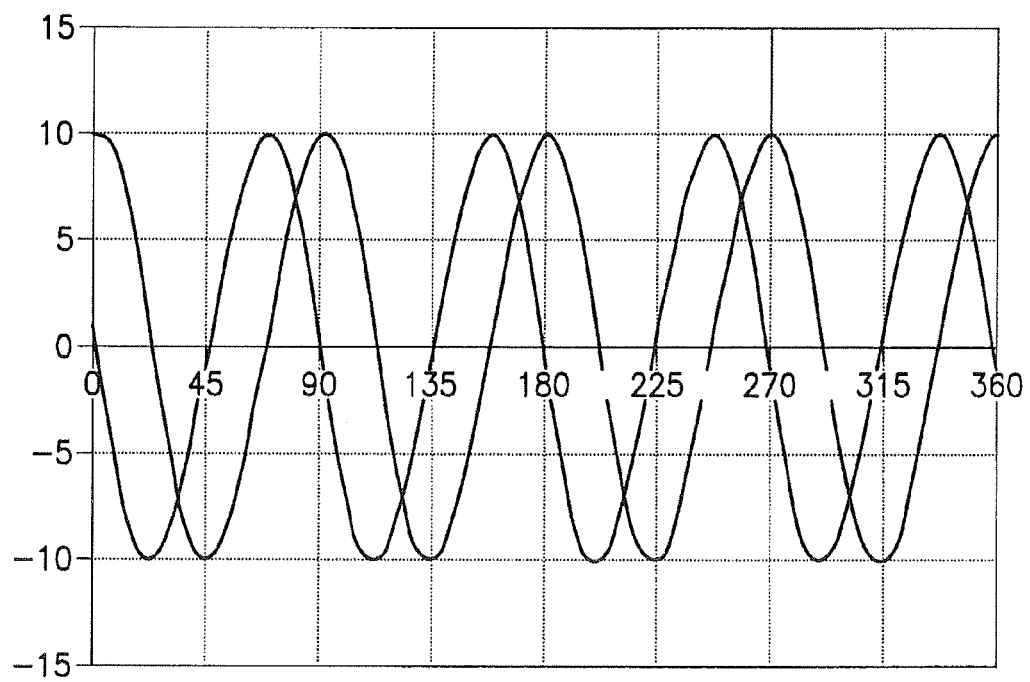

The position resolution enhancement of the exemplary embodiments is also tolerant to signal amplitude variations for allowing measurement of gap information. For example, where input signals vary due to, for example, gap variation, noise and magnetic field imperfections (or other factors), the resolution enhancement described above can normalize the signal on its amplitude and provide substantially distortion free output sine/cosine signals. For example, FIG. 43 illustrates input signals having about a 20% noise applied to the input amplitude. FIG. 44 shows an output of the signals shown in FIG. 43 after processing of the signals with the resolution enhancement described above. Gap measurements, or other information, can be determined from the calculated amplitude of the signals, such as those shown in FIG. 44 such that the resolution enhancement increases the resolution of the gap measurements. For example, once the gap range is defined the full analog to digital converter scale can be used to analyze only the defined gap range. As a non-limiting example, if the gap cannot be less than, for example, about 5 mm and no more than about 8 mm, the analog to digital converter range can be used to analyze the region from about 5 mm to about 8 mm.

As described before, where the amplitude of the sinusoidal signals is gap dependent the gap can be defined, for example, as $$Gap = t * \ln\left(\frac{B}{A}\right) = t * \ln\left(\frac{B}{\sqrt{\sin^2 + \cos^2}}\right) \quad [40]$$

where B and t are, for example, hardware dependent constants, sin and cos are sinusoidal signals (not the functions) and A is the amplitude of the signals. In alternate embodiments B and t can be any suitable constant values. By taking partial derivatives of equation [40] resolution of the gap measurement $\epsilon_G$ is $$\epsilon_G = \epsilon_{sin} * \frac{\partial}{\partial \sin}\left[t * \ln\left(\frac{B}{\sqrt{\sin^2 + \cos^2}}\right)\right] + \quad [41]$$
$$\epsilon_{cos} * \frac{\partial}{\partial \cos}\left[t * \left(\frac{B}{\sqrt{\sin^2 + \cos^2}}\right)\right]$$

where $\epsilon_{sin}$ and $\epsilon_{cos}$ are, respectively, individual errors for the sine and cosine signals. Using the following simplifications $$\frac{d}{dx}[\ln(U(x))] = \frac{1}{U} * \frac{dU(x)}{dx} \quad [42]$$

-continued $$\frac{d}{dx}[U(x)^n] = n^* U^{n-1} * \frac{dU(x)}{dx} \quad [43]$$

$$\frac{\partial}{\partial \sin}\left[t * \ln\left(\frac{B}{\sqrt{\sin^2 + \cos^2}}\right)\right] =$$  [44]

$$t * \sqrt{\sin^2 + \cos^2} * \frac{\partial}{\partial \sin}\left[\frac{1}{\sqrt{\sin^2 + \cos^2}}\right] =$$

$$t * \sqrt{\sin^2 + \cos^2} * \left(-\frac{1}{2}\right) * \frac{1}{\sqrt{(\sin^2 + \cos^2)^3}} * \frac{\partial \sin^2}{\partial \sin} = \frac{-t * \sin}{\sin^2 + \cos^2}$$

the resolution of the gap measurement can be described as $$\varepsilon_G = \frac{-t * \sin}{\sin^2 + \cos^2}[\varepsilon_{sin} * \sin + \varepsilon_{cos} * \cos] \quad [45]$$

If it is assumed that the range of the analog to digital converter is equal to 2*A (volts) (e.g. the full range of the analog to digital converter is used) and the main source of the signal uncertainty/errors is the analog to digital converter resolution N(bits)=(2*A)/$2^N$ (volts), equation [45] can be rewritten as $$\varepsilon_G = \frac{-t}{\sin^2 + \cos^2}\left[\left(\pm\frac{2*A}{2^N} * \sin\right) + \left(\pm\frac{2*A}{2^N} * \cos\right)\right] \quad [46]$$

If the sine and cosine signals are replaced with the sine and cosine functions $$\varepsilon_G = \frac{-t}{A^2\sin^2\alpha + A^2\cos^2\alpha}\left[\left(\pm\frac{2*A}{2^N}A\sin\alpha\right) + \left(\pm\frac{2*A}{2^N}*A\cos\alpha\right)\right] \quad [47]$$

$$= \frac{2t}{2^N}[(\mp\sin\alpha) + (\mp\cos\alpha)]$$

or $$\varepsilon_G = \frac{t}{2^{N-1}}[(\mp\sin\alpha) + (\mp\cos\alpha)] \quad [48]$$

Figure 46:
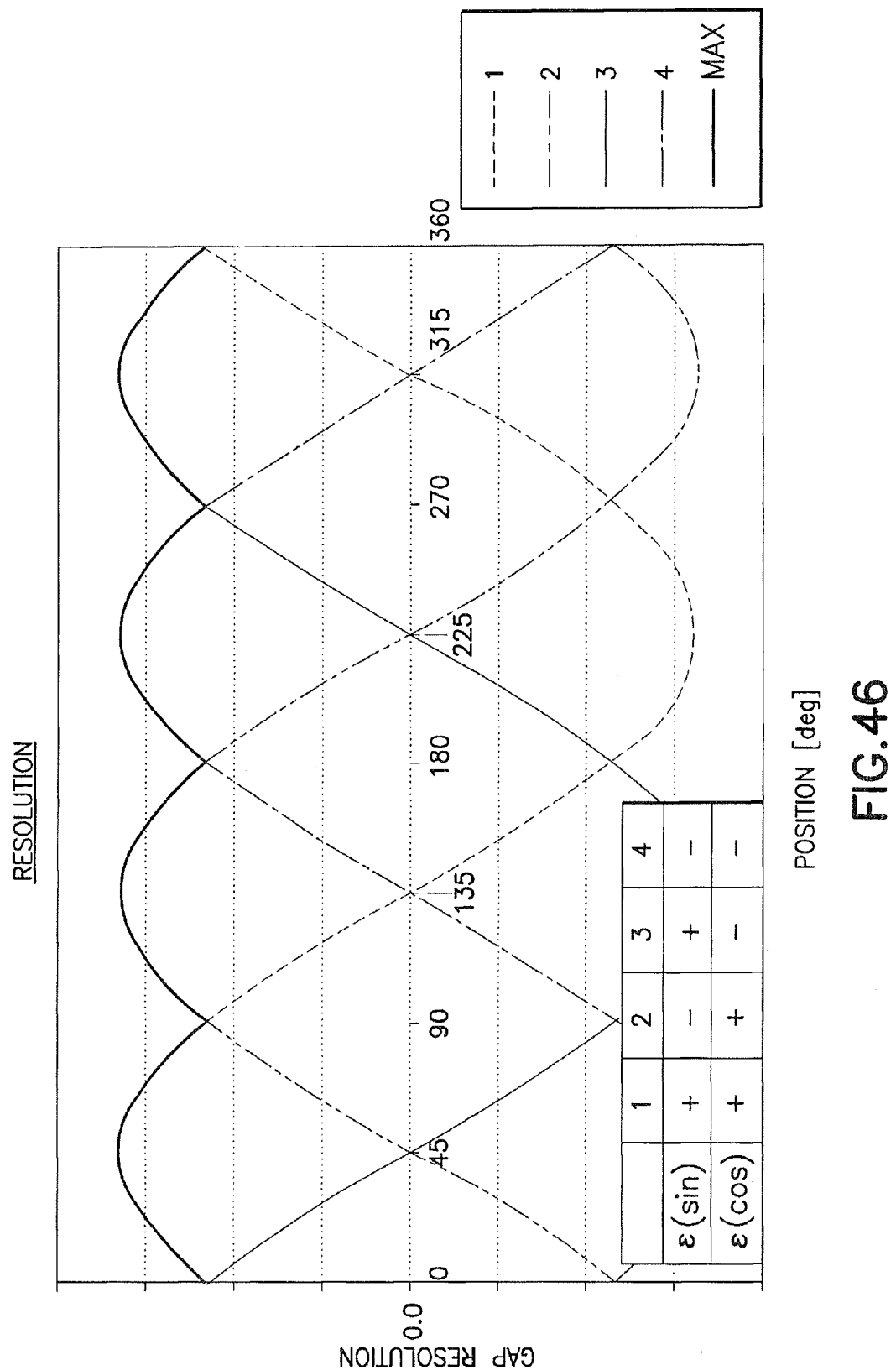

Similar to the position resolution described above, as can be seen from equation [48], an overall gap resolution is a periodic function with maximums at about 45, 135, 225 and 315 degrees as shown in FIG. 46. In the case where the sensors are connected to an analog to digital converter through, for example, the resolution enhancer described above, gap information can be obtained by the controller 190 (which may include the PSRE) from, for example the amplitude of the sine and cosine signals already derived/preprocessed in the analog domain, such as from the enhanced position resolution. Depending on the application, signal amplification can be converted into the gap information, zoomed into a region of interest, as noted above, and sent to the analog to digital converter. In this case, the gap resolution can be approximated, for example, as $$\varepsilon_G = \frac{\Delta G}{2^N} \quad [49]$$

where $\Delta G$ is the region of interest.

As may be realized, while the above examples were described with respect to double multiplication of the signals (e.g. doubling the original signal or doubling a previously multiplied signal), the exemplary embodiments can also be applied for multiplication of the original signal or any subsequent multiplied signal using any suitable multiplication factor (e.g. 1, 2, 3, 4, etc.).

In operation, as described above the exemplary position measurement systems including the single axis position sensors described herein may be utilized in any suitable facility having mechanized transports to, for example, transport product from one location to another location. For exemplary purposes only the operation of the exemplary position measurement systems will be described with respect to a semiconductor processing facility, but is should be realized that the exemplary position measurement systems can be utilized in any suitable facility as described above.

Figure 48:
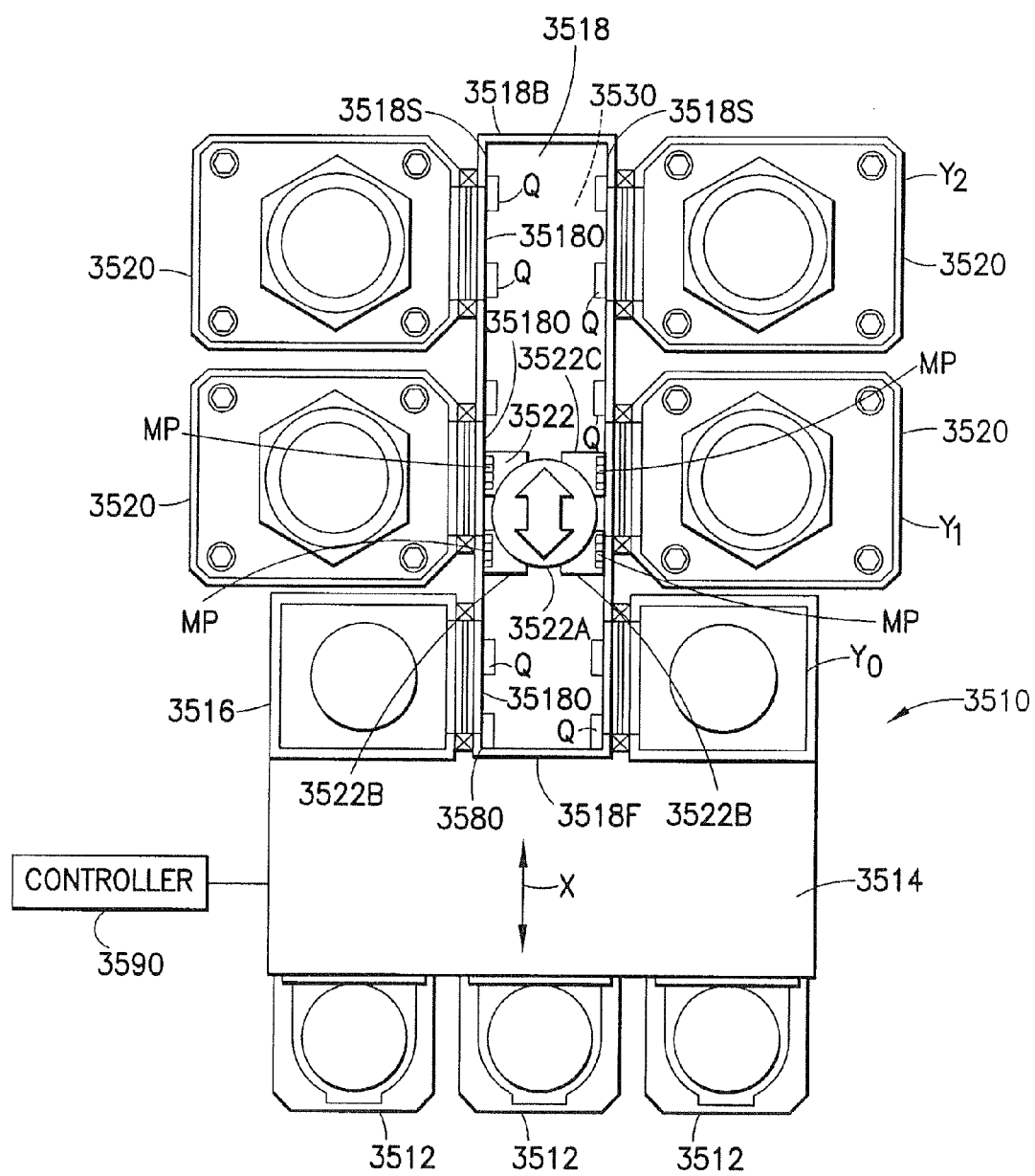
FIGS. 48-54 illustrate schematic views of processing equipment incorporating features of the exemplary embodiments.

Referring now to FIG. 48 an exemplary semiconductor substrate processing apparatus 3510 in which aspects of the disclosed embodiments may be employed. The processing apparatus 3510 is shown connected to an environmental front end module (EFEM) 3514 which has a number of load ports 3512. The load ports 3512 are capable of supporting a number of substrate storage canisters such as for example conventional FOUP canisters, though any other suitable type may be provided. The EFEM 3514 communicates with the processing apparatus through load locks 3516, which are connected to the processing apparatus. The EFEM 3514 (which may be open to atmosphere) has a substrate transport apparatus (not shown) capable of transporting substrates from load ports 3512 to load locks 3516. The EFEM 3514 may further include substrate alignment capability, batch handling capability, substrate and carrier identification capability or otherwise. In alternate embodiments, the load locks 3516 may interface directly with the load ports 3512 as in the case where the load locks have batch handling capability or in the case where the load locks have the ability to transfer wafers directly from the FOUP to the lock. Some examples of such apparatus are disclosed in U.S. Pat. Nos. 6,071,059, 6,375,403, 6,461,094, 5,588,789, 5,613,821, 5,607,276, 5,644,925, 5,954,472, 6,120,229 and U.S. patent application Ser. No. 10/200,818 filed Jul. 22, 2002 all of which are incorporated by reference herein in their entirety. In alternate embodiments, other load lock options may be provided.

Figure 50:
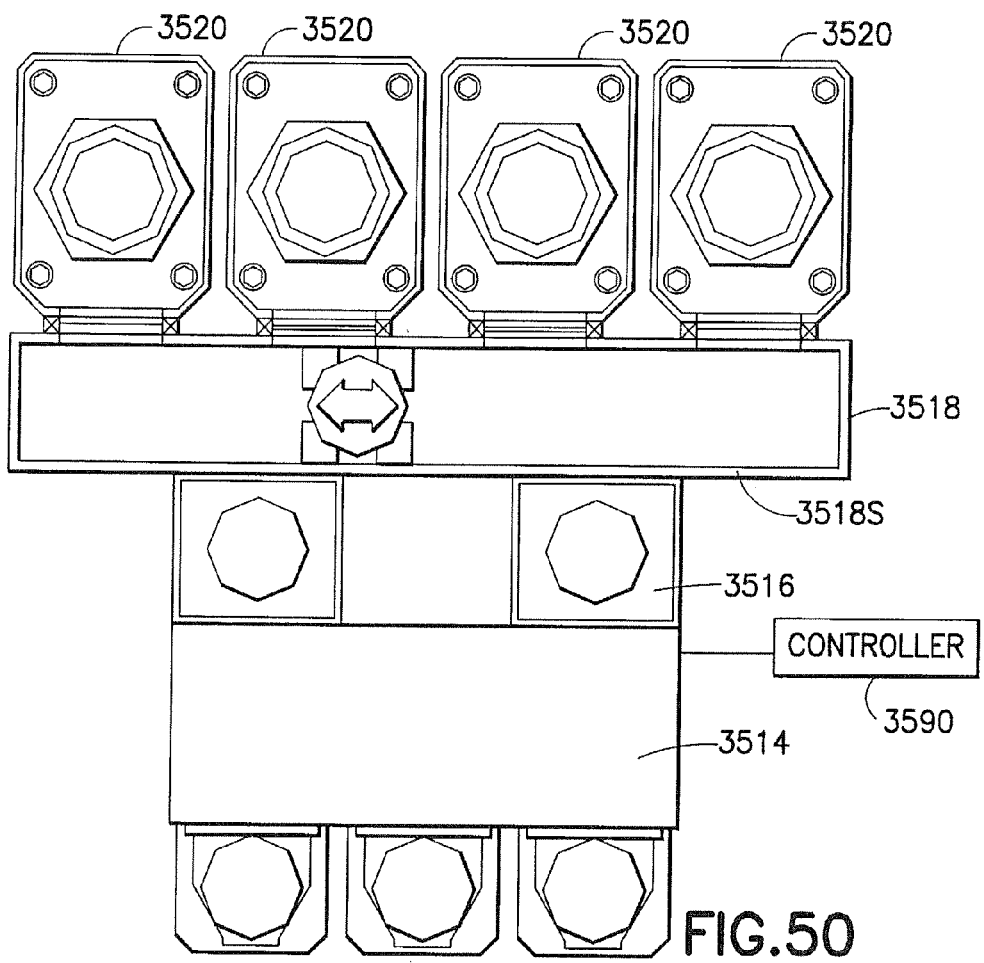
Figure 51:
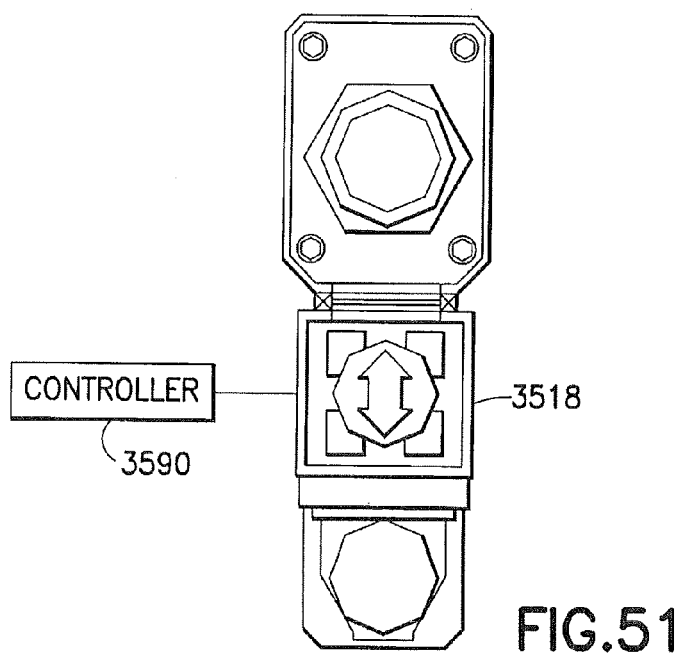

Still referring to FIG. 48, the processing apparatus 3510, which as noted before may be used for processing semiconductor substrates (e.g. 200/300 mm wafers or any other suitably sized wafers larger or smaller than 200/300 mm), panels for flat panel displays, or any other desired kind of substrate, generally comprises transport chamber 3518, processing modules 3520, and at least one substrate transport apparatus 3522. The substrate transport apparatus 3522 in the embodiment shown is integrated with the chamber 3518. In this embodiment, processing modules are mounted on both sides of the chamber 3518. In other embodiments, processing modules 3520 may be mounted on one side of the chamber 3518 as shown for example in FIG. 50. In the embodiment shown in FIG. 48, processing modules 3520 are mounted opposite each other in rows Y1, Y2 or vertical planes. In other alternate embodiments, the processing modules may be staggered from each other on the opposite sides of the transport chamber or stacked in a vertical direction relative to each other. The transport apparatus 3522 has a cart 3522C that is moved in the chamber 3518 to transport substrates between load locks 3516 and the processing chambers 3520. In the embodiment shown, only one cart 3522C is provided, however in alternate embodiments, more carts may be provided. As seen in FIG.

48, the transport chamber 3518 (which is subjected to vacuum or an inert atmosphere or simply a clean environment or a combination thereof in its interior) has a configuration, and employs a substrate transport apparatus 3522 that allows the processing modules to be mounted to the chamber 3518 in a Cartesian arrangement with modules arrayed in substantially parallel vertical planes or rows. This results in the processing apparatus 3510 having a more compact footprint than a comparable conventional processing apparatus (i.e. a conventional processing apparatus with the same number of processing modules) (See for example, FIG. 54). Moreover, the transport chamber 3522 may be capable of being provided with any desired length to add any desired number of processing modules, as will be described in greater detail below, in order to increase throughput. The transport chamber may also be capable of supporting any desired number of transport apparatus therein and allowing the transport apparatus to reach any desired processing chamber on the transport chamber without interfering with each other. This in effect decouples the throughput of the processing apparatus from the handling capacity of the transport apparatus, and hence the processing apparatus throughput becomes processing limited rather than handling limited. Accordingly, throughput can be increased as desired by adding processing modules and corresponding handling capacity on the same platform.

Still referring to FIG. 48, the transport chamber 3518 in this embodiment has a general rectangular shape though in alternate embodiments the chamber may have any other suitable shape. The chamber 3518 has a slender shape (i.e. length much longer than width) and defines a generally linear transport path for the transport apparatus therein. The chamber 3518 has longitudinal side walls 3518S. The side walls 3518S have transport openings or ports 3518O formed therethrough. The transport ports 3518O are sized large enough to allow substrates to pass through the ports (which can be through valves) into and out of the transport chamber. As can be seen in FIG. 48, the processing modules 3520 in this embodiment are mounted outside the side walls 3518S with each processing module being aligned with a corresponding transport port 3518O in the transport chamber 3518. As can be realized, each processing module 3520 may be sealed against the sides 3518S of the chamber 3518 around the periphery of the corresponding transport port 3518O to maintain the vacuum in the transport chamber 3518. Each processing module 3520 may have a valve, controlled by any suitable means to close the transport port 3518O when desired. The transport ports 3518O may be located in the same horizontal plane. Accordingly, the processing modules 3520 on the chamber 3518 are also aligned in the same horizontal plane. In alternate embodiments the transport ports 3518O may be disposed in different horizontal planes. As seen in FIG. 48, in this embodiment, the load locks 3516 are mounted to the chamber sides 3518S at the two front most transport ports 3518O. This allows the load locks 3516 to be adjacent the EFEM 3514 at the front of the processing apparatus. In alternate embodiments, the load locks 3516 may be located at any other transport ports 3518O on the transport chamber 3518 such as shown for example in FIG. 50. The hexahedron shape of the transport chamber 3518 allows the length of the chamber 3518 to be selected as desired in order to mount as many rows of processing modules as desired (for example see FIGS. 49, 51-53 showing other embodiments in which the transport chamber length is such to accommodate any suitable number of processing modules).

As noted before, the transport chamber 3518 in the embodiment shown in FIG. 48 has one substrate transport apparatus 3522 having a single cart 3522C. The transport apparatus 3522 is integrated with the chamber to translate cart 3522C back and forth in the chamber between front 3518F and back 3518B. The transport apparatus 3522 has cart 3522C having end effectors for holding one or more substrates. The cart 3522C of transport apparatus 3522 also has an articulated arm or movable transfer mechanism 3522A for extending and retracting the end effectors in order to pick or release substrates in the processing modules 3520 or load locks 3516. To pick or release substrates from the processing modules/load ports, the transport apparatus 3522 may be aligned with desired module/port and the arm is extended/retracted through the corresponding port 3518O to position the end effector inside the module/port for the substrate pick/release.

The transport apparatus 3522, shown in FIG. 48 is a representative transport apparatus and, includes a cart 3522C which is supported from linear support/drive rails. The transport apparatus may be substantially similar to the magnetically levitated transport apparatus described in United States Patent Publication No. 2004/0151562, previously incorporated by reference, although any suitable transport apparatus may be used. The linear support/drive rails may be mounted to the side walls 3518S, floor, or top of the transport chamber and may extend the length of the chamber. This allows the cart 3522C, and hence, the apparatus to traverse the length of the chamber. The cart 3522C has a frame, which supports the arm. The frame also supports caster mounts or platens 3522B, which move with or relative to the frame. Any suitable motor such as, for example, a sequential synchronous linear motor may drive the platens 3522B and hence the cart 3522C along the rails. In this exemplary embodiment, the arm is operably connected to the platens 3522B by a suitable linkage/transmission so that when the platens 3522B are moved by a drive motor in relative motion to each other the arm is extended or retracted. For instance, the transmission may be arranged so that when the platens 3522B are moved apart along the rails the arm is extended to the left, and when moved back closer together the arm is retracted from the left. The platens 3522B may also be suitably operated by a linear motor to extend/retract the arm 3522A to/from the right.

Figure 55:
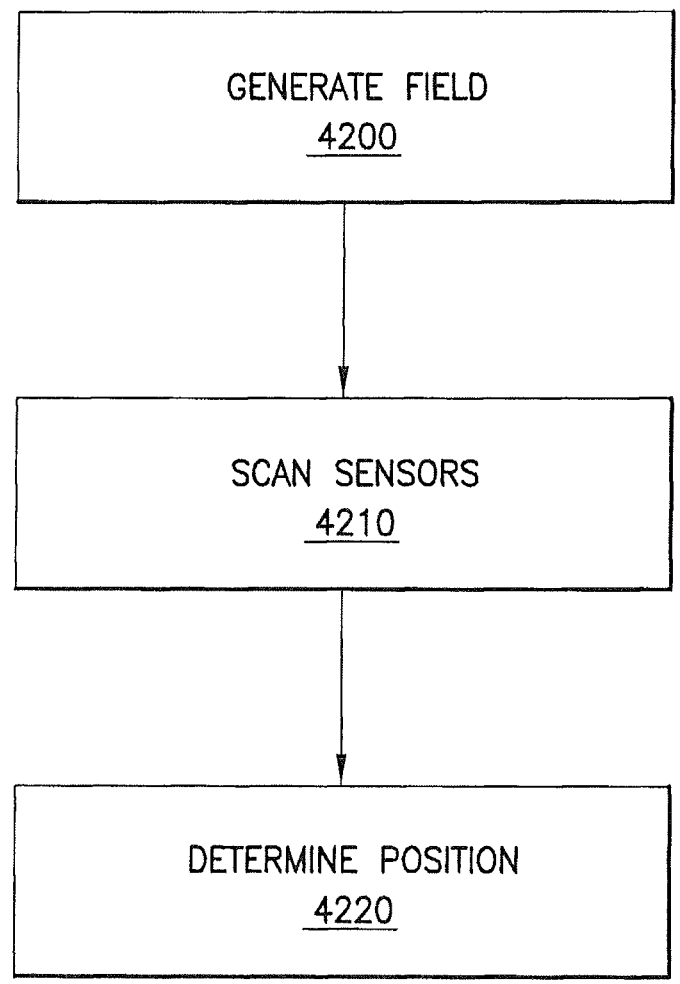
FIG. 55 illustrates a flow diagram of a method in accordance with an exemplary embodiment.

The control of movement of the platens 3522B over the slide rails with the linear motor, as well as position sensing of the platens 3522B and hence of the cart 3522C and the extended/retracted position of the arm may be accomplished through the position measurement systems described above. For example magnetic platens MP, such as exemplary platen 400 may be affixed to or be part of each of the transport platens 3522B such that the magnetic fields generated by the platens MP are directed towards, for example, the sides 3518S of the chamber 3518 (FIG. 55, Block 4200). Groups of single axis sensors Q (each of which may include a sensor group as shown in FIGS. 4, 5 and 7, sensor doublets as shown in FIGS. 2A and 3A, individual sensors as described above with respect to FIG. 3A or any combination thereof) may be placed along the sides 3518S of the chamber 3518 along the path of travel of the cart 3522C and the transport platens 3522A, 3522B in a manner described above. It is noted that only a few sensor groups Q are shown in the Figure for clarity purposes. It is further noted that any of the different position sensing systems described above may be utilized individually or in any combination thereof such that the location of the cart 3522C can be accurately determined.

The controller 3590 may be configured to sequentially scan the groups of single axis sensors Q for output with for example the sensor located at point 3580 being configured as the first scanned sensor such that the position of the cart 3522C is referenced back to point 3580 to provide an absolute position measurement (FIG. 55, Block 4210). As described above each of the sensor groups Q is located at a predetermined distance from any suitable reference point in the chamber 3518 such that as the magnetic platens MP pass any given sensor the position of the magnetic platen is roughly known. A more precise determination of the position of the magnetic platens MP and thus the cart 3522C can be obtained by mathematically manipulating the sensor output as described above (FIG. 55, Block 4220). Because, in this example, each of the platens 3522B include a magnetic platen MP the position of each platen 3522B can be determined individually such that the platens 3522B may be driven in unison in one direction in order to move the entire cart/apparatus in that longitudinal direction inside the transport chamber 3518 or driven separately so that the arm 3522A carried by the cart 3522C is extended or retracted. It is further noted that the position of the cart 3522C with respect to the chamber walls 3518S (e.g. the gap between the walls and the cart) can be measured and adjusted accordingly so that the cart 3522C is at a predetermined location between the walls 3518S to aid in the accurate placement of substrates in the processing modules 3520.

Figure 49:
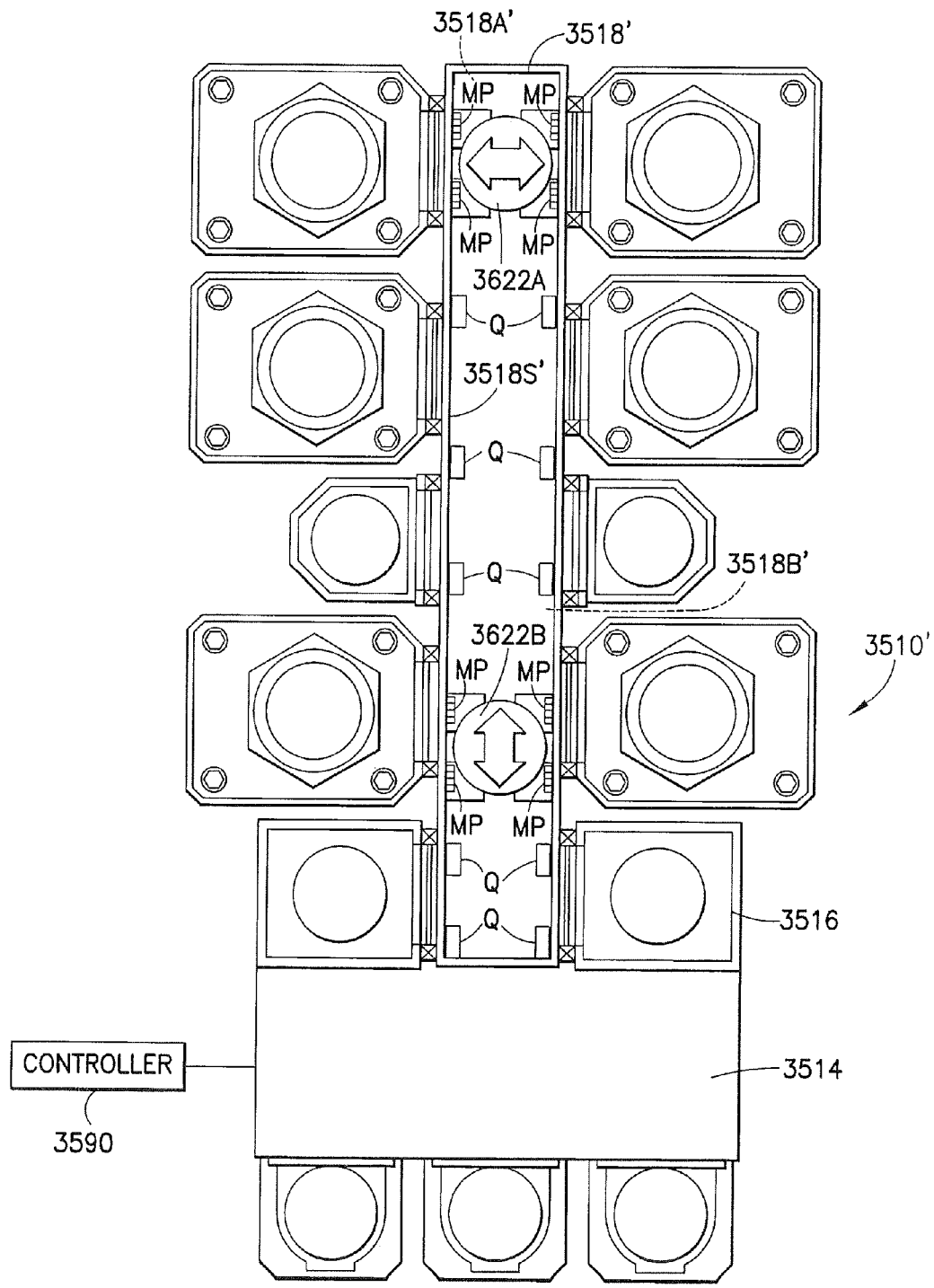

FIG. 49 shows another embodiment of a substrate processing apparatus 3510', which is generally similar to apparatus 3510. In this embodiment, the transport chamber 3518' has two transport apparatus 3622A, 3622B. The transport apparatus 3622A, 3622B are substantially the same as the apparatus 3522 described above with respect to FIG. 48. Both transport apparatus 3622A, 3622B may be supported from a common set of longitudinal slide rails as described before. The platens of the cart corresponding to each apparatus may be driven by the same linear motor drive. Different drive zones of the linear motor may allow the independent driving of individual platens on each cart 3622A, 3622B and thus also the independent driving of each individual cart 3622A, 3622B. Thus, as can be realized the arm of each apparatus can be independently extended/retracted using the linear motor in a manner similar to that described before. However, in this case the substrate transport apparatus 3622A, 3622B are not capable of passing each other in the transport chamber unless separate slide systems are employed. As described above each of the platens of the cart may include magnetic platens MP that interact with sensor groups Q, including one or more single axis sensors, affixed to the chamber walls 3518S'. In this exemplary embodiment, the processing modules are positioned along the length of the transport chamber 3518' so that the substrate may be transported to be processed in the processing module 3518' in a sequence which would avoid the transport apparatus 3622A, 3622B from interfering with each other. For example, processing modules for coating may be located before heating modules, and cooling modules and etching modules may be located last.

However, the transport chamber 3518' may have another transport zone 3518A', 3518B' which allows the two transport apparatus to pass over each other (akin to a side rail, bypass rail or magnetically suspended zone that does not require rails). In this case, the other transport zone may be located either above or below the horizontal plane(s) in which the processing modules are located. In this case each transport zone 3518A', 3518B' may have its own set of sensor groups Q so that the position of carts 3622A, 3622B can be individually tracked while the carts are in each of the transport zones 3518A', 3518B'. In this embodiment the transport apparatus has two slide rails, one for each transport apparatus. One slide rail may be located in the floor, or side walls of the transport chamber, and the other slide rail may be located in the top of the chamber. In alternate embodiments, a linear drive system may be employed which simultaneously drives and suspends the carts where the carts may be horizontally and vertically independently moveable, hence allowing them independent of each other to pass or transfer substrates. It is noted that the sensor groups Q in combination with the magnetic platens MP can be used to track the vertical position of each of the carts 3622A, 3622B as they pass over/under one another to prevent a collision which may damage the transports or the substrates carried by the transports. In all embodiments employing electric windings, these windings may also be used as resistance heaters as in the case where it is desired that the chamber be heated for degas as in the case to eliminate water vapor for example. Each transport apparatus in this case may be driven by a dedicated linear drive motor or a dedicated drive zone in which the cart resides similar to that described before.

Figure 52:
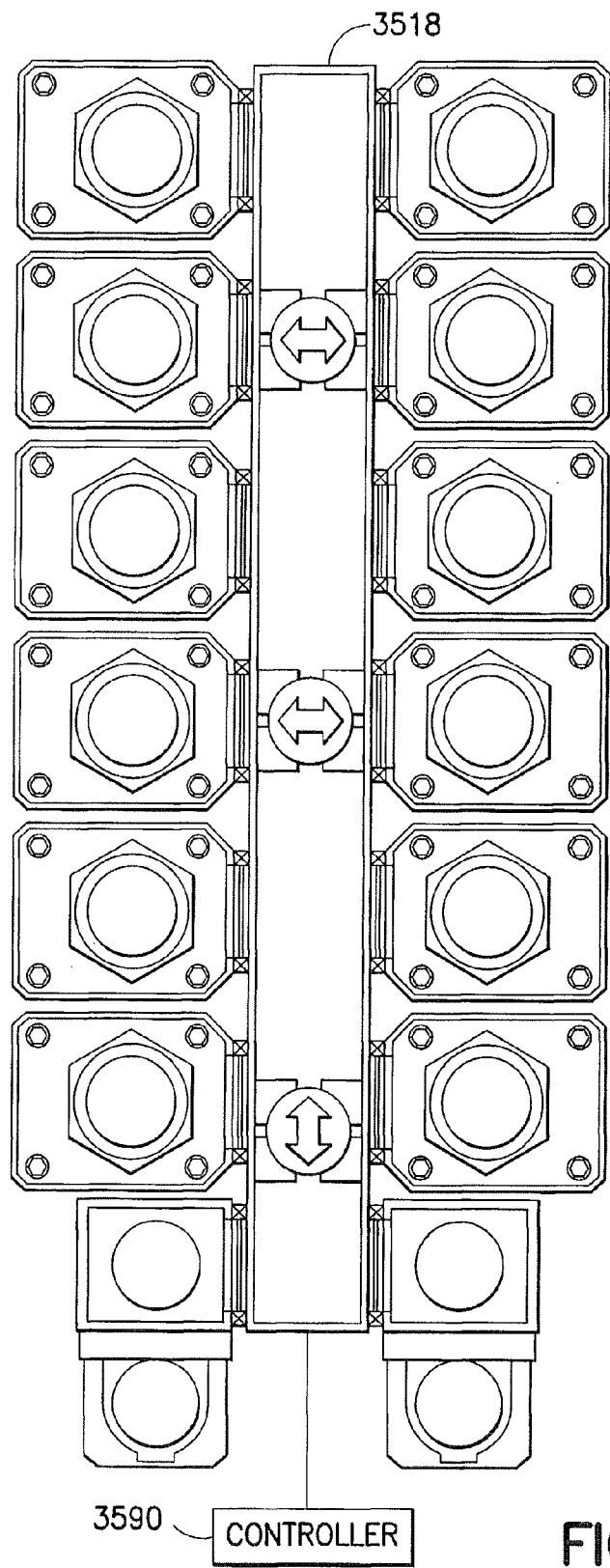
Figure 53:
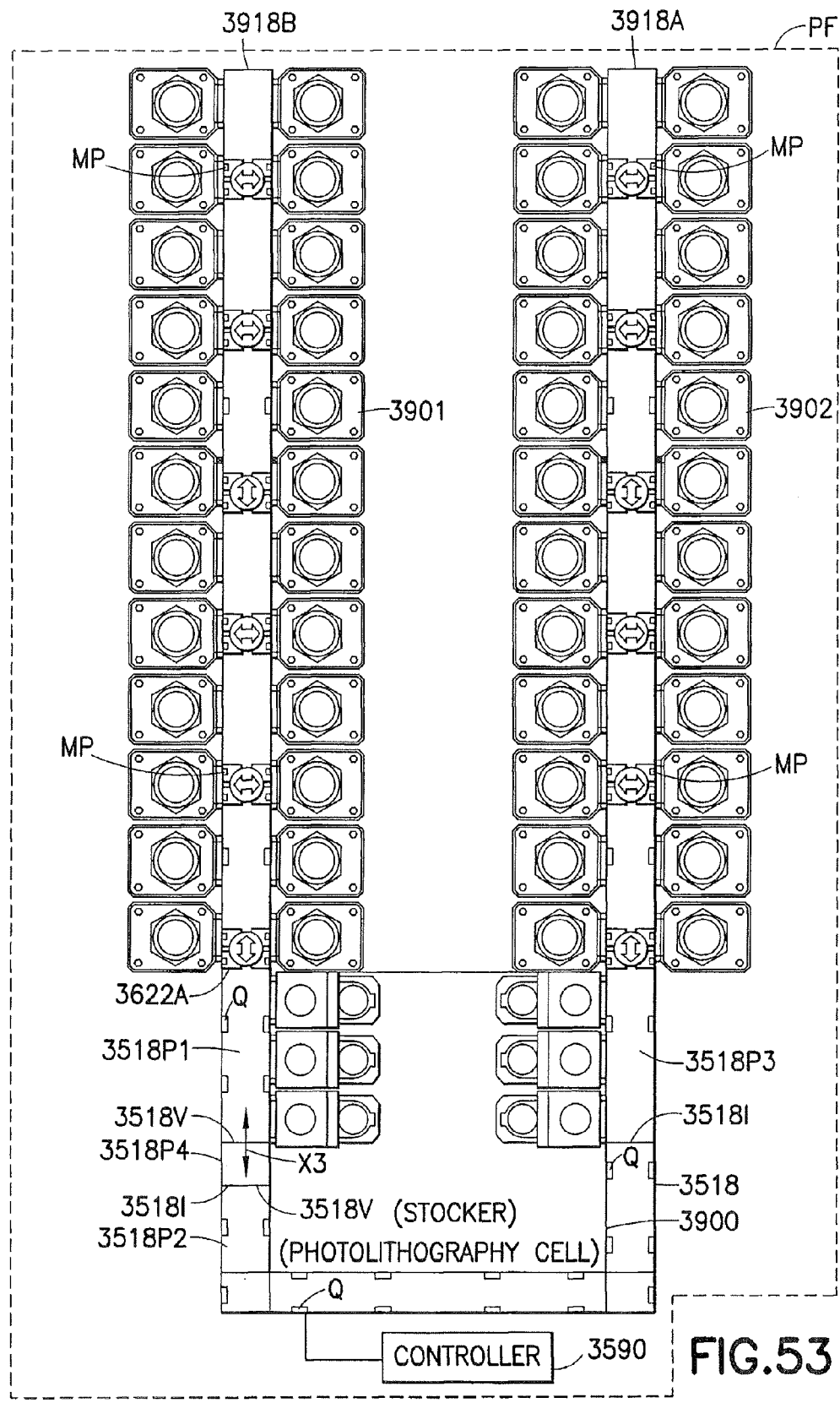

Referring now to FIGS. 52, and 53 there are shown other substrate processing apparatus incorporating the position measurement systems described herein in accordance with other exemplary embodiments. As seen in FIGS. 52 and 53 the transport chamber in these embodiments is elongated to accommodate additional processing modules. The apparatus shown in FIG. 52 has twelve (12) processing modules connected to the transport chamber, and each apparatus (two apparatus are shown) in FIG. 53 has twenty-four (24) processing modules connected to the transport chamber. The numbers of processing modules shown in these embodiments are merely exemplary, and the apparatus may have any other number of processing modules as previously described. The processing modules in these embodiments are disposed along the sides of the transport chamber in a Cartesian arrangement similar to that previously discussed. The number of rows of processing modules in these case however have been greatly increased (e.g. six (6) rows in the apparatus of FIG. 52, and twelve (12) rows in each of the apparatus of FIG. 53). In the embodiment of FIG. 52, the EFEM may be removed and the load ports may be mated directly to load locks. The transport chamber of the apparatus in FIGS. 52, and 53 have multiple transport apparatus (i.e. three apparatus in the case of FIG. 52, and six apparatus in the case of FIG. 53) to handle the substrates between the load locks and the processing chambers. The number of transport apparatus shown are merely exemplary and more or fewer apparatus may be used. The transport apparatus in these embodiments are generally similar to that previously described, comprising an arm and a cart where the position of the cart and extension/retraction of the arm is tracked with the multi-dimensional position measurement systems as described above. In this case, however, the cart is supported from zoned linear motor drives in the side walls of the transport chamber. The linear motor drives in this case provide for translation of the cart in two orthogonal axis (i.e. longitudinally in the transport chamber and vertically in the transport chamber). Accordingly, the transport apparatus are capable of moving past one another in the transport chamber. The transport chamber may have "passing" or transport areas above and/or below the plane(s) of the processing modules, through which the transport apparatus may be routed to avoid stationary transport apparatus (i.e. picking/releasing substrates in the processing modules) or transport apparatus moving in opposite directions. As can be realized, the substrate transport apparatus has a controller for controlling the movements of the multiple substrate transport apparatus.

Still referring to FIG. 53, the substrate processing apparatus 3918A and 3918B in this case may be mated directly to a tool 3900.

As may be realized from FIGS. 49, 50 and 52-53 the transport chamber 3518 may be extended as desired to run throughout the processing facility PF. As seen in FIG. 53, and as will be described in further detail below, the transport chamber may connect and communicate with various sections or bays, 3918A, 3918B in the processing facility PF such as for example storage, lithography tool, metal deposition tool or any other suitable tool bays. Bays interconnected by the transport chamber 3518 may also be configured as process bays or processes 3918A, 3918B. Each bay has desired tools (e.g. lithography, metal deposition, heat soaking, cleaning) to accomplish a given fabrication process in the semiconductor workpiece. In either case, the transport chamber 3518 has processing modules, corresponding to the various tools in the facility bays, communicably connected thereto, as previously described, to allow transfer of the semiconductor workpiece between chamber and processing modules. Hence, the transport chamber may contain different environmental conditions such as atmospheric, vacuum, ultra high vacuum, inert gas, or any other, throughout its length corresponding to the environments of the various processing modules connected to the transport chamber. Accordingly, the section 3518P1 of the chamber in a given process or bay 3518A, 3518B, or within a portion of the bay, may have for example, one environmental condition (e.g. atmospheric), and another section 3518P2, 3518P3 of the chamber may have a different environmental condition. As noted before, the section 3518P1, 3518P2, 3518P3 of the chamber with different environments therein may be in different bays of the facility, or may all be in one bay of the facility. FIG. 53 shows the chamber 3518 having three sections 3518P1, 3518P2, 3518P3 with different environments for example purposes only. The chamber 3518 in this embodiment may have as many sections with as many different environments as desired. Each of the sections 3918A, 3918B, 3518P1, 3518P2, 3518P3 may have sensor groups Q, including one or more single axis sensors, positioned as described above along the walls of the respective transport sections. The transport sections where highly accurate placement of the carts 3266A is not needed such as 3518P2 may employ the sensor configuration described above with respect to FIG. 3A such that the carts 3266A can be cost effectively and accurately tracked. In alternate embodiments, any combination of the exemplary position measurement systems described herein may be utilized in any one of the transport sections 3918A, 3918B, 3518P1, 3518P2, 3518P3.

As seen in FIG. 53, the transport apparatus, similar to apparatus 3622A, (see also FIG. 49) in the chamber 3518 are capable of transiting between sections 3518P1, 3518P2, 3518P3 of the chamber with different environments therein. Hence, as can be realized from FIG. 53, the transport apparatus 3622A may with one pick move a semiconductor workpiece from the tool in one process or bay 3518A of the processing facility to another tool with a different environment in a different process or bay 3518B of the process facility. For example, transport apparatus 3622A may pick a substrate in processing module 3901, which may be an atmospheric module, lithography, etching or any other desired processing module in section 3518P1, of transport chamber 3518. The transport apparatus 3622A may then move in the direction indicated by arrow X3 in FIG. 53 from section 3518P1 of the chamber to section 3518P3. In section 3518P3, the transport apparatus 3622A may place the substrate in processing module 3902, which may be any desired processing module.

As can be realized from FIG. 53, the transport chamber may be modular, with chamber modules connected as desired to form the chamber 3518. The modules may include internal walls 3518I, similar to walls 3518F, 3518R in FIG. 48, to segregate sections 3518P1, 3518P2, 3518P3, 3518P4 of the chamber. Internal walls 3518I may include slot valves, or any other suitable valve allowing one section of the chamber 3518P1, 3518P4 to communicate with one or more adjoining sections. The slot valves 3518V, may be sized to allow, one or more carts to transit through the valves from one section 3518P1, 3518P4 to another. In this way, the carts 3622A may move anywhere throughout the chamber 3518. The valves may be closed to isolate sections 3518P1, 3518P2, 3518P3, 3518P4 of the chamber so that the different sections may contain disparate environments as described before. Further, the internal walls of the chamber modules may be located to form load locks 3518P4 as shown in FIG. 48. The load locks 3518P4 (only one is shown in FIG. 53 for example purposes) may be located in chamber 3518 as desired and may hold any desired number of carts 3622A therein.

Figure 54:
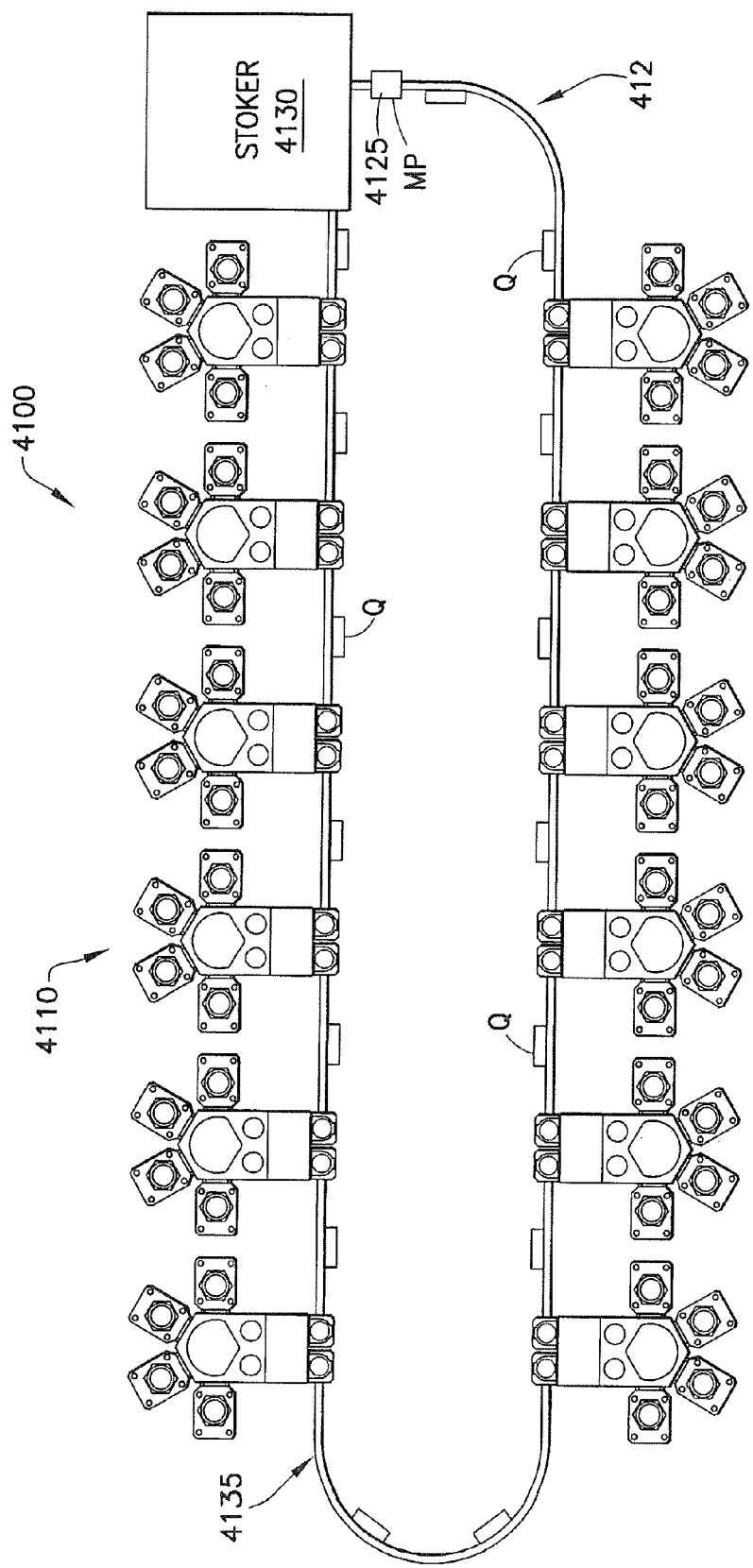

Referring now to FIG. 54, there is shown an exemplary fabrication facility layout employing an automated material handling system (AMHS) 4120. In this exemplary embodiment workpieces are transported from the stocker 4130 by the AMHS to one or more of the processing tools 4110. The AMHS may incorporate one or more transport carts 4125 and a transport track 4135. The transport track 4130 may be any suitable track. The transport track may include sensor groups Q, including one or more single axis sensors, spaced along the track as described above. The transport cart 4125 may include one or more magnetic platens MP that interact with the sensor groups Q to provide position measurements for the cart 4125 as described above.

As may be realized, the position of the object 120 whose position is to be measured or tracked may be tracked using sensors that are near each end of the object 120 so that the controller can accommodate for multiple objects along the same transport path that may be trailing one another to avoid contact between the objects. In alternate embodiments, the object 120 may be tracked using a sensor at one end of the object 120 where the length of the object is known. Here the controller may use the position of the first end of the object obtained by the position measurement systems described herein and add or subtract the length of the object to determine the amount of space along the transport path the object occupies.

It should be realized that although the exemplary embodiments described herein are described with respect to linear drive systems, the exemplary embodiments can be adapted to be utilized in rotational drives. For example, the disclosed embodiments can be used to track the rotational speed and axial location of an object within a cylinder while at the same time measuring the distance between the rotating object and a wall of the cylinder.

The exemplary embodiments described herein provide a position measurement system utilizing single axis position sensors as described above for determining a multi-axis position of an object. The position measurement system is capable of measuring an unlimited length along a first axis, while simultaneous measuring a position along a second and third axis. The position measurement systems described herein can be incorporated into any suitable transport apparatus. Although the embodiments described herein are disclosed as measuring three axes simultaneously it should be realized that several measurement systems can be combined to measure more than three axes. Conversely, the exemplary embodiments described herein may also be utilized and configured to measure less than three axes. The exemplary embodiments also provide a position measurement system where power does not have to be transmitted to the movable object to obtain positional information for the object. However, although the exemplary embodiments described above were described as having the magnetic platen affixed to the movable object it should be realized that the magnetic platen can be affixed to, for example a stationary surface substantially along the object's transport path while the single axis sensors and/or sensor groups are affixed to the movable object.

It should be understood that the exemplary embodiments described herein may be used individually or in any combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus comprising:
    a controller;
    a robotic actuator in communication with the controller having a movable portion and a path of actuator motion; and
    a multi-dimensional position measurement device including at least one field generating platen attached to the movable portion and at least one sensor group positioned along the path of actuator motion and in communication with the controller, where the field generating platen is configured for both position measurement and propelling the movable portion;
    wherein each sensor in the at least one sensor group is configured to provide but one output signal corresponding to variances along a single axis in a sensed field generated by the at least one field generating platen and the controller is configured to calculate a multi-dimensional position of the movable portion adjacent a respective one of the at least one sensor group based on the but one output signal of at least one of the sensors in the at least one sensor group, where the multi-dimensional position includes at least a planar position and a gap between the robotic actuator and the at least one sensor group.

2. The apparatus of claim 1, wherein the at least one field generating platen comprises shaped magnets configured to provide a substantially undistorted sinusoidal magnetic field.

3. The apparatus of claim 1, wherein at least one of the at least one sensor group is configured to sense a normal component of a field generated by the field generating platen, where the normal component is normal to a surface of the field generating platen.

4. The apparatus of claim 1, wherein at least one of the at least one sensor group is configured to sense parallel components of a field generated by the field generating platen, where the parallel components are parallel to a surface of the field generating platen.

5. The apparatus of claim 1, wherein at least one of the at least one sensor group comprises singular sensors and at least another of at the least one sensor group comprises sensor doublets, wherein output signals provided by sensors in the sensor doublets have a sine/cosine relationship.

6. The apparatus of claim 1, wherein at least one of the at least one sensor group comprises sensor doublets, where output signals provided by sensors in the sensor doublet have a sine/cosine relationship.

7. The apparatus of claim 1, wherein at least one of the at least one sensor group comprises a first sensor pair and a second sensor pair, where the first sensor pair is located above the second sensor pair in a staggered relationship.

8. The apparatus of claim 1, wherein at least one of the at least one sensor group comprises a first sensor pair and a second sensor pair, where the first sensor pair is located between the second sensor pair in an orthogonal relationship.

9. The apparatus of claim 1, wherein the at least one sensor group is located proximate the at least one field generating platen such that sensors in the at least one sensor group reach saturation limits.

10. The position measurement system of claim 1, wherein the controller is configured to adjust a sinusoidal period of the output received from the at least one sensor group such that a position measurement obtained from the adjusted signal is more accurate than a position measurement obtained from an output having an unadjusted sinusoidal period.

* * * * *